United States Patent [19]

Brooks et al.

[11] Patent Number: 4,699,513

[45] Date of Patent: * Oct. 13, 1987

[54] DISTRIBUTED SENSOR AND METHOD USING COHERENCE MULTIPLEXING OF FIBER-OPTIC INTERFEROMETRIC SENSORS

[75] Inventors: Janet L. Brooks, Stanford, Calif.; Moshe Tur, Tel Aviv, Israel; Robert C. Youngquist, London, England; Byoung Y. Kim, Stanford, Calif.; Robert H. Wentworth, Palo Alto, Calif.; Herbert J. Shaw, Stanford, Calif.; Kjell Blotekjaer, Trondheim, Norway

[73] Assignee: Stanford University, Stanford, Calif.

[ * ] Notice: The portion of the term of this patent subsequent to Oct. 6, 2004 has been disclaimed.

[21] Appl. No.: 738,678

[22] Filed: May 28, 1985

Related U.S. Application Data

[63] Continuation-in-part of Ser. No. 699,841, Feb. 8, 1985, abandoned.

[51] Int. Cl.$^4$ .............................................. G01B 9/02
[52] U.S. Cl. .................................... 356/345; 250/227; 356/349; 356/351
[58] Field of Search ................... 356/345, 349, 351; 250/227

[56] References Cited

U.S. PATENT DOCUMENTS

| | | | |
|---|---|---|---|
| 4,299,490 | 11/1981 | Cahill et al. | |
| 4,334,781 | 6/1982 | Ozeki | 356/368 |
| 4,372,685 | 2/1983 | Ulrich | |
| 4,432,599 | 2/1984 | McMahon | 250/227 X |
| 4,443,200 | 4/1984 | Macedo et al. | 250/227 |
| 4,517,456 | 5/1985 | Halsall et al. | 250/227 X |
| 4,572,949 | 2/1986 | Bowers et al. | |

FOREIGN PATENT DOCUMENTS

| | | | |
|---|---|---|---|
| 3044183 | 6/1982 | Fed. Rep. of Germany | 356/345 |
| 2106736 | 4/1983 | United Kingdom | |

OTHER PUBLICATIONS

H. C. Lefevre et al., "All-Fiber Gyroscope With Inertial-Navigation Short-Term Sensitivity", *Optics Letters,* vol. 7, No. 9, pp. 454–456, (Sep. 1982).

(List continued on next page.)

*Primary Examiner*—Davis L. Willis
*Assistant Examiner*—Matthew W. Koren
*Attorney, Agent, or Firm*—Knobbe, Martens, Olson & Bear

[57] ABSTRACT

A distributed sensor system including an optical source having a short coherence length for optionally continuously monitoring each sensor in the system. In one preferred embodiment, an array of fiber-optic sensors are organized in a ladder configuration, with the sensors positioned in spaced relation and defining the rungs of the ladder. Light transmitted through the sensors is multiplexed onto a return arm of the ladder, with sensor spacing being such that interference between light from different sensors is prevented. The multiplexed signals are received by an optical fiber receiver which couples the multiplexed light with an interfering optical reference signal to produce a phase difference signal representing conditions influencing selected sensors. Embodiments are disclosed for use of either pulsed or continuous wave light sources. In another preferred embodiment, the sensors comprise a plurality of interferometers connected in series configuration by a common optical fiber, which provides multiplexed output signals from the sensors to another plurality of interferometers comprising receivers. Functional equivalents of the series configuration provide sensors and receivers comprising birefringent or two-mode fiber. The optical path length differences between each pair of sensor arms are selected to prevent interference between the multiplexed sensor output signals from the various sensors. The optical path lengths through the sensors and receivers are structured so that each receiver produces a phase difference signal relating to conditions affecting light transmission through a specific sensor. A phase and amplitude modulation technique is disclosed for providing heterodyned output signals from the distributed sensor system.

45 Claims, 30 Drawing Figures

OTHER PUBLICATIONS

B. Y. Kim et al., "Response of Fiber Gyros to Signals Introduced at the Second Harmonic of the Bias Modulation Frequency", *SPIE*, Conference Proceedings Held In San Diego, California, vol. 425, pp. 86–89, (Aug. 1983).

A. R. Nelson et al., "Passive Multiplexing Techniques for Fiber-Optic Sensor Systems", *I.F.O.C.*, p. 27, (Mar. 1981).

S. A. Al-Chalabi et al., "Partially Coherent Sources In Interferometric Sensors", *IEEE*, Proceedings of the First International Conference on Optical Fibre Sensors, pp. 132–135, (Apr. 1983).

R. C. Youngquist et al., "Birefringent-Fiber Polarization Coupler", *Optics Letters*, vol. 8, No. 12, pp. 656–658, (Dec. 1983).

B. Y. Kim et al., "Phase-Reading, All-Fiber-Optic Gyroscope", *Optics Letters*, vol. 9, No. 8, pp. 378–380, (Aug. 1984).

J. P. Goedgebuer et al., "Multiplex Communication Via Electro-Optic Phase Modulation of White Light", *Taylor Francis Ltd.*, vol. 29, No. 4, pp. 471–477, (1984).

B. Y. Kim et al., "All-Fiber-Optic Gyroscope With Linear Scale Factor Using Phase Detection", *SPIE*, vol. 478 Fiber Optic and Laser Sensors II, pp. 142–148, (1984).

Bosselmann, Th. and Ulrich, R., "High Accuracy Positioning Sensing With Fiber-Coupled White-Light Interferometers," *Second International Conference on Optical Fibre Sensors*, Stuttgart, Sep. 5–7, 1984.

Bowers, J. E., et al., "Fibre-Optic Variable Delay Lines," *Electronics Letters*, vol. 18, No. 23, pp. 999–1000, Nov. 11, 1982.

Giles, I. P., et al., "Coherent Optical-Fibre Sensors With Modulated Laser Sources," *Electronics Letters*, vol. 19, No. 1, pp. 14–15, Jan. 6, 1983.

R. Ulrich, "Fiber-Optic Rotation Sensing With Low Drift", *Optics Letters*, vol. 5, No. 5, pp. 173–175, (May, 1980).

R. A. Bergh et al., "All-Single-Mode Fiber-Optic Gyroscope", *Optics Letters*, vol. 6, No. 4, pp. 198–200, (Apr. 1981).

R. A. Bergh et al., "All-Single-Mode Fiber-Optic Gyroscope With Long-Term Stability", *Optics Letters*, vol. 6, No. 10, pp. 502–504, (Oct. 1981).

Palmer, John P., et al., "Analog Matrix Multiplication by Directional Coupling Between Optical Fibers," *SPIE*, vol. 232, pp. 157–159, International Optical Computing Conference, 1980.

Jaccard, P. et al. "A New Technique for Low Cost All-Fiber Device Fabrication," SPIE's Technical Symposium East, 1984.

Henning, M. L., et al., "Optical Fibre Hydrophones With Down Lead Insensitivity," *Proceedings of the First International Conference on Optical Fibre Sensors*, London, pp. 23–27, 1983.

Uttam, D., et al., "Remote Interferometric Sensors Using Frequency Modulated Laser Sources," *First International Conference on Optical Fibre Sensors*, London, pp. 182–184, Apr. 26–28, 1983.

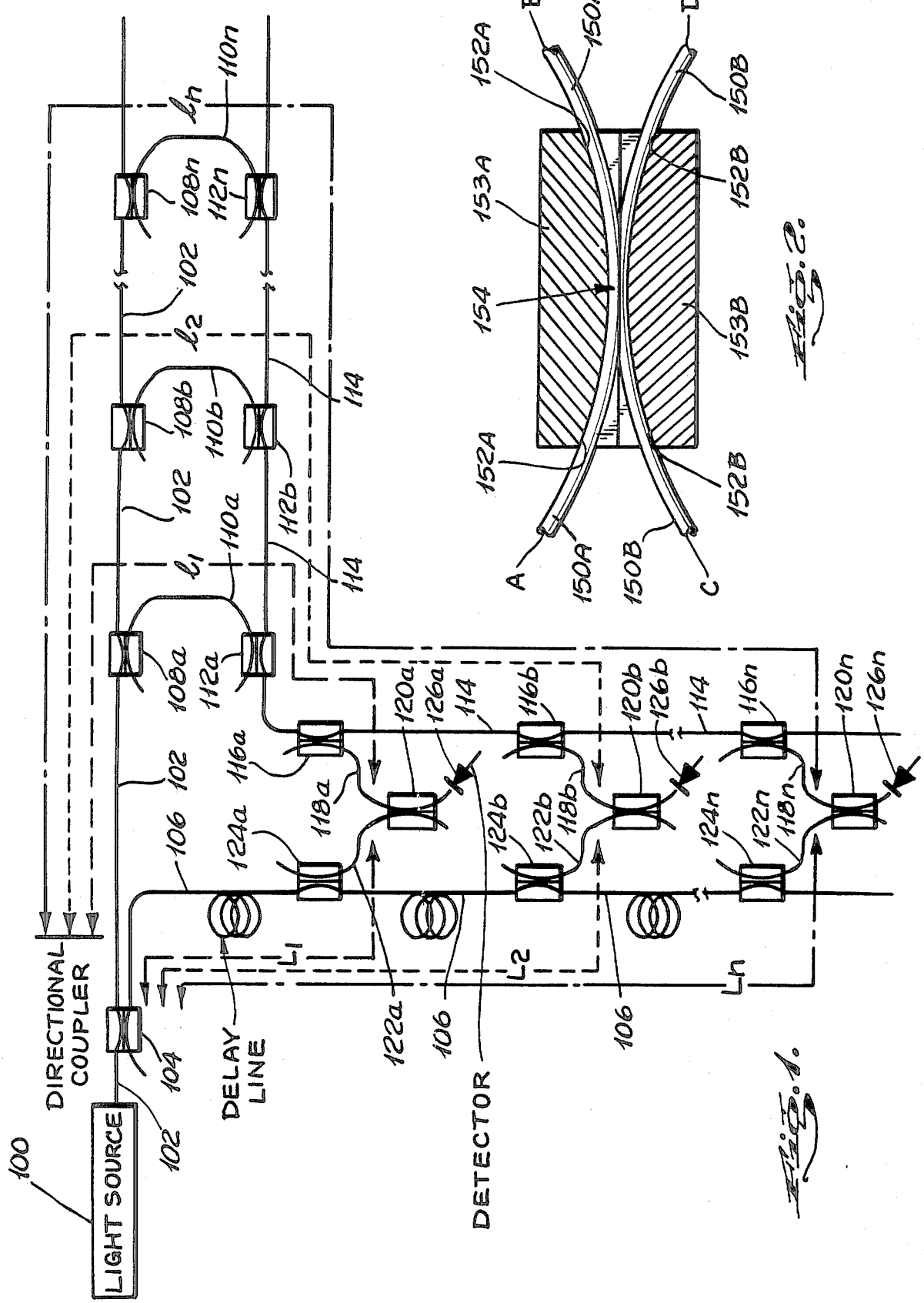

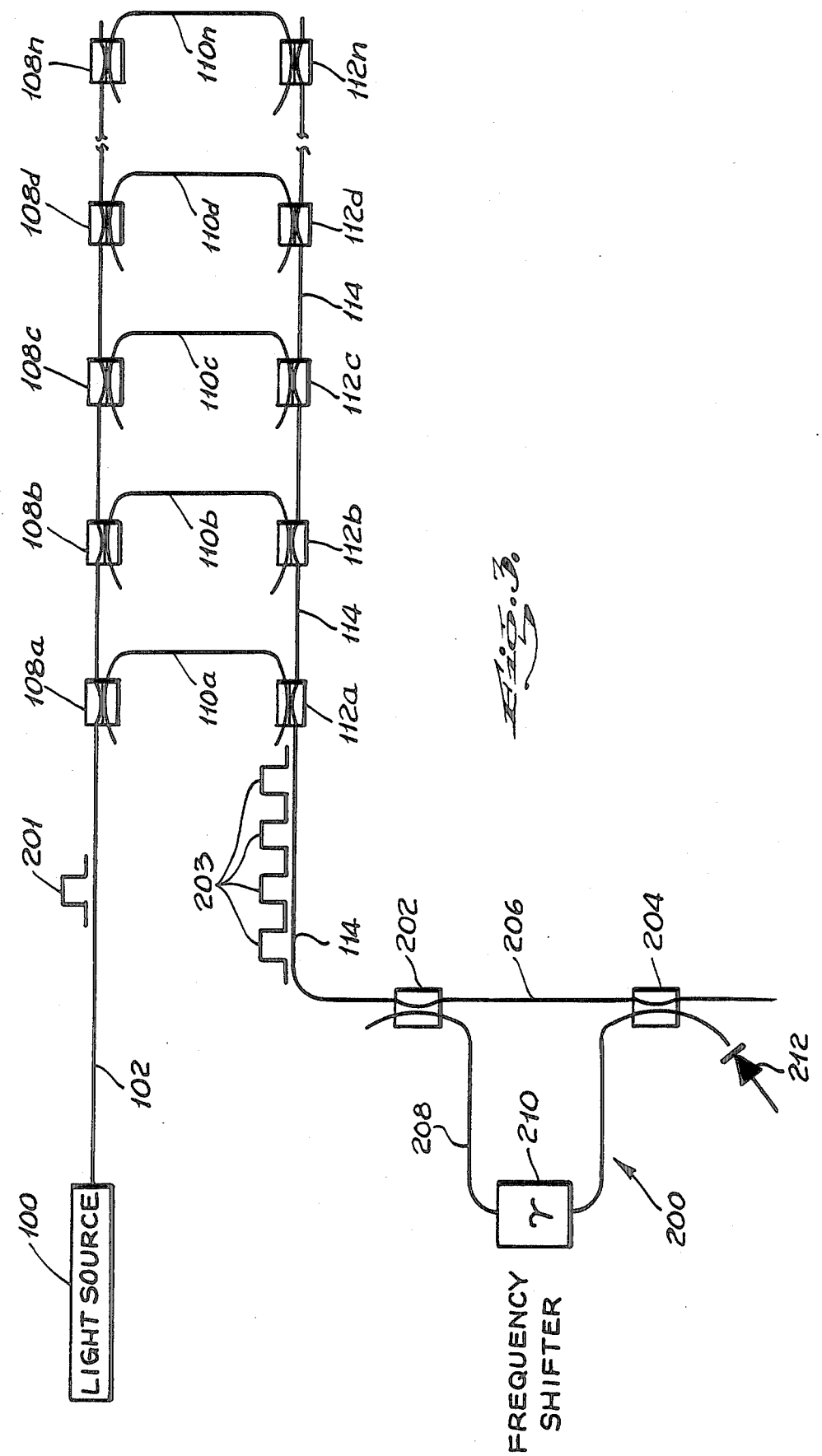

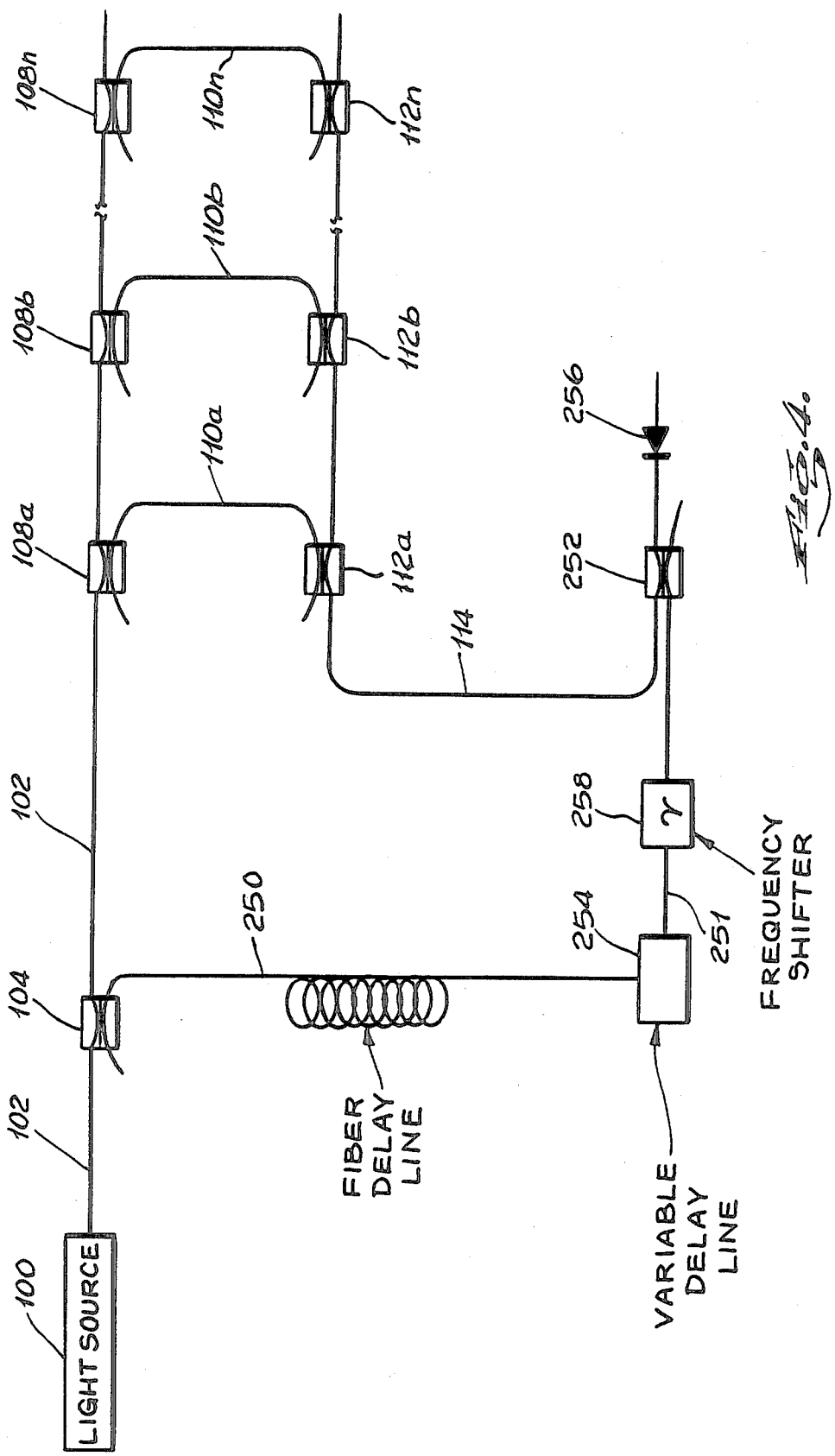

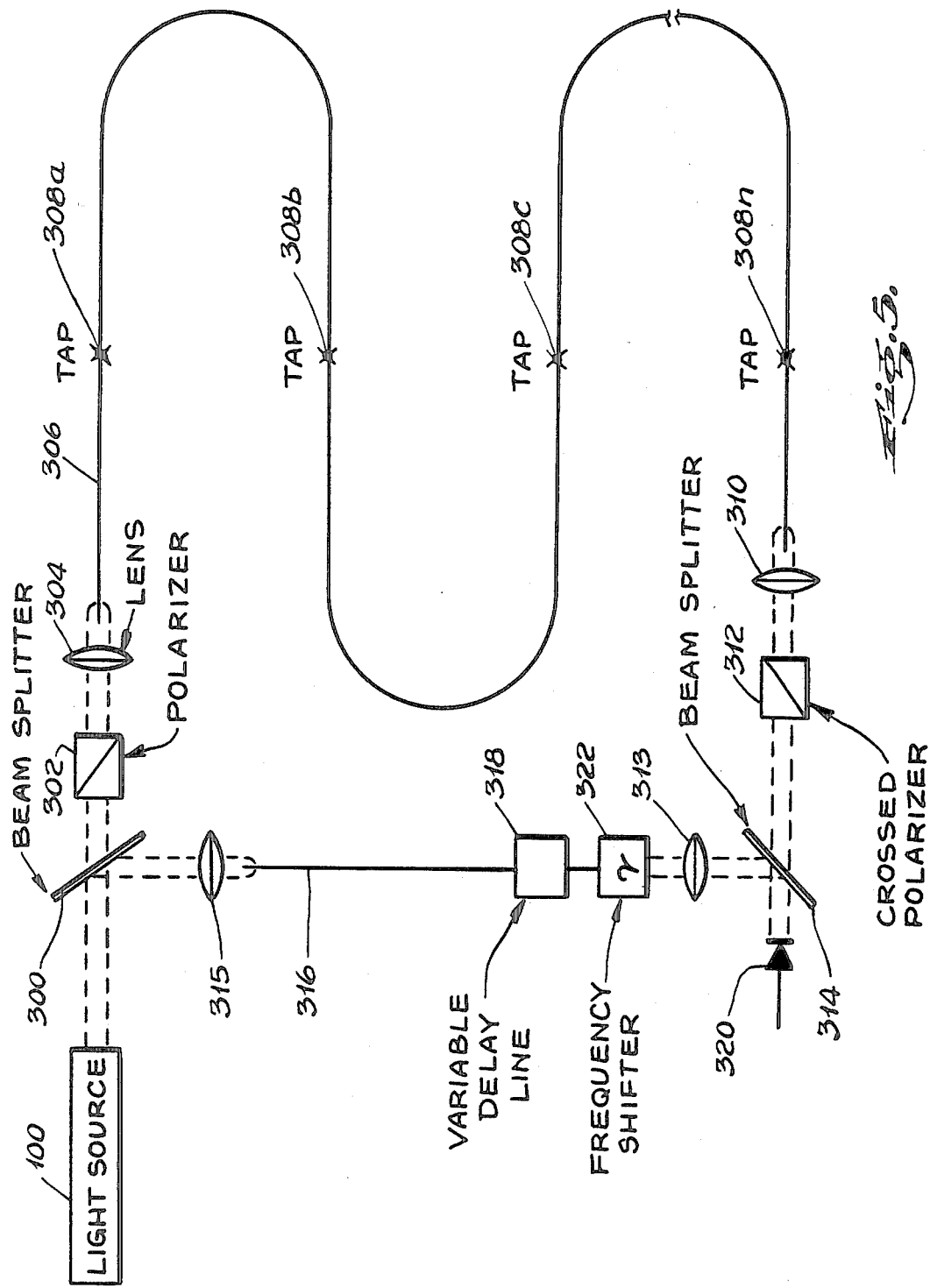

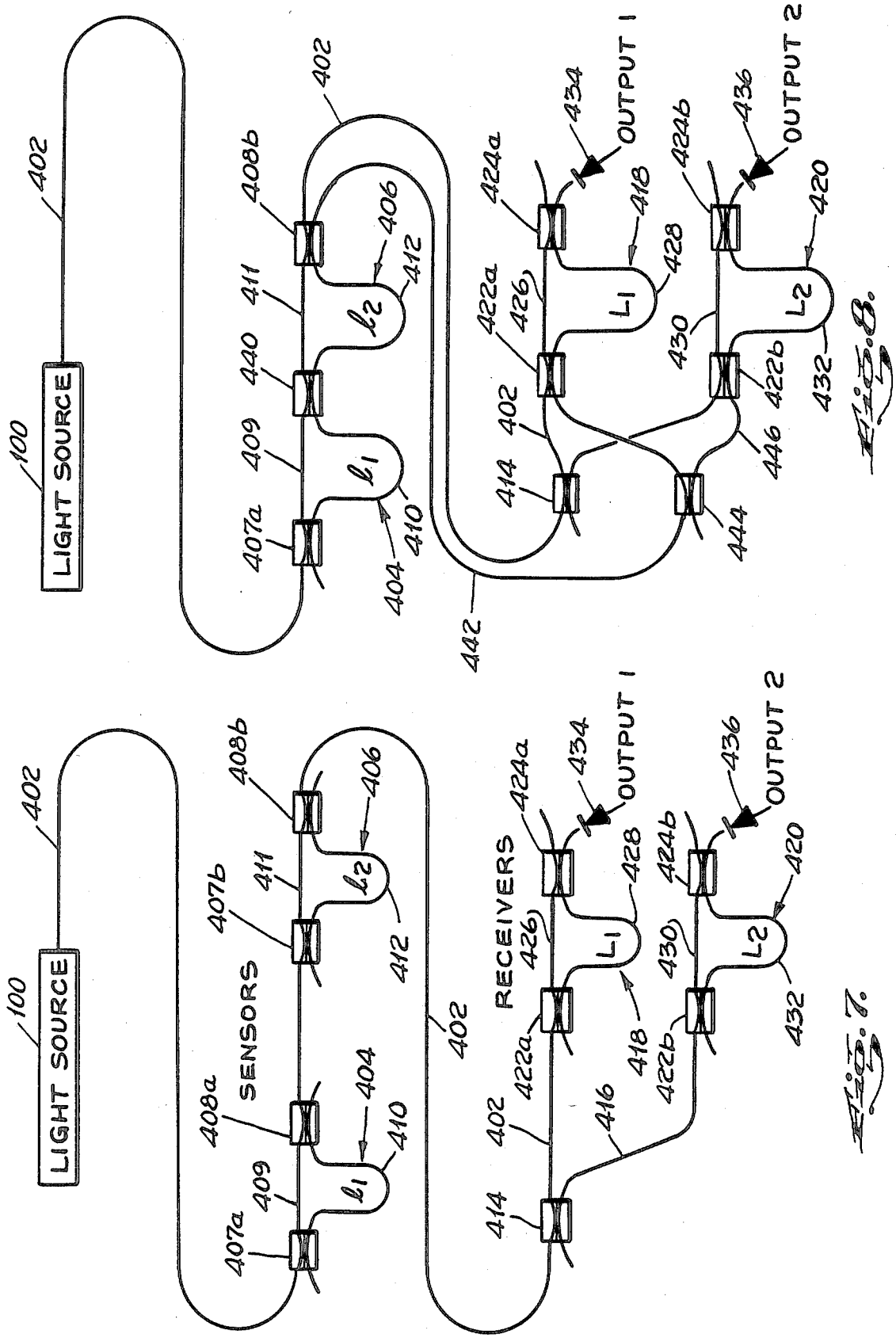

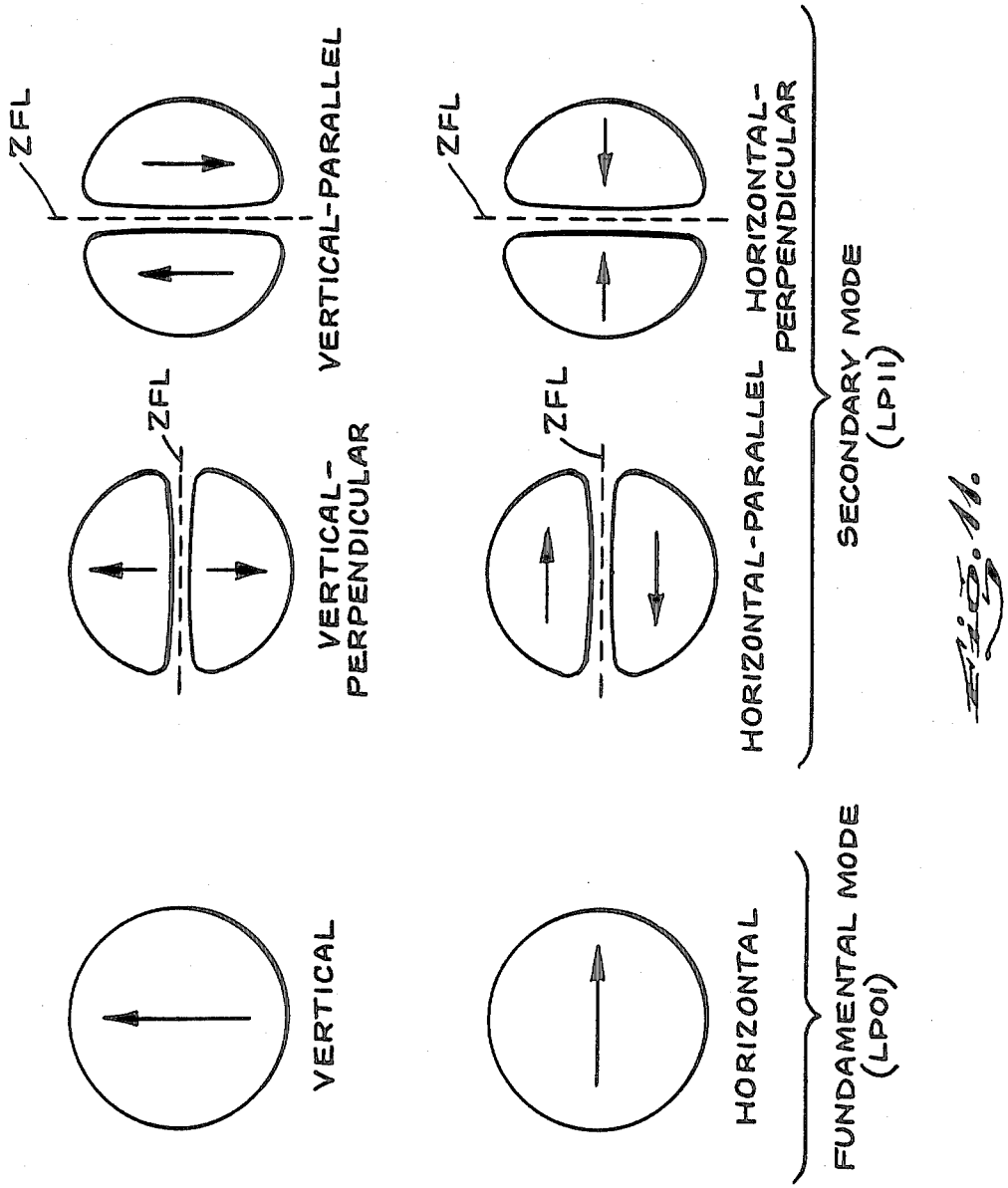

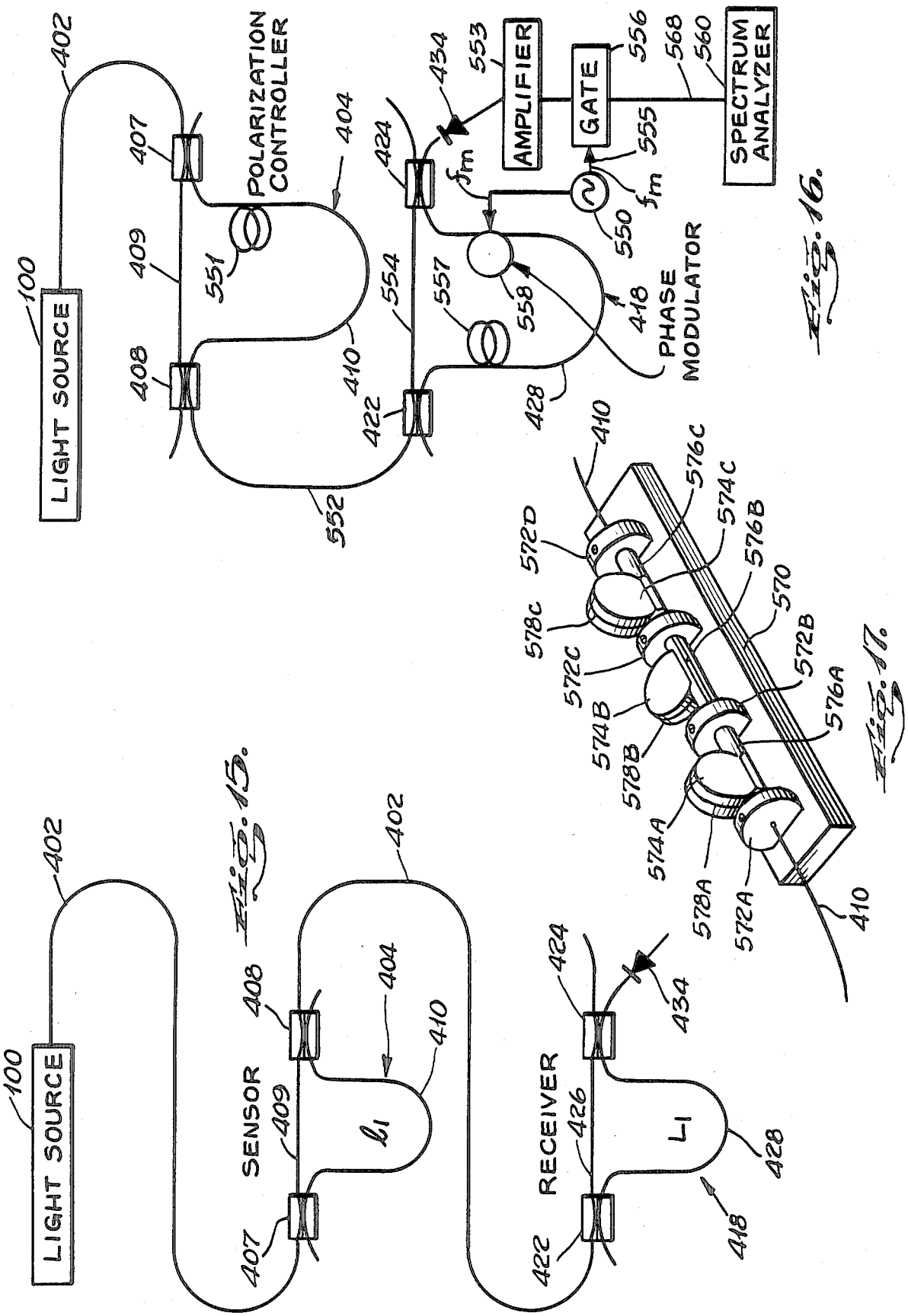

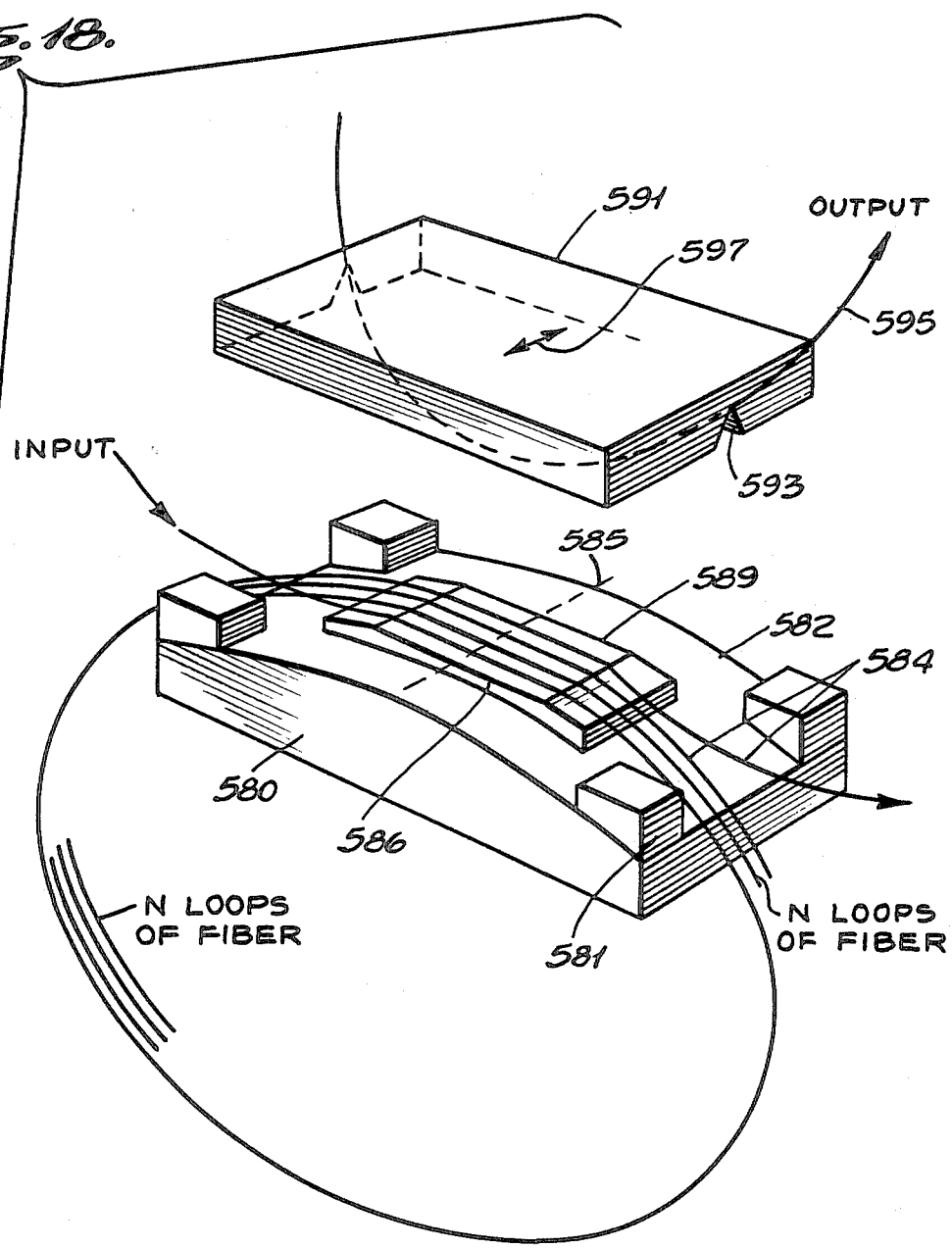

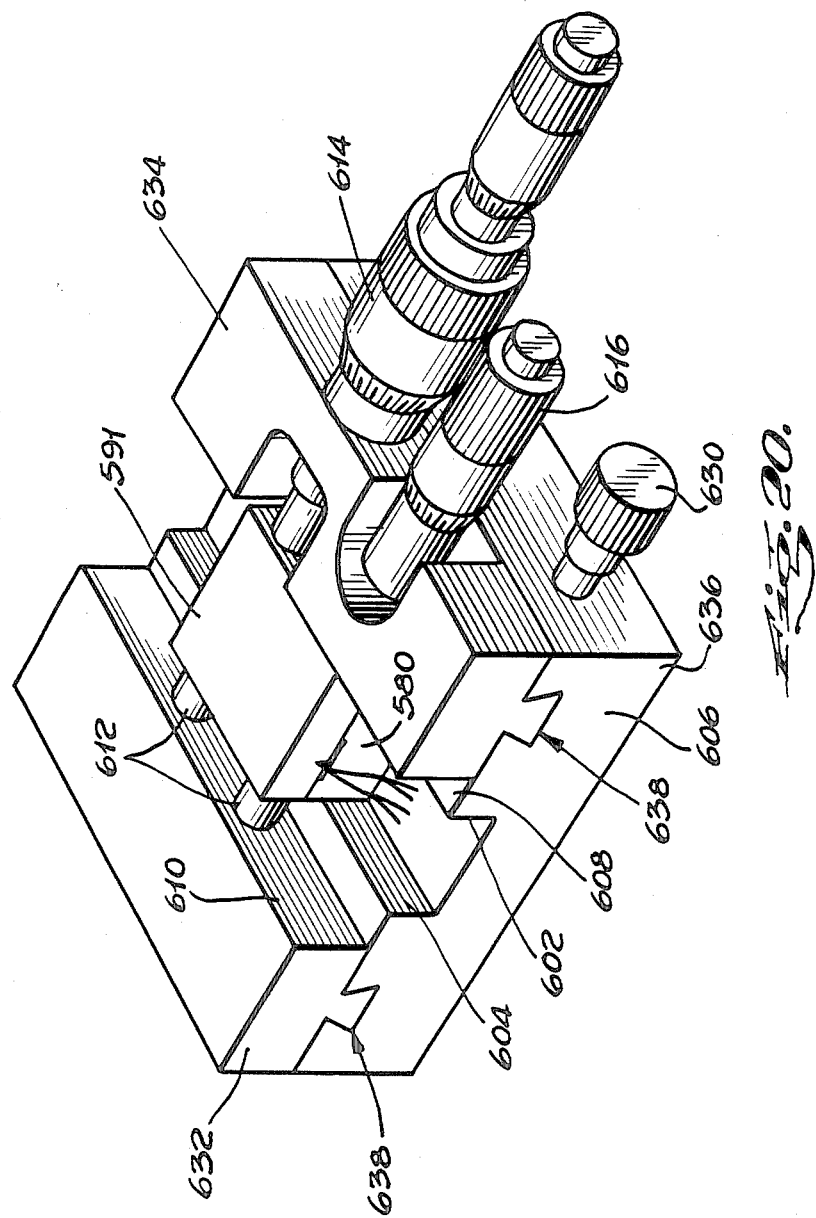

DISTRIBUTED SENSOR AND METHOD USING COHERENCE MULTIPLEXING OF FIBER-OPTIC INTERFEROMETRIC SENSORS

RELATED APPLICATIONS

This is a continuation-in-part of parent patent application Ser. No. 699,841 filed Feb. 8, 1985, inventors Janet L. Brooks et al., and entitled "Distributed Sensor and Method Using Coherence Multiplexing of Fiber-Optic Interferometric Sensors" now abandoned.

BACKGROUND OF THE INVENTION

The present invention relates to fiber-optic sensors, and particularly to distributed fiber-optic sensor arrays which utilize a short coherence length light source.

Over the past few years, fiber-optic devices have been actively studied and developed for use in various sensing applications in a wide range of fields. One reason for this interest is the sensitivity of optical fibers to environmetal conditions which surround them. For example, factors such as temperature, pressure, and acoustical waves directly affect the light transmitting characteristics of optical fiber. These changes in the optical fiber produce a change in the phase of light signals traveling in the fiber. Thus, a measurement of the change in phase of optical signals which have been transmitted through that fiber is representative of changes in those environmental conditions which have affected the fiber.

Recently, particular efforts have been directed to the development of systems having sensors organized in arrays, so that a number of sensors can utilize light from a single source, and provide environmental information at a common detection location. Ideally, such an array would consist of a fiber input bus which would carry light to a set of sensors. Each sensor would imprint information about the environment to this optical carrier. An output fiber bus would then collect this information and bring it back to a central processing location, where information obtained from any selected one of the sensors could be readily identified and analyzed.

The goal of these development efforts is to produce sensor arrays which could be used for specific applications such as monitoring rapidly changing environmental conditions. For example, such sensor arrays could be used to detect acoustic waves in order to determine the source location and acoustical characteristics of those waves. For many such applications, it may be necessary to space the arrays over a relatively large area. In these situations, the replacement of electrical lines by fiber optics, for example, would overcome problems such as electrical pickup, cable weight, and safety hazards associated with the use of those electrical lines. Even when the sensor is used in limited space, the removal of electronics and bulk optics components generally should provide improved system performance due to reduce noise. On the other hand, replacement of long electrical lines by optical fibers creates a problem in preventing or removing any influence of environmental conditions on the non-sensor portions of the system. This, therefore, becomes an important design consideration.

Of course, the primary design consideration in developing a sensor array is the method by which information from each sensor can be separated for individual identification from among all of the information arriving at the central processing location on the single data stream. Distributed sensing systems developed previously have generally applied one of two approaches for separating information of an individual sensor from a single data stream. The first approach comprises time-division multiplexing of the sensor outputs, as is described by A. R. Nelson and D. H. McMahon, "Passive Multiplexing Techniques for Fiber-Optic Sensor Systems," *I.F.O.C.*, Page 27, (March, 1981). In time-division multiplexing, the optical input most generally is pulsed so that the input signal comprises a pulse waveform. As a result each sensor produces a pulse which, as a consequence of the system geometry, is separated in time from the other sensor signals. Specifically, the optical input pulse communicated through each sensor is placed on the output fiber by each of the sensors at a different time. By controlling the relative position of the sensors, interleaving of the pulse signals may be accomplished as the signals are multiplexed from the sensors onto a return fiber bus. These interleaved pulse signals are then carried back to the central processing location where demultiplexing and further signal processing occur.

One problem which is inherent with this type of system is that the frequency at which the sensors may be monitored becomes limited by the number of sensors. Specifically, it is noted that a second pulse may not be transmitted from the optical source until a certain amount of time has passed. If the second pulse were transmitted through the sensor nearest the source before the optical signals from all sensors had passed the output terminal of that sensor, it is possible that signals resulting from the second pulse could pass through the first sensors in the array and be placed on the return bus prior to the passing of optical signals produced from sensors near the end of the array. This would, of course, prevent the demultiplexing and signal processing equipment from determining the relationship between the pulse signal received and its associated sensor. Such systems are, therefore, often not useful in applications requiring rapid repeated sensing of environmental conditions by each of the sensors in the array.

The second approach which has been used for separating each sensor's information from the single data stream has been to frequency-division multiplex the sensor outputs, in the manner described by I. P. Giles, D. Uttam, B. Culshaw, and D. E. N. Davies, "Coherent Optical-Fibre Sensors With Modulated Laser Sources," *Electronics Letters*, Vol. 19, Page 14, (1983). This approach is accomplished by frequency ramping the optical source and arranging the array geometry so that the transit time of the light from the source to a sensor and back to the central location is unique for each sensor. In this case, the array output is mixed with the source's present output, thereby producing a unique central frequency for each sensor. The environmental information is carried in the sidebands about this central frequency.

One particular problem with the above-described system involves the "fly back" period when the periodic ramp signal is reset from its maximum to its minimum postion. This fly back period comprises a time when system operation may not occur, since no ramp signal is present, and no meaningful results would be produced. This places some limit on the rate at which environmental conditions may change and still be reliably monitored by the sensor system.

Another problem with this particular system is that the number of sensors which may be used in the array or the frequency range of the signals to be detected are limited based on the range of FM frequencies which are utilized in the ramp signal, and on the period of the ramp signal. More specifically, since a different central frequency is produced for each sensor, the amount of difference between each such central frequency and the overall range of frequencies within which these central frequencies are contained dictates the number of sensors which may be utilized. Equivalently, the number of sensors, together with the overall range of frequencies determine the maximum difference between central frequencies, and hence the maximum environmental frequencies which way be detected. The range of frequencies is, of course, determined by the slope and period of the ramp signal.

Another limitation experienced by both of the approaches described above is that they are limited to longer coherence length sources, since they require the use of interference between the original source signal and the signal produced by the sensor in order to identify the desired environmental conditions. Thus, both of those systems use either pulsed or ramped coherent sources for producing the optical signal.

The idea of using a short coherence length source to separate signals returning from a series of sensors has been proposed by S. A. Al-Chalabi, B. Culshaw, and D. E. N. Davies, "Partially Coherent Sources In Interferometric Sensors," *Proceedings of the First International Conference On Optical Fibre Sensors,* (I.E.E.E.), Page 132, (April, 1983). That reference discloses the use of a series of remote Mach-Zehnder interferometers with the difference in the length of the arms in each interferometer being greater than the coherence length of the source, so that there is no interference signal on the output of the interferometers. Two optical fibers connect the outputs of each interferometer to the inputs of the next interferometer. The output fibers of the last sensing interferometer are connected to the input ports of a single reference interferometer having a detector positioned on one of its output ports. The reference interferometer is constructed from bulk optical components and configured so that the delay in one of its arms is variable. The receiver varies the delay in the indicated arm, thereby effectively varying the length of the optical path through that arm to detect signals from each of the various interferometric sensors in the system. The reference interferometer must be constructed from bulk optical components rather than fiber so that its arm length can be varied enough to accommodate a significant number of sensors.

From the above, it becomes apparent that the Al-Chalabi et al. reference does not disclose a system which may continuously monitor each of the various sensors in a distributed system. Rather, the Al-Chalabi et al. system merely detects the environmental conditions sensed by any single sensor at a given time. The environmental conditions on all the sensors can be detected only periodically by monitoring each sensor sequentially. The frequency with which this can be done is limited by the speed with which the length of the variable arm of the receiver can be varied.

Another problem with this system is that the $\pi/2$ phase shift which occurs when light couples between two fibers becomes important. Light from one input port of a sensing interferometer enters the longer arm delayed by $\pi/2$ relative to light entering the shorter arm. Light from the second input port enters the shorter arm with a relative delay of $\pi/2$ radians. This difference in relative delays leads to cancellation between the signals associated with light entering each of the two input ports, so that if all couplers are set to a coupling efficiency of 50%, then only the first sensor will produce any signal at all.

Based on the above, it would be an important improvement in the art to provide a sensing system and technique for multiplexing a plurality of remote sensors without being subject to the above-identified restrictions which are inherent in the time-division and frequency-division multiplexing schemes used in the past. Thus, the improved system should optionally be time-independent, so that substantially continuous monitoring of each of the sensors is possible. Such a system should provide for operation without requiring use of electronics or active devices in the environmental sensing region. Preferably, such a system should permit use of any of a wide range of optical sources, and should be both simple and economical to produce and use in actual application.

BRIEF SUMMARY OF THE INVENTION

The present invention comprises a coherent distributed sensor system and method which preferably uses a short coherence length light source for accomplishing coherence multiplexing of an array of fiber-optic sensors. More specifically, the sensor system of the present invention generally comprises a short coherence length optical source which is optically coupled to a first plurality of waveguide segments which define at least a portion of first and second light paths for light coupled from the light source. The first and second light paths are influenced by an environmental effect at first and second locations. At least one second optical waveguide segment is provided for propagating light through at least a portion of third and fourth light paths. The third and fourth light paths are substantially equal in length, respectively, to the first and second light paths, but the third and fourth light paths are not subject to the same environmental effect as the first and second light paths. A third optical waveguide segment is optically coupled to one of the first plurality of optical waveguide segments and to the second optical waveguide segment so that light from the first plurality of waveguide segments is propagated to the optical connection with the second waveguide segment only through the third optical waveguide segment. Means are provided for combining light from the first, second, third and fourth light paths, and for coherently coupled light only from return bus. Light is optically coupled from the return bus by couplers positioned along another portion of its length onto a plurality of optical fibers comprising taps. The difference between the lengths of each of the light paths defined by the input fiber-optic bus, an individual sensor, and the fiber-optic return bus is much greater than the coherence length of the optical source, so that intensity modulation does not occur when the light from each sensor is collected onto the fiber-optic return bus.

Light from the return bus tap line is mixed with light which has been tapped from the delay line by optical fibers positioned at specific locations along the delay line. These fiber taps are positioned such that the delay line and each optical fiber tap line define an optical path length substantially equal to the associated input bus, sensor, output bus and tap path length. The delay line or reference arm is shielded from the environment, so that each detector measures environmental information consisting of the difference in the phase between the light which traveled through the sensor light path, and that which traveled through the corresponding delay line.

In general, the signal measured by a detector includes environmental information associated with the input and return buses, as well as the sensor. This is usually undesirable. Two solutions to this problem are possible: either the fibers in the input and output buses are shielded; or by electronically subtracting the signals received in adjacent detectors, difference signals are provided which are independent of phase variations induced on the buses, except in the region between the corresponding sensors. As a result, this difference information relates directly to the environmental conditions which influenced the particular sensor. light paths substantially equal in length to a specific one of the first and second paths at any time. In at least one preferred embodiment of the invention, the third and fourth light paths do not exist simultaneously.

Optically coupled to the means for combining light are electronic detectors which receive the coupled light therefrom. The coherently coupled light comprises a phase difference signal corresponding to the difference in phase between light which traveled through a selected one of the first and second light paths and light which traveled in the third or fourth optical path which is of similar length. This phase difference is representative of the environmental conditions affecting the selected light path in the sensor system. The detectors are typically interconnected to other information processing devices for monitoring and evaluating the particular environmental conditions which have been detected.

In one preferred embodiment, the invention comprises a "parallel" configuration in which light from a short coherence length laser is launched into a single-mode fiber, and then split by a directional coupler along two paths. The portion of the light taking the first path enters an input fiber-optic bus and is distributed to a plurality of optical fibers or other components such as electronic transducers comprising sensors which are each optically connected at one terminal to the input fiber-optic bus, and which are connected at their other terminal to a fiber-optic output bus, thereby forming a ladder configuration. The portion of light taking the second path enters a fiber-optic tapped delay line and acts as a reference signal.

Each sensor imprints environmental information onto the light passing therethrough in the form of modifications to the optical phase. Light from each of the sensors is optically coupled onto the fiber-optic In another preferred embodiment, the above-described system is modified by providing no fiber-optic delay line. Instead, a Mach-Zehnder interferometer is constructed on the fiber-optic return bus, and signals from the light source are pulsed onto the fiber-optic input bus. The pulses are timed such that the return pulses from the sensors do not overlap with each other or with pulses from the next sampling of the array. The arms of the Mach-Zehnder interferometer are of different lengths, with the difference in the arm lengths being equal to the difference in path lengths between each two adjacent sensors. Consequently, the interferometer causes mixing of the outputs of adjacent sensors and, again, the gradient of the environmental parameter is measured. A frequency shifter can be placed in one arm of the Mach-Zehnder interferometer to produce a heterodyned output.

Still another preferred embodiment comprises a modification of the parallel system described initially, wherein the optical fiber delay line includes variable delay capability, and wherein the delay line is optically coupled at its end to the return bus from the sensor ladder network. The output signal produced by the coupled delay line and return bus produces a phase difference signal which at any given time is representative of environmental conditions affecting a sensor which is part of an optical path whose length substantially matches the reference signal path length through the delay line at that time. By rapidly varying the optical path length of the variable delay line, the system can be rapidly scanned so that each sensor can be monitored without pulsing the input from the light source. Optionally, a frequency shifter can be placed in the variable delay line to produce a heterodyned output.

A feed forward embodiment of the system described immediately above may be provided by utilizing birefringent fiber as the input optical fiber, with the two polarization axes of that fiber acting as the input and output buses. Taps are placed along the fiber to couple the light between these two polarization axes. Since the two polarization axes of this configuration have very similar group velocities, the variable delay line does not have to scan over a large range, yet lasers exist with a coherence length short enough that taps can be placed reasonably close without affecting each other appreciably.

Still another preferred embodiment comprises use of a parallel system as initially described wherein the fiber-optic return bus is directly connected at its end to the end of the fiber delay line, and wherein the light source produces pulsed optical signals which are directed through a beam splitter or directional coupler and thereby divided between the input optical fiber and the fiber delay line. The light pulse that enters the array from the input optical fiber samples the environment through the sensors earlier than the pulse which is communicated through the fiber delay line. The pulses placed on the input and return buses by a selected sensor will return and interfere at the beam splitter or coupler. Since these pulses passed through the sensor at different times, the interference signal they produce will comprise a representation of the change in the sensor over time. The signal produced by the interfering pulses will be communicated from the beam splitter or directional coupler to a detector. Optionally, the other optical fiber can comprise one arm of a Mach-Zehnder interferometer which includes a fiber delay line in its second arm, and a frequency shifter for heterodyning the output, and for viewing the gradient of the changes in environment as they influence each sensor with time.

A further preferred embodiment of the present invention comprises a "series" configuration of the array. In this configuration, light is launched through a single-mode fiber, and into a series of Mach-Zehnder interferometers which have arms of different lengths. Each of the interferometers comprises one of the sensors in the array. The sensors are constructed by using directional couplers to split the light, with the coupling constant of each coupler being prescribed by the number of sensors in the system. The optical path differences through the various sensors are chosen to be much longer than the source coherence length, so that a change in the relative phase between the arms of the interferometer will not be converted into detectable intensity modulation at the sensor outputs. The information imprinted on the light in each sensor is the difference in phase between the light traveling in the two arms of the interferometer.

The light from the sensors is transmitted via a common fiber-optic bus to a number of receiving Mach-Zehnder interferometers, each having two arms whose lengths differ by an amount which substantially matches the arm length difference of a corresponding one of the sensors. Thus, each sensor preferably has a receiving interferometer with a corresponding arm length difference. As a result, the phase modulation signal from the sensor is converted to amplitude modulation by the receiving interferometers, so that photodetectors at the output of each receiving interferometer may monitor the amplitude modulation corresponding to the phase modulation of its associated sensor and produce a signal representative of the environmental conditions which influenced that sensor. This configuration is lead insensitive since the signals are carried on a common fiber except while in the sensor or receiving interferometer. Thus, environmental shielding is needed only on the receiving interferometer in order to obtain signals which, if proper techniques are used to avoid signal fading, directly reflect changes in the selected sensor.

One more preferred embodiment of the invention comprises a hybrid arrangement wherein the light signal from the laser diode is passed through an input fiber to a series of optical sensors configured in a ladder arrangement, with each sensor comprising a Mach-Zehnder interferometer. The output from each sensor is combined on a return bus in the manner initially described with respect to the parallel configuration. However, the return bus is optically coupled to communicate the combined signals from the sensors to a plurality of Mach-Zehnder receiving interferometers, organized in an arrangement such as that described above for the series configuration. This system exhibits lead insensitivity similar to the series system.

For each of the "series" embodiments and the hybrid arrangement described above, functionally related embodiments of the invention may be provided by replacing the two optical fibers which define each Mach-Zehnder interferometer by a highly birefringent single mode fiber or by a two-mode fiber which comprises the interferometer. In the single mode fiber, the two optical paths of each interferometer are defined by the two orthogonal polarization modes which are present therein. Coupling devices and/or polarizes are utilized on the fibers connecting the sensors to each other or to the receivers, in order to combine the optical signals traveling on the orthogonal paths onto a single path in those segments of the system. In the case of the two-mode fiber, the two spatially orthogonal modes (fundamental and second order) are utilized for defining the two light paths of each interferometer. By utilizing the appropriate coupling arrangements between the two-mode fiber and interconnected elements, and with use of other components such as mode strippers, the two-mode fiber configuration provides the single signal transmission path which is necessary between the sensors and receivers. By utilizing the orthogonal modes of these birefringent or two-mode fibers, the optical path difference beomes a given small fraction of the actual fiber length, that fraction being the ratio of the wavelength to the beat length between the two orthogonal modes. As a result, the tolerance in matching the optical path lengths of sensing and corresponding receiving interferometers is much less stringent than for the embodiments utilizing separate fibers to define the Mach-Zehnder interferometers.

The present invention also includes a novel apparatus and technique which may be utilized in several of the configurations of the invention to provide a heterodyne-like output signal, without the use of an optical frequency shifter. In heterodyning, the frequency of the signal is shifted so that the information contained by the signal is carried on sideband frequencies of the resulting non-zero center frequency. Heterodyning is desirable since it overcomes the problem of signal fading due to low frequency environmental influences on the fiber. In addition, the heterodyned signal can be readily evaluated by use of conventional electronic equipment such as spectrum analyzers, FM demodulators or phase detectors. The present invention avoids the use of a frequency shifter for heterodyning by providing a phase modulator in the receiver portion of the sensor, together with a signal processing technique for turning the resulting phase modulated signal into a frequency shifted electronic signal.

The phase modulator is operated at a frequency much higher than that of the signal in the sensor. A switching component, such as a gate, is used to modulate the electronic signal from the optical detector, in a manner synchronized to the operation of the phase modulator. Thus, the output signal from the receiver effectively multiplies the detected signal by a square wave at the higher modulation frequency, mixing the harmonics of that modulation frequency in the signal. Since odd and even harmonics never simultaneously fade, it is possible to eliminate signal fading by mixing the two harmonics as described. When the modulation amplitude of the phase modulator and the synchronization of the gate are adjusted appropriately, the output signal will contain a heterodyne-like signal around one of the modulation frequency sidebands.

The distributed array sensors of the present invention comprise a system and technique for multiplexing remote sensors which is accurate, and which is optically time-independent so that substantially continuous monitoring of each sensor is possible, permitting detection of rapidly changing environmental conditions which influence the sensors. The invention permits use of optical sources having a short coherence length, thereby including a wide range of commercially available lasers which are less expensive and more compact than those having longer coherence lengths. Further, the invention preferably accomplishes its purpose in an all fiber-optic configuration, eliminating unnecessary electronic components which degrade system performance by reducing reliability and increasing complexity. The system can be configured to be lead insensitive, permitting use of long lines between sensors without the need for environmental shielding of those lines. The invention also includes a technique for effectively heterodyning the output signal, which removes the need of frequency shifters in each receiving interferometer, thereby further reducing the cost and increasing the accuracy of the sensing system.

BRIEF DESCRIPTION OF THE DRAWINGS

FIG. 1 is a schematic drawing of one preferred embodiment of a coherent distributed fiber-optic sensor system in a parallel configuration.

FIG. 2 is a sectional view of one embodiment of a fiber-optic directional coupler for use in the distributed sensor system of the present invention.

FIG. 3 is a schematic drawing of another preferred embodiment of the coherent distributed sensor system of the present invention, including a pulsed optical source and a Mach-Zehnder interferometer coupled to the return bus from the parallel sensor ladder arrangement.

FIG. 4 comprises another preferred embodiment of the coherent distributed sensor system of the present invention, including a variable delay line connected to the return bus from the sensor array.

FIG. 5 is a schematic drawing of still another preferred embodiment of the coherent distributed sensor system of the present invention, comprising a feed-forward arrangement using a birefringent fiber for the sensor array, wherein the two signal paths in the parallel arm comprise the two polarization axes of the birefringent fiber.

FIG. 7 is a schematic diagram of still another preferred embodiment of the coherent distributed sensor system of the present invention, illustrating the principle of operation of a series configuration of the sensor array.

FIG. 8 is a schematic drawing of another preferred embodiment of the coherent distributed sensor system of the present invention, comprising a modification to the series configuration of FIG. 7, wherein the fibers from both ports of each sensor are continued to form the next sensor.

FIG. 11 is a schematic diagram illustrating the electric field patterns of the first and second order modes, $LP_{01}$ and $LP_{11}$, respectively, of a nonbirefringent fiber.

FIG. 15 is a schematic drawing of a simplified version of the series configuration of the coherent distributed sensor, including a single sensor and a single receiver.

FIG. 16 is a schematic drawing of a simplified version of the series configuration of the coherent distributed sensor, illustrating a technique for frequency shifting the output signal from distributed sensors using phase modulators and gates.

FIG. 17 is a perspective view of one embodiment of a fiber-optic polarization controller for use in the distributed sensior of the present invention.

FIG. 18 is an exploded perspective view of a device which combines a discreetly variable delay line with a continuously variable delay line.

FIG. 20 is a perspective view of a fixture used for adjusting the path length of the variable delay line.

DETAILED DESCRIPTION OF THE PREFERRED EMBODIMENT

Figure 6:
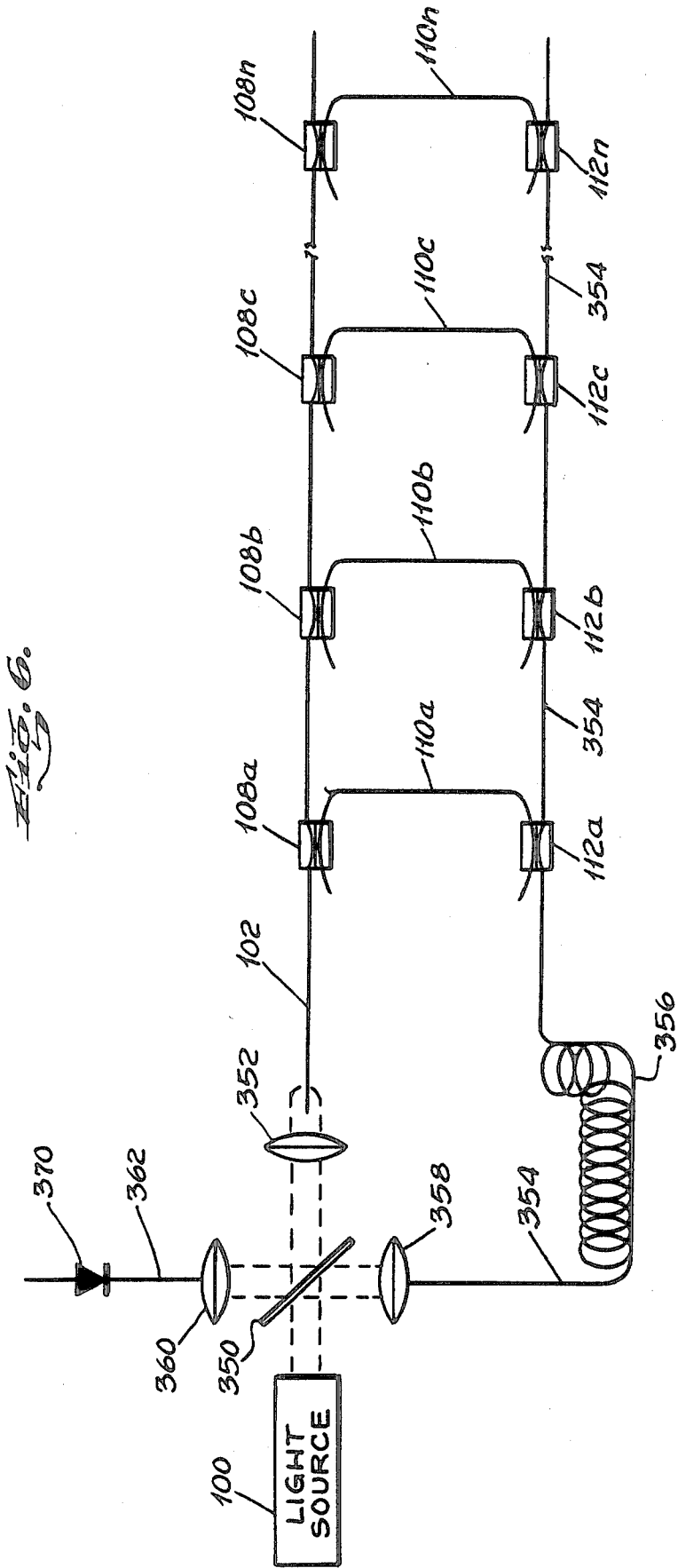
FIG. 6 is a schematic drawing of another preferred embodiment of the coherent distributed sensor system of the present invention, illustrating a parallel arrangement which measures the time derivative of the environmental parameter.

The invention is best understood by reference to the figures wherein like parts are designated with like numerals throughout.

The Parallel System

FIG. 1 illustrates one preferred embodiment of a "parallel configuration" comprising a sensor array system for monitoring environmental conditions influencing a plurality of distributed sensors. A light source 100, such as a laser diode, which preferably has a short coherence length is utilized in this embodiment.

Coherence length means the length over which signal interference effects in the axial direction may be obtained. Those skilled in the art will appreciate that the coherence length ($L_c$) may be defined, for at least some types of laser sources, by the following relationship:

$$v_g/2\pi\Delta f=L_c \qquad (1)$$

where:
2Δf=optical bandwidth at ½ maximum power; and
$v_g$=group velocity of light in an optical fiber.

Thus, from Equation (1) it becomes apparent that the coherence length increases as spectral purity of the laser improves. It will also be appreciated by those in the technology that, in comparison to the prior art systems requiring longer coherence length sources, a sensor system which can utilize short coherence length signal sources comprises a versatile system in which any of a large number of laser light sources may be used, including relatively inexpensive and compact diode lasers.

In the embodiment shown, the light source 100 comprises an Aluminum Galium Arsenide (AlGaAs) laser which produces light having a wavelength on the order of about 790 nm. By specific example, the light source 100 may comprise a model NDL 3000 laser diode, commercially available from NEC Electronics U.S.A., Inc., 252 Humbolt Court, Sunnyvale, Calif. 94086.

The light source 100 is optically coupled to an optical fiber comprising fiber-optic input bus 102. Positioned upon input bus 102 is a first directional coupler 104, which couples some of the optical power to a second optical fiber comprising an optical delay line 106. In the illustrated embodiment, the directional coupler 104 is of the same type as other directional couplers utilized in the sensor system. One preferred embodiment of a directional coupler which may be used in the system is disclosed subsequently herein, and is described in detail in co-pending U.S. patent application Ser. No. 300,955, filed Sept. 10, 1981 entitled "Fiber-Optic Directional Coupler" which is a continuation-in-part of U.S. patent application Ser. No. 139,511 filed Apr. 11, 1980 entitled "Fiber-Optic Directional Coupler", both of said patent applications being assigned to the assignee of the present invention. These co-pending applications are hereby incorporated by reference.

A plurality of directional couplers 108a, 108b, . . . 108n are also positioned at selected locations along the fiber-optic input bus 102. The basis for selecting the locations of couplers 108 on input bus 102 will be explained more fully subsequently.

A plurality of optical fibers 110a, 110b, . . . 110n each have a first end extending through ports of a corresponding optical coupler 108a, 108b, . . . 108n. The optical fibers 110 comprise fiber-optic sensors which are positioned in the environment so as to be sensitive to, and influenced by, changes in the environmental conditions surrounding the sensors 110. Of course in this, as well as substantially all other embodiments of the invention, devices such as transducers could be connected to the optical fibers in the system and be utilized as sensors 110 for responding to environmental effects by influencing the flow of light through those optical fibers. For example, an acoustic transducer could be connected to an optical fiber 110 to increase acoustic sensitivity of that fiber.

The second end of each of the sensors 110 passes through one of a plurality of directional couplers 112a, 112b, . . . 112n. Couplers 112 are positioned at selected locations on a fiber-optic return bus 114, bringing the sensors 110 into optical coupling relationship with the return bus 114. It will be appreciated that the above-described relationship defines a ladder network for the sensor arm of the sensing system.

Also positioned on return bus 114, but spaced from the sensor ladder network, are a plurality of directional couplers 116a, 116b, . . . 116n. Each of the couplers 116 are also positioned at selected locations along return bus 114, as will be explained more fully hereinafter.

Secured within each directional coupler 116 so as to be optically coupled to return bus 114, is a first end of one of a plurality of optical fiber segments 118a, 118b, . . . 118n. Secured to the second end of each of the optical fiber segments 118 is a directional coupler 120a, 120b, . . . 120n. Also secured within each of the directional couplers 120 is the end of one of a plurality of additional optical fiber segments 122a, 122b, . . . 122n. Each of the optical fiber segments 122 are secured at their other ends to directional couplers 124a, 124b, . . . 124n which are each positioned at selected locations along delay line 106 so as to couple optical signals from the delay line 106 to the fiber segments 122.

Optically connected to the second end of each fiber-optic segment 118 or 122, is a detector 126a, 126b, . . . 126n. Detectors 126 function to receive the optical signal from fibers 118 or 122 after the signals in fibers 118 and 122 are coupled in couplers 120. Specifically, one preferred embodiment of a detector for use in the system of the present invention may comprise a model HAD1100 detector, commercially available from E. G. & G. Corp., 35 Congress Street, Salem, Mass., 01970.

The various components of the system of FIG. 1 are located in the system as a function of the coherence length of the light source 100. Specifically, the difference between the lengths of the optical paths through the sensors as measured between the couplers 108a and 112a must be greater than one coherence length of the light source 100 so that intensity modulation does not occur when light transmitted from light source 100 through each of the sensors 110 is collected on the fiber return bus 114. Thus, the optical path length of sensor 110b defined from coupler 108a to coupler 108b and through fiber 110b to coupler 112b to coupler 112a must be at least one coherence length ($L_c$) of the light source 100 greater than the optical path length of sensor 110a defined from coupler 108a through fiber 110a to coupler 112a.

The lengths of each optical path defined by delay line 106 and the optical fiber segments 122 (indicated as $L_1$, $L_2$, . . . $L_n$) should substantially match the corresponding optical sensor path length ($l_1, l_2, \ldots l_n$). As mismatch increases between the path length of a given sensor ($l_n$) and the corresponding return path length ($L_n$), the ability of the sensed signal to interfere with the reference signal and produce an accurate phase difference signal is reduced, approximately exponentially.

In operation, an optical signal is provided from the light source 100 to the optical input bus 102. The optical signal in bus 102 is partially coupled by the directional coupler 104 into the fiber-optic delay line 106, where it functions as a reference signal. Portions of the optical signal continuing to travel through input bus 102 are coupled via couplers 108 to sensors 110, where environmental information is imprinted onto the light in the form of modifications to the optical phase caused by changes in sensors 110 as a result of those external environmental influences.

The optical signals from each of the sensors 110 are coupled via directional couplers 112 onto the fiber-optic return bus 114. It is noted that when the difference in the sensor optical path lengths are much greater than $L_c$, intensity modulation does not occur upon collection of the optical signals onto the fiber-optic return bus 114, and thus the signals do not interfere with one another.

The optical signals traveling down return bus 114 are partially coupled at each of the directional couplers 116 onto the optical fiber segments 118 where the signals are matched in couplers 120 against reference signals which have been coupled from delay line 106 via directional couplers 124 onto optical fiber segments 122 which are secured in the couplers 120. Since the sensor path length $l_n$ is substantially matched to the corresponding reference path length $L_n$, and assuming there is no influence on the signals due to losses in couplers and other elements of the system, the relative phase of the signals compared in couplers 120 should be unchanging unless environmental influences affect one of the optical paths. Preferably, the delay line 106 is shielded from environmental influences, while at least the sensor 110 portion of the sensor path is exposed to environmental influences. Thus, the phase difference signals transmitted through detectors 126 represent the environmental conditions which have influenced the phase of the optical signal transmitted through the associated sensor path.

Without shielding the input bus 102 and the return bus 114, each detector 126 sees not only the environmental information from each sensor 110, but also that information from the input bus 102 and the output bus 114. One way to obtain environmental information relating to particular sensors without shielding the input bus 102 and output bus 114, is to electronically subtract signals received by adjacent detectors such as 126a and 126b. The difference signal produced by such subtraction is independent of phase variations induced on the input bus 102 and output bus 114, since those phase variations would have been represented in both of the signals received from the adjacent detectors. The only information not common to both signals is the information placed on the signals while traveling separate paths through the different sensors 110a and 110b and the portion of input and output buses 102 and 114 between sensors 110a and 110b. Thus, the signal produced by such subtraction represents only how those phase variations which exist in the region between the adjacent sensors 110a and 110b change over this region. Thus, in response to any environmental effect which influences adjacent sensors identically, the subtraction process would produce no change in the output signal. In light of the above, it is seen that the embodiment of FIG. 1 provides a means by which the environmental influences on each sensor 110a, 110b, . . . 110n may be individually and continuously monitored.

In the embodiment of FIG. 1, as well as in the other embodiments described herein, a frequency shifter may optionally be positioned in the system, such as on delay line 106 of FIG. 1, between couplers 104 and 124a. The frequency shifter is utilized to shift the frequency of the optical signl on delay line 106, and therefore to "heterodyne" the matched optical signal detected by detectors 126. By heterodyning, the phase modulated optical signal returning from the sensor paths $l_n$ is carried on the output line entering the detectors 126 as a comparatively low frequency phase modulation of a higher frequency amplitude modulated optical signal. Heterodyning provides a method by which lower frequency environmental effects can be prevented from reducing the system's sensitivity to small signals in the desired frequency range. Thus, those environmental effects in the desired frequency range can more readily be identified.

One preferred embodiment of a frequency shifter which may be utilized for this purpose is a Bragg Cell modulator, which is well-known in the technology, many types of which are commercially available. Such frequency shifters are comprised of bulk optics, which are inserted into the system by separating the fiber. Light is coupled to and from such bulk optic devices by lenses. It becomes apparent that the use of bulk optics such as Bragg Cells for frequency shifters increases the system loss and reduces overall efficiency and quality of performance. Another technique for accomplishing heterodyning in the coherence distributed sensor of the present invention, without the necessity of frequency shifters and without experiencing the losses involved with the use of bulk optics, is described in detail subsequently with reference to FIG. 16.

With respect to the coupling of light signals in the present invention, a more detailed description of a preferred fiber-optic directional coupler which may comprise couplers 104, 108 and 112, for example, may be provided by reference to FIG. 2. Specifically, this coupler comprises two optical fiber strands labeled 150a and 150b in FIG. 2 of a single mode fiber-optic material having a portion of the cladding removed from one side thereof. The two strands 150a and 150b are mounted in respective arcuate slots 152a and 152b, formed in respective blocks 153a and 153b. The strands 150a and 150b are positioned with the portions of the strands where the cladding has been removed in close-spaced relationship, to form a region of interaction 154 in which the light is transferred between the core portions of the strands. The amount of material removed is such that the core portion of each strand 150a and 150b is within the evanescent field of the other. The center-to-center spacing between the strands at the center of the coupler is typically less than about 2 to 3 core diameters.

It is important to note that the light transferred between the strands at the region of interaction 154 is directional. That is, substantially all of the light applied to input port A is delivered to the output ports B and D without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially nondiscriminatory with respect to polarizations, and thus preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that the coupler may function as a beam splitter to divide the applied light into two optical paths, as is accomplished by coupler 104 of FIG. 1.

In the embodiment shown in FIG. 2, the coupler has a coupling efficiency which may be varied based on the positioning of the fibers with respect to each other. As used herein, the term "coupling efficiency" is defined as the power ratio of the coupled power to the total output power, expressed as a percent. For example, referring to FIG. 2, if light is applied to port A, the coupling efficiency would be equal to the ratio of the power at port D to the sum of the power output at ports B and D.

In the parallel configuration of the distributed sensor of FIG. 1, careful adjustment of the relative path lengths and of the coupling efficiencies of the couplers is required. One preferred embodiment of the invention which simplifies the system somewhat is illustrated in FIG. 3. In the configuration of FIG. 3, an optical signal is provided from light source 100 into fiber-optic input bus 102, where it is coupled via directional couplers 108a–108n into sensors 110a–110n, and then through couplers 112a–112n into the fiber-optic return bus 114. The difference in adjacent sensor optical path lengths should be greater than the source coherence length of the light source 100.

In the embodiment of FIG. 3, the optical source is pulsed to produce an input pulse 201 which is distributed to the various sensors 110 via input bus 102 and directional couplers 108a–108n. As the pulse 201 travels down line 102 and is distributed to the various sensors 110, a string of pulses 203 is produced on return bus 114 with each pulse in the strng coming from a different sensor 110. The spacing between each pulse in the string 203 is based upon the optical path difference between adjacent sensors 110. Thus, the first pulse in the string will correspond to the pulse which was communicated through sensor 110a, since this optical pulse had the shortest travel time between the light source 100 and the return bus 114. Likewise, the second optical pulse corresponds to the pulse provided from sensor 110b, since this pulse had the next shortest optical path length from the light source 100 to return bus 114. The spacing of the pulses in this embodiment is not based on the coherence length of the optical source since this pulsed system is not coherence dependent. Therefore, an optical source of any of a broad range of coherence lengths may be used in this embodiment.

Of course, the pulse length of the pulses from the light source 100 should be adjusted so that the return pulses from the sensors do not overlap with each other. Further, the pulses from light source 100 should be timed so that the return pulses from the sensors do not overlap with pulses from the next sampling of the array. For example, if the pulse length from light source 100 were too long, the length of the pulse communicated from sensor 110a onto return bus 114 may be such that the tail of the pulse would not be placed on bus 114 at coupler 112a before the leading edge of the pulse from sensor 110b passes through coupler 112a on return bus 114. Likewise, if the timing of the pulses from light source 100 is too close together, the output pulse from sensor 110a corresponding to the second pulse from the light source could be placed on the return bus 114 before the output pulse from sensor 110n corresponding to the first pulse from light source 100 passes couplers 112a on the return bus 114. In either of these situations, it would be virtually impossible for a detector, receiving the pulses from the return bus 114, to determine which sensor those pulses had been received from.

The string of pulses 203 is transmitted along fiber-optic return bus 114 to the input of a Mach-Zehnder interferometer 200 which is comprised of a pair of directional couplers 202 and 204 positioned on the fiber-optic return bus 114 so as to define a first arm 206 between the couplers. A second length of optical fiber 208 is secured at either of its ends in the couplers 202 and 204 so as to define a second arm of the interferometer between couplers 202 and 204. The difference in optical path lengths of arms 206 and 208 should substantially equal the difference between optical path lengths of successive sensors.

With the arm lengths chosen as described above, the pulses pass through interferometer 200 such that the portion of the first pulse from string 203 which traverses the longer arm 210 reaches coupler 204 at substantially the same time as does the portion of the second pulse from string 203 which traverses the shorter arm 206. Likewise, the portion of that second pulse which traverses arm 210 arrives at the coupler 204 substantially at the same time as does the portion of the third signal from string 203 which traverses arm 206. Thus, it is seen that the interferometer 200 will cause mixing in the optical coupler 204 of the output signals from adjacent sensors.

The mixed signal which is output from coupler 204 is communicated to detector 212 positioned on that portion of fiber 208 which extends beyond coupler 204. The detector 212 receives the mixed signal, which represents the gradient of the environmental parameter influencing the related sensor. Of course, connected to the output of the detectors for each of the embodiments is appropriate measuring equipment (not shown) of a type which is generally used in the technology for monitoring and evaluating such optical output signals.

A frequency shifter 210 may optionally be placed in one arm of the interferometer 200 to produce a heterodyned output as was previously described with respect to the embodiment of FIG. 1. In the embodiment illustrated in FIG. 3, the frequency shifter 210 is positioned in the arm 208 of interferometer 200.

Another preferred embodiment of the distributed sensor system is illustrated in FIG. 4. In this embodiment, a light source 100 such as a continuous wave optical laser is optically connected to a fiber-optic input bus 102, upon which is secured a directional coupler 104. Also secured in spaced relationship along input but 102 are a plurality of optical couplers 108 which optically connect bus 102 to a plurality of sensors 110, which themselves are optically coupled via a plurality of optical couplers 112 to a fiber-optic return bus 114. This configuration corresponds to the ladder network of the sensor arm of the embodiment illustrated in FIG. 1. Again, like the system of FIG. 1, the difference between the optical path lengths of adjacent sensors should be greater than the source coherence length of light source 100.

Secured in coupler 104 so as to be in optical coupling relationship with input bus 102 is one end of a fiber-optic delay line 250. From directional coupler 104, the fiber-optic delay line 250 is optically connected to a variable delay line 254. The variable delay line illustrated may be comprised of bulk optics. For example, a rotatable mirror arrangement may be used to change the optical path and, thus, vary the signal delay. For small variations in length, a portion of the fiber 250 may be secured about a piece of PZT which is caused to expand or contract as desired to stretch or reduce the optical path length of fiber 250.

Preferably, an all fiber-optic delay line may be utilized in the present invention. One preferred embodiment of a fiber-optic variable delay line which may be used with the present invention is disclosed in co-pending patent application PCT/U.S. 82/01609, filed Nov. 12, 1982 and entitled "Continuously Variable Fiber Optic Delay Line". This application was published on May 24, 1984, as international publication number WO 84/02006. This application has been assigned to the assignee of the instant application. The variable fiber-optic delay line is also described in J. E. Bowers et al., "Fibre-Optic Variable Delay Lines", *Electronics Letters*, Vol. 18, No. 23, Pages 999–1000. (Nov. 11, 1982). The above references are hereby incorporated herein by reference. A preferred embodiment of the fiber-optic delay line referred to in these references is described in more detail subsequently.

Variable delay line 254 is optically connected to one end of another optical fiber 251 which is secured at its other end in coupler 252, thereby being in optical coupling relationship with the return bus 114. A detector 256 is optically connected to the end of return bus 114 or to fiber 251 so that it receives the interference signal produced by the coupling of the signal from bus 114 and the signal from line 251 in coupler 252. Other equipment for processing and evaluating optical signals may be connected to detector 256.

In operation, a continuous wave optical signal is communicated from light source 100 through input bus 102 to coupler 104. A portion of the optical signal continues to travel on input bus 102, and is transmitted via couplers 108 through sensors 110 and couplers 112 to the fiber-optic return bus 114 in the manner previously described with respect to FIG. 1.

From coupler 104, a portion of the optical signal from light source 100 travels through delay line 250, through variable delay line 254, and through optical fiber 251 to coupler 252, where it interferes with the signal on return bus 114 to produce a signal comprising the phase difference between the signals on bus 114 and fiber 251.

The variable delay line 254 is operated so as to effectively change the optical path length of fiber delay line 250, thereby bringing the optical path length of delay line 250 into a match, at some point, with each of the various optical paths defined through the sensors 110. At that point, the optical signal from a particular sensor 110 interferes with the signal on line 251, producing the phase difference signal as described above, providing information defining the environmental conditions influencing that sensor. The frequency at which each sensor is monitored in this manner is dependent upon the rate at which the variable delay line 254 is operated. Such a scheme is less feasible when the relative delays between signals of the various sensors are large, since the variable delay lines 254 would need a large range in order to match the optical path lengths of all of the paths defined by the various sensors.

Optionally, a frequency shifter 258 may be included in the fiber delay line 250 of the embodiment of FIG. 4, thereby providing a heterodyned signal as was previously discussed with respect to FIG. 1.

Although the embodiment of FIG. 4 may not be available for use with sensor systems involving large relative delays between sensors, it is ideal for a feed forward system such as that illustrated in FIG. 5. Referring specifically to FIG. 5, this embodiment of the system comprises a light source 100 providing an optical signal which is transmitted to a beam splitter 300, which is optically connected so as to transmit at least a portion of the optical signal to a polarizer 302. In one preferred embodiment, polarizer 302 comprises a bulk optics polarizer, such as a piece of sheet polarizer, which is placed in line with the optical signal so as to polarize the signal in a desired direction. From polarizer 302, the signal passes through a lens 304 which directs the optical signal into the end of a birefringent optical fiber 306.

Birefringent fiber 306 includes two polarization axes which function to carry the polarized light in much the same manner as the input and return buses 102 and 114 in the parallel systems described above. Optical taps 308a–308n are positioned in the birefringent fiber at selected locations in order to couple the polarized optical signals between the two polarization axes of the fiber. As with those embodiments of the parallel system which do not utilize a pulsed laser light source, the difference in optical path lengths between the light source and each of any two adjacent taps should be greater than the source coherence length of the light source. One preferred type of tap which may be utilized in the embodiment of FIG. 5 is described in detail in R. C. Youngquist, J. Brooks and H. Shaw, "Birefringent-Fiber Polarization Coupler," *Optics Letters*, Vol. 8, Page 656, (December, 1983). This reference is hereby incorporated herein by reference. Further, the tap disclosed in this reference is described in more detail subsequently with respect to FIGS. 27 and 28.

The output of the birefringent fiber 306 is transmitted through a lens 310 so as to communicate it to a crossed polarizer 312, comprising a polarizer which may be identical to polarizer 302 except that it is oriented at right angles with respect to the polarizer 302, thereby prohibiting the passage of any light of the polarization which was not stopped by polarizer 302. Thus, the light which is passed through crossed polarizer 312 comprises a group of non-interfering optical signals which each identify the environmental conditions which have influenced particular portions of the birefringent fiber 306 through which they have traveled.

The output from the crossed polarizer 312 is communicated to another beam splitter 314 which can be identical to the beam splitter 300. A portion of the signal encountering beam splitter 314 is transmitted therethrough to a detector 320 which is, itself, interconnected to monitoring and evaluating devices (not shown) for detecting phase differences and for relating those phase differences to the environmental conditions which acted on the birefringent fiber to produce them.

Referring again to beam splitter 300, the portion of light communicated from light source 100 which is not passed through beam spitter 300, is communicated through another lens 315 which directs the signal into the end of an optical fiber 316. Fiber 316 is connected to a variable delay line 318 which may be of the fiber-optic type referred to previously, or it may be comprised of bulk optics by moving a mirror configuration in a manner which is well-known in the technology. From variable delay line 318, the optical signal is preferably transmitted through a lens 313 to the beam splitter 314, where it is mixed with the signal being transmitted from polarizer 312 with the resulting phase difference signal being received by the detector 320.

The light signal which is communicated from the beam splitter 300 through optical fiber 316 comprises a reference signal which is compared with the signal traveling a corresponding optical path length through fiber 308. In this manner, the system identifies shifts in phase between the two signals caused by environmental influence on the birefringent fiber. The various optical paths lengths through fiber 308 are provided in the reference signal arm of the device by use of the variable delay line 318. Thus, the reference signal arm scans the various fiber lengths of interest, producing optical signals which will interfere in beam splitter 314 with optical signals of a corresponding optical path length in fiber 308.

Because the two polarization axes of the birefringent fiber 306 have similar group velocities, the variable delay line does not have to scan over a large range, yet lasers do exist with a coherence length short enough that taps can be placed resonably close (about 1 meter apart) without affecting each other appreciably.

In the system of FIG. 5, environmental parameters can be detected which affect the two fiber polarizations differently. Optionally, a frequency shifter 322 can be provided between the output of variable delay line 318 and the beam splitter 314 to provide a heterodyned signal, as was described previously with respect to FIG. 1.

Referring to FIG. 6, another embodiment of the distributed sensor system is illustrated. The system of FIG. 6 is configured to measure the time derivative of the environmental parameter which is influencing the sensors. This system utilizes a pulsed light source 100 which can comprise either a continuous wave laser which is electronically or mechanically pulsed, or a self-pulsed laser. Light source 100 produces an optical signal comprising a pulse which is communicated to a beam splitter 350, such that at least a portion of the optical signal passes through the beam splitter 350 and through a lens 352, into an optical fiber input bus 102. The pulsed signal from input bus 102 is then communicated through couplers 108 to sensors 110 and then through couplers 112 to an optical return bus 354 which includes a delayed portion generally indicated at 356, which is located between the first sensor 110a and the return path to the beam splitter 350. The signal passes through the delay portion 356, and through a lens 358 to the beam splitter 350. A directional coupler could be used in place of beam splitter 350, negating the need for lenses 352, 358 and 360.

At the time the signal from light source 100 encounters beam splitter 350, a portion of that signal is transmitted downward through the lens 358 and into the fiber delay portion 356 of return line 354. Upon passing through the delayed portion 356, the signal is communicated through couplers 112 to sensors 110, and then through couplers 108 to the fiber-optic input bus 102. The signal is then transmitted through the lens 352 to the beam splitter 350. It will be noted that the pulse which travels from the input bus 102 through a given sensor 110 and then through the fiber delay line 356 back to the beam splitter 350, travels the same optical path as the pulse which travels first through the delay line portion 356 and then through that same sensor 110 back through the input line 102 to the beam splitter 350. Thus, the two pulses will arrive at beam splitter 350 at substantially the same time, interfering with one another and providing a signal at the output of the beam splitter 350 which comprises the phase difference of the interfering signal. Since these interfering signals entered the array at the same time, but passed through the same sensor at different times, the pulse which entered the array first will sample the environment earlier than the pulse which is delayed. As a result, the phase difference signal produced at the beam splitter 350 by the two interfering signals is representative of changes in the environment detected by the sensor over time.

The phase difference signal from beam splitter 350 is communicated through an optional lens 360 to a detector 370. Detector 370 may be connected to other conventional monitoring and evaluating equipment for use in determining the environmental conditions at the various sensors.

Optionally, a phase modulator 364 may be included on the return line 354 between lens 358 and the delay line 356. This phase modulator may be used to improve the sensitivity of the system in the manner well-known with respect to the Sagnac fiber-optic gyroscope. Such techniques are discussed, for instance, in R. Ulrich, "Fiber Optic Rotation Sensor With Low Drift", *Optics Letters*, Vol. 5, Pages 173–175, (1980), which is hereby incorporated by reference. Alternatively, the phase modulator may be used to generate a frequency shifted signal according to the method discussed herein with reference to FIG. 11.

It is noted that in the system of FIG. 6, like the arrangement of FIG. 3, the optical signal is a pulsed signal. Therefore, the positioning of the couplers 108 and sensors 110 is not dependent upon the source coherence length of the light source. However, like the pulsed configuration of FIG. 3, the pulses from light source 100 should be timed such that the pulses returning to beam splitter 350 from the sensors do not overlap each other, nor interfere with pulses produced by the next pulse from light source 100.

The geometry of the sensor system of FIG. 6 has the advantage that the light paths of the two signals transmitted from the beam splitter 350 are identical, and thus good interference of those two pulses is easily achieved. One drawback of this approach is that it is frequency dependent, in that changes in the environment which are slow compared to the relative pulse delay are difficult to detect. Long lengths of fiber would be necessary to detect slowly changing signals, such as audio signals.

Each of the embodiments described above define distributed arrays of fiber-optic sensors which may be monitored by use of a short coherence length signal source, while still allowing the output of the sensor to be heterodyned. Furthermore, the embodiments which utilize a continuous wave signal source provide a new technique for de-multiplexing the sensors. This technique comprises the separation of the sensors by a distance which is significantly greater than a coherence length of the optical source, and then judiciously placing interferometric mixers (couplers) at the central processing locations so that the sensors may be continuously monitored, with their outputs being separated so that the output from a particular sensor may be readily identified.

The Series Configuration

Another configuration of the distributed sensor system of the present invention is referred to as a "series configuration" or "series system" which exhibits lead insensitivity, but which experiences more noise than the parallel system. The inventive entity of this series system overlaps, but is not identical with, the inventive entity of the parallel system.

One preferred embodiment of the series system may be described by reference to FIG. 7, which illustrates a simple two-sensor system for discussion purposes. However, it will be appreciated that substantially any desired number of sensors may be utilized in the array by merely expanding the configuration illustrated in FIG. 7. The embodiment of FIG. 7 comprises a light source 100, such a laser diode which preferably produces a short coherence length, continuous wave optical signal. Light source 100 is optically connected to an optical fiber 402 which is, in the preferred embodiment, a single-mode fiber.

A plurality of Mach-Zehnder interferometers define sensors, generally identified as 404, 406, which are positioned on fiber 402. Each sensor 404, 406 comprises an input optical coupler 407a, 407b and an output optical coupler 408a, 408b which is positioned in coupling arrangement on optical fiber 402. The portion of fiber 402 located between couplers 407, 408 in each of sensors 404 and 406 defines, respectively, arms 409 and 411 of those sensors. Each of the sensors 404, 406 has an optical fiber segment comprising an interferometric arm 410, and 412, respectively, which is connected at each of its ends to one of the couplers 407 and 408 so as to be optically coupled to fiber 402 at those coupling locations.

The differences in length between arms 409 and 410 or 411 and 412 define optical path differences having lengths $l_1$ or $l_2$, respectively, which are different for each sensor. The optical path length differences ($l_1$ and $l_2$) are much greater than the source coherence length ($L_c$) of the light source 100, so that a change in the relative phase between the arms 409 and 410 or 411 and 412 of a given sensor 404 or 406 will not be converted into detected intensity modulation at the sensor output. For a plurality of sensors, the relative path length differences $l_1$ and $l_2$ are selected in accordance with a procedure which is discussed in detail subsequently as a design consideration.

From coupler 408b, fiber 402 extends to another optical coupler 414 which is secured on fiber 402, as well as to the end of an optical fiber 416, so as to bring fiber 416 into coupling relationship with fiber 402. From coupler 414, fiber 402 is further optically connected to a Mach-Zehnder interferometer which comprises a receiver 418, which itself comprises a pair of optical couplers 422a and 424a which are positioned in coupling configuration on fiber 402, so as to define a first receiver arm 426 comprising the portion of fiber 402 extending between couplers 422a and 424a. A second receiver arm 428 comprises a segment of optical fiber which is connected near each of its ends to optical couplers 422a and 424a so as to be optically coupled at each of those locations to optical fiber 402.

Another Mach-Zehnder interferometer comprises a receiver 420, which itself comprises a pair of optical couplers 422b and 424b, which are positioned on optical fiber 416 in a coupling configuration defining a first receiver arm 430 which comprises that portion of fiber 416 extending between couplers 422b and 424b. A second receiver arm 432 comprises a segment of optical fiber which is connected near each of its ends to couplers 422b and 424b, so as to be optically coupled to fiber 416 at each of those locations.

The optical path difference $L_1$ of arms 426 and 428 in receiver 418 should match, as closely as possible, the optical path difference $l_1$ of arms 409 and 410 of sensor 404, so that an optical signal from light source 100 which passes through arms 409 and 410 can be separated from other signals in the system by arms 426 and 428 of receiver 418. The closer the match between optical path differences $L_1$ and $l_1$, the better the interference is in coupler 424a, which indicates the phase difference between the light in arms 426 and 428. As the difference between $L_1$ and $l_1$ increases, the interference at coupler 424a becomes degraded in approximately exponential relationship to the difference between these two optical path differences. Of course, this is also true of the difference between the optical path difference $L_2$ of arms 430 and 432 as compared to the optical path difference $l_2$ of arms 411 and 412 of sensor 406. Again, $L_2$ should match as closely as possible $l_2$.

More specifically, in the system of FIG. 7, if the source coherence length is much shorter than any of the sensor optical path differences and if the difference between the optical path differences of the sensors, such as $l_1$ and $l_2$, are appropriately set then although there are numerous optical paths available through the sensor system, there will be only certain paths through the system which will produce signals interfering in a given output coupler 424 of the receivers.

For example, a first light signal traveling the optical path defined by optical fiber 402, arm 410 of sensor 404, arm 411 of sensor 406, and arm 426 of receiver 418 will carry information representing environmental conditions influencing sensor 404. If the optical path difference of arm 410 relative to arm 409 is closely matched to that of arm 428 relative to arm 426, then the optical reference signal which will provide interference at coupler 424a travels the optical path defined by fiber 402, arm 409 of sensor 404, arm 411 of sensor 406, and arm 428 of sensor 418. The two optical paths defined above, although traveling through different system elements, are substantially identical in length. On the other hand, all other optical paths through the system are of different lengths than this, and so do not interfere with light traversing these two paths. The only other paths which do interfere with one another are those obtained by replacing arm 411 by arm 412 in the above discussion. This pair of interfering paths carries the same environmental information as the other pair of paths, so that the interference signal produced by the latter pair of paths reinforces the signal produced by the former pair of paths. Because the system is designed according to the design considerations discussed later, no other pair of paths will interfere.

The signal produced by the interfering light waves through coupler 424a describes the phase difference between those light waves, and represents the influence of environmental conditions on the arm 410 of sensor 404. This information is communicated from coupler 424a to a detector 434, which makes it available to conventional monitoring and evaluating equipment (not shown) which may be interconnected thereto.

Although the conditions surrounding the production of a phase difference output signal from receiver 418 have been described above, it will be appreciated that the same sort of explanation would apply to the generation of a phase difference output signal from receiver 420 identifying environmental conditions influencing arm 412 relative to arm 411 of sensor 406.

In the series configuration of FIG. 7, the receivers 418 and 420 are preferably shielded from environmental conditions which may influence the phase of light waves being transmitted therethrough. No other shielding for this purpose is required in this series system, since the system is environmentally insensitive except at the sensors themselves. This insensitivity is due to the fact that the optical signals at the system are communicated along a common path with the exception of the paths defined by the sensors. Thus, environmental influences affecting the light signals in the common path will not produce any changes in the phase difference between the light signals in those paths. The only changes in phase differences which are produced occur in the sensors themselves, since the light is traveling in different paths.

The configuration described with respect to FIG. 7 comprises one representative embodiment of a series configuration. It will be appreciated that this configuration can be expanded as necessary by adding further sensors on line 402, in series with the sensors presently there in a similar configuration, and by providing additional couplers such as coupler 414, either on line 402 or on lines such as 416, providing inputs for additional receivers which are configured in the manner of receivers 418 and 420.

Based on the above description, it becomes apparent that the series configuration, such as that illustrated in FIG. 7, defines a distributed sensor system which is lead insensitive, and therefore requires only a minimum amount of environmental shielding. This series configuration also describes an all fiber-optic sensor system which permits continuous monitoring of each sensor in the system.

It will be noted with respect to the system of FIG. 7, that each sensor has a free end from which light may escape. Although this introduces loss, it is not a serious problem since, even for a large number of sensors, power loss can be kept relatively modest by properly selecting the coupling constants of the directional couplers. The method for selecting these coupling constants is explained in detail hereinafter.

In principle, one might avoid the loss of power from the exposed ends of the sensors in FIG. 7 by providing a system, such as that illustrated in FIG. 8, in which the fibers from both ports of each sensor are continued to form the next sensor. Thus, the embodiment of FIG. 7 is modified by replacing couplers 408a and 407b with a single coupler 440, which provides communication between arm 410 of sensor 404 and arm 412 of sensor 406, by configuring those arms as part of a continuous optical fiber which is designated as optical fiber 442. Additionally, an optical coupler 444 is positioned on optical fiber 442, so as to optically couple a portion of the light from fiber 442 into an optical fiber 446, which comprises an extension of arm 432 of receiver 420.

Although it would appear that such a system would remove loss, in such a system the $\pi/2$ phase shift which occurs when light couples between two fibers becomes important. Light from one input port of the sensing interferometer enters the longer arm delayed by $\pi/2$ relative to light entering the shorter arm. Light from the second input port enters the shorter arm with a relative delay of $\pi/2$ radians. This difference in relative delays leads to cancellation between the signals associated with light entering each of the two input ports, so that if all couplers are set to a coupling coefficient which communicates 50% of the optical signal between the coupled fibers, then only the first sensor will produce any signal at all.

If the coupling coefficients are adjusted to more appropriate values then this sort of system may produce a slightly stronger signal than that produced by a discontinuous one, but such a signal is obtained at the expense of making the sensing interferometers include the entire length of fiber between the desired sensing locations. This also means that shielding must be added to the parallel fibers not comprising interferometers, otherwise the optical signals arriving at the receivers will reflect not only the environmental conditions which affected the sensors, but also those conditions which affected the parallel optical fibers extending between the sensors and the receivers. One could also optionally use extra interferometers, without corresponding receivers, as links between the more localized sensors at particular points of interest, but the addition of such links tends to degrade the signal-to-noise ratio which is associated with each sensor.

Nevertheless, the embodiment of FIG. 8 does provide a desirable arrangement for selected applications, especially where the receivers 418 and 420 are configured in parallel, as in the embodiment of FIG. 7. With such parallel receivers, continuous and simultaneous monitoring of each of the sensors is possible.

In addition to providing a seemingly reasonable compromise in terms of performance for many applications, as well as minimizing the amount of environmental shielding required as compared to the embodiment of FIG. 8, the configuration of the system illustrated in FIG. 7 also has the practical advantage that the free fiber ends simplify alignment requirements by providing access to the signal present at any sensor or receiver throughout the system.

Although the parallel and series configurations described above represent several of the preferred embodiments of the invention, it will be appreciated that there are numerous possible configurations for a coherence multiplexed sensor network exhibiting the features of the invention as described herein. For example, FIG. 9 depicts a possible hybrid parallel-series coherence multiplexed system which exhibits lead insensitivity like the series system.

Figure 9:
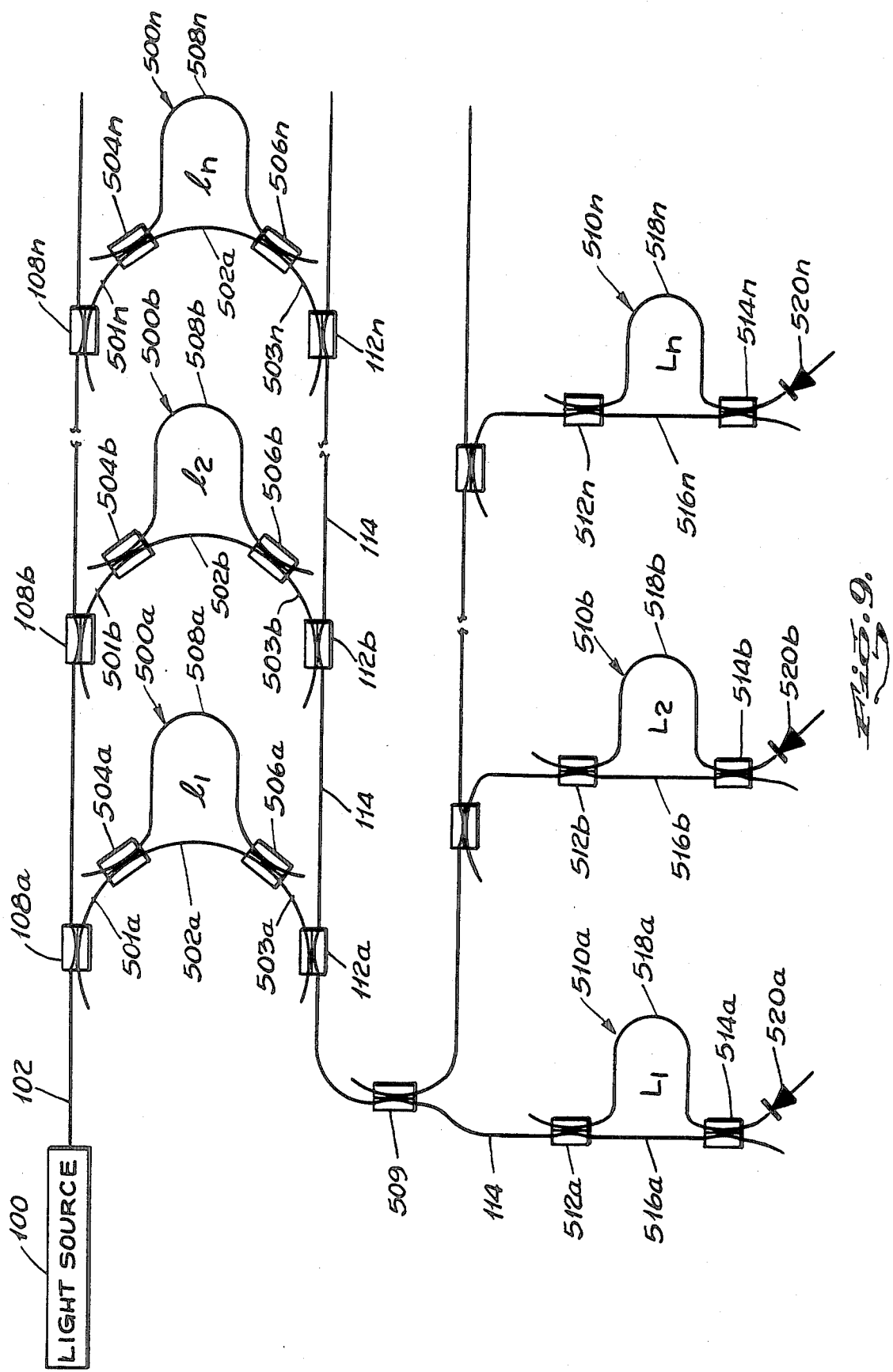
FIG. 9 is a schematic drawing of a further preferred embodiment of the coherent distributed sensor of the present invention, comprising a hybrid configuration comprising a combination of the parallel series configurations of the system.

Specifically, the embodiment of FIG. 9 comprises a light source 100 such as a laser diode which is optically connected to a fiber-optic input bus 102, having optical couplers 108a, 108b, . . . 108n positioned along the length of input bus 102 in a coupling configuration. Secured by each of couplers 108a, 108b, . . . 108n so as to be in optical coupling relationship with input bus 102, is an end of one of a plurality of fiber-optic input line segments 501a, 501b, . . . 501n which communicate the signal coupled from input bus 102 to the input of one of a plurality of Mach-Zehnder interferometers, comprising sensors 500a, 500b, . . . 500n.

Specifically, sensors 500 each include an input optical coupler 504a, 504b, . . . 504n and an output optical coupler 506a, 506b, . . . 506n which are each positioned on the optical fiber 501 so as to define a first sensor arm 502a, 502b, . . . 502n extending between couplers 504 and 506. Another optical fiber is connected near either of its ends to optical couplers 504 and 506 so as to be optically connected to arm 502, defining a second sensor arm 508a, 508b, . . . 508n. The sensors 500 are each connected to an optical fiber segment 503a, 503b, . . . 503n which is an extension of each arm 502. The optical fiber segments 503 are each secured by a corresponding coupler 112a, 112b, . . . 112n which is also secured to a fiber-optic return bus 114 in order to optically couple that return bus 114 to the optical fiber segments 503.

The optical path length difference between arm 502 and arm 508 must be greater than the source coherence length of the light source 100 for any sensor. The optical path length difference between arms 502 and 508 in each of the sensors must be at least one source coherence length different than the optical path length difference of any other sensor. Further, the sensors 500 are positioned at selected locations along fibers 102 and 114 so that the length of the path from coupler 108a to coupler 108b through arm 502b of coupler 500b to coupler 112b and back to coupler 112a must be longer than the path from coupler 108a through arm 508a of sensor 500a to coupler 112a by an amount which is greater than a coherence length of the light source 100, and is different from the path length differences 508 and 502 of all sensors 500 by at least a coherence length of the light source 100. Similar requirements apply to the spacing between other sensors. This arrangement is required to avoid interference of signals from different sensors on bus 114.

Return bus 114 is interconnected through a plurality of optical couplers 509a, 509b, . . . 509n to a plurality of receivers 510a, 510b, . . . 510n in a manner identical to the connection of line 402 to receivers 418 and 420 in FIG. 7. The receivers of FIG. 9 include input optical couplers 512a, 512b, . . . 512n, output optical couplers 514a, 514b, . . . 514n, sensor arms 516a, 516b, . . . 516n and sensor arms 518a, 518b, . . . 518n.

Like the configuration of FIG. 7, the receivers of FIG. 9 are each configured so that sensor arms 516a and 518a have an optical path length difference $L_1$ which is substantially matched to the optical path length difference $l_1$ of arms 502a and 508a, as described with respect to path length differences $L_1$ and $l_1$ of the embodiment of FIG. 7. Further, the optical path length difference $L_2$ of arms 516b and 518b are related to the optical path length difference $L_1$ of arms 516a and 518a in a manner identical to the relationship between the optical path length differences $L_2$ and $L_1$ of receivers 420 and 418 of FIG. 7.

In operation, the light source 100 of FIG. 9 provides an optical signal onto the optical fiber input bus 102 which is communicated via couplers 108 to sensors 500. The sensors 500 each provide an optical signal representative of environmental influences on arms 508 relative to arms 502. This optical signal is communicated via couplers 112 to the return bus 114, from whence the signals are coupled to respective receivers 510. As was described with respect to the embodiment of FIG. 7, each receiver provides an output signal corresponding to the phase difference between a reference signal and the optical signal as influenced by the environmental conditions as it passed through arms 502 and 508 of a selected sensor 500. This output information is communicated to an associated detector 520a, 520b, . . . 520n which itself may be interconnected to conventional monitoring and evaluation equipment for processing and analyzing the sensed environmental information.

Because of the interferometer configuration utilized for sensors 500 of FIG. 9, environmental influences on portions of the system other than the sensors 500 do not affect the output of the signal.

Figure 10:
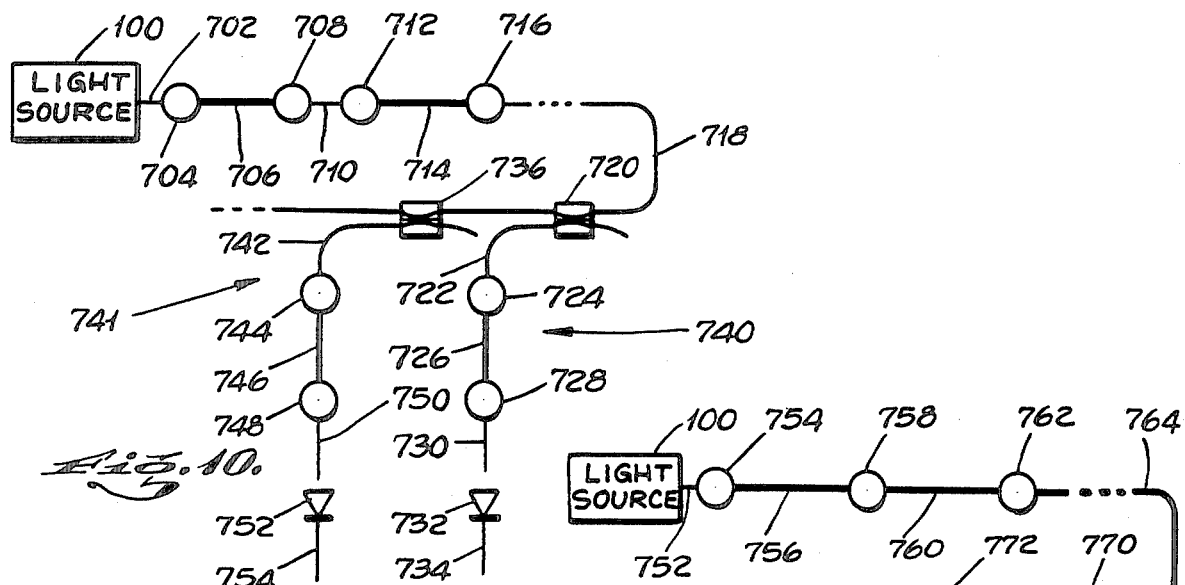
FIG. 10 is a schematic diagram of yet another preferred embodiment of the coherent distributed sensor system of the present invention, corresponding functionally to the embodiment of FIG. 7, but including sensors and receivers which comprise birefrigent or two-mode optical fiber.

The series configuration of the distributed sensor system may comprise light paths defined by the orthogonal polarizations in single mode, birefringent fiber, or by fundamental and second order modes in two-mode fiber. One preferred embodiment of such a distributed sensor is illustrated in FIG. 10. The configuration of FIG. 10 corresponds functionally to the system illustrated in FIG. 7, but utilizes the orthogonal polarizations of single mode, birefringent fiber or the orthogonal modes of two-mode fiber, along with selected components, for defining optical paths corresponding to the paths of the system illustrated in FIG. 7. The orthogonal modes provided in the single mode birefringent fiber, or the two-mode fiber, define two paths through the fiber which permit the device to be used as a two channel medium, such as a Mach-Zehnder interferometer.

Before discussing the structural details and operational theory of these further embodiments of the distributed sensor system, and to assist in providing an understanding of them, a brief summary of mode theory of optical fibers is presented. For the understanding of the present invention it is sufficient to use the so-called weakly guiding fiber notation as is used herein.

Fiber Mode Theory

When a fiber propagates light at a wavelength below cutoff, the fiber will begin to guide higher order modes. The wavelength at cutoff $\lambda_c$ is related to the fiber geometry and, for a step index fiber, may be calculated utilizing the following equation:

$$\lambda_c < \frac{2\pi r(n_c^2 - n_{cl}^2)}{2.405} \tag{2}$$

where
r is the core radius;
$n_c$ is the refractive index of the core; and
$n_{cl}$ is the refractive index of the cladding.

Those skilled in the art will recognize that the fundamental mode, second order mode, and so on, each comprise plural electric field patterns, each pattern representing a mode. For example, the fundamental mode includes two polarization modes. To avoid confusion, the fundamental mode will be referred to henceforth as the fundamental set of modes and the second order mode will be referred to as the second order set of modes.

The lowest order, or fundamental, set of modes which is guided is the $LP_{01}$ mode set. The $LP_{11}$ mode set is the next mode set (i.e. the second order mode set) which is guided beyond the fundamental mode set $LP_{01}$. These mode sets are defined and described in detail in an article by D. Gloge entitled "Weakly Guiding Fiber", *Applied Optics*, 10, 2252 (1971).

FIG. 11 shows the field patterns of the two modes in the fundamental $LP_{01}$ set of modes and the four modes in the second order $LP_{11}$ set of modes. The arrows indicate the direction of the electric field vectors at a particular instant in time.

For the $LP_{01}$ set of fundamental modes, the electric field vector is either vertical, representing vertically polarized light, or horizontal, representing horizontally polarized light. However, for the $LP_{11}$ set of second order modes, the vertical polarization and the horizontal polarization each have two electric field patterns. Further, each of the second order mode set field patterns comprise two lobes. In one of these field patterns, the electric field vectors of the lobes are perpendicular to the zero electric field line (ZFL), while in the other electric field pattern, the electric field vectors of the lobes are parallel to the zero electric field line (ZFL). The zero electric field line is simply a line between the two lobes in each of the second order mode patterns which represents zero electric field amplitude. Similarly, the horizontally polarized second order modes have electric field vectors oriented either parallel to the ZFL or perpendicular to the ZFL as shown in FIG. 11.

Each of the six electric field patterns in FIG. 11, namely, the two $LP_{01}$ patterns and the four $LP_{11}$ patterns, are orthogonal to each other. Thus, the six patterns or modes may be viewed as independent optical paths through the fiber, which ordinarily do not couple with each other.

The two $LP_{01}$ modes will travel through the fiber at the same phase velocity, and the four second order $LP_{11}$ modes will travel through the fiber at approximately the same phase velocity. However, the phase velocity for the fundamental $LP_{01}$ set of modes will be slower than the phase velocity for the second order $LP_{11}$ set of modes. Thus, light traveling in the two sets of modes $LP_{01}$, $LP_{11}$, will move in and out of phase with each other as the light propagates through the fiber. The rate at which the modes $LP_{01}$, $LP_{11}$ move in and out of phase depends on the difference in the effective refractive indices between the two sets of modes $LP_{01}$ and $LP_{11}$.

The birefringence of a fiber is the difference in the effective refractive indices of the two polarization modes. If the light source is at a wavelength above cutoff, only the two polarization modes within the $LP_{01}$ set of modes will propagate through the fiber. Although there is no difference between the phase velocities of these two polarization modes for nonbirefringent fiber, the difference in the refractive indices for the two polarization modes, and thus, the difference in phase velocities between the two modes, increases as the birefringence of the fiber increases. Because light propagating in birefringent fiber travels at different velocities in different polarization modes, the relative phase between light in one polarization mode and light in the other polarization mode will shift continuously, thereby causing the light in the two polarization modes to move in and out of phase with each other as the light propagates through the fiber.

A single high birefringence monomode optical fiber is capable of maintaining the polarization of light traveling therein for long distances, so that there is ordinarily no appreciable coupling of light from one mode to the other. These polarization modes are generally referred to as the X and Y polarization modes.

Beat Length

The beat length of a fiber is the distance it takes two signals of the same frequency traveling in different propagation modes of the fiber at different velocities to shift 360° in relative phase so they are again in phase. Mathematically, the beat length is expressed as:

$$L = \lambda/\Delta n \qquad (3)$$

where
  $\lambda$ is the optical wavelength in a vacuum; and
  $\Delta n$ is the difference in the effective indices of two propagation modes of the fiber.

If birefringent fiber is used in the present invention, $\Delta n$ is equal to the difference in the effective refractive indices between the two polarization modes (X, Y) of the $LP_{01}$ set of modes. If two-mode fiber is used in the present invention, $\Delta n$ is equal to the difference in effective refractive indices between the first order set of modes ($LP_{01}$) and the second order set of modes ($LP_{11}$).

The Birefringent Fiber Embodiment

The configuration of the distributed sensor illustrated in FIG. 10 corresponds functionally to the system illustrated in FIG. 7. However, in this embodiment the sensors and receivers comprise single mode, birefringent fiber.

Specifically, FIG. 10 comprises a light source 100 such as, for example, a laser diode, a superluminescent diode, or a light emitting diode. Light source 100 which is optically coupled via optical fiber 702 to a coupler 704 which functions to separate the optical signal from line 702 into a vertical and horizontal polarization mode, and couple these onto a first sensor 706 comprising single mode, birefringent optical fiber.

Couplers such as coupler 704 are utilized in numerous positions in the embodiments to be discussed herein, as one means of coupling signals between the only mode of a single mode, single polarization fiber into both polarizations of a birefringent fiber, or vice versa. Such couplers for combining or separating modes will be referred to herein as polarization couplers. There are various ways of providing such coupling which are well-known in the technology. One preferred embodiment for accomplishing this coupling comprises butt coupling the fibers together so that the physical axes of the fibers are colinear, while the fibers' axes of polarization are at an angle with respect to each other. The butt coupling may be accomplished by any of a number of well-known procedures, such as cementing the fibers together, or melting them together.

The angular orientation of the axes of polarization is analogous to the coupling coefficient in a conventional directional coupler. That is, as the angle is changed, more or less light is coupled between modes in the two fibers. An angle of 45° between the polarization axes is equivalent to the common 3 db level of the 50 percent coupling coefficient in a conventional directional coupler. For systems consisting of only one sensor this is the optimum choice of angle. On the other hand, if the system contains several sensors, the angle required to maximize signal to noise ratio may be different. The determination of the appropriate angle can be made by mathematical analysis using well-known mathematical procedures, or it may be made by testing the response of the system to various angular relationships of the fiber polarization axes.

In butt coupling the fibers together to form coupler 704, it is important to find the axes of birefringence of the fibers so that they may be correctly aligned. For some fibers, this can be accomplished by microscopically examining the fibers to detect their elipticity. Another method involves injecting light into the fiber, and then looking at the scattered light pattern to determine the axes of birefringence. Still another method for determining the birefringent axis is described by S. Carrara et al., "Elasto-optic Determination of Birefringent Axes in Polarization-Holding Optical Fiber", *Third International Conference on Optical Fiber Sensors*, (Feb. 13-14, 1985), San Diego, Calif. This paper is hereby incorporated herein by reference.

The Carrara et al. paper teaches that the use of lateral stress produces a resultant birefringence which is a combination of the residual built in birefringence and the externally induced birefringence due to stress. As a result of the stress, the orientation and magnitude of the net birefringence deviate, in general, from their original values. This causes a coupling of some of the optical power from one eigenpolarization mode of the fiber to the other mode unless the direction of external stress is along one of the birefringent axes. Therefore, if the light at the stress region is linearly polarized along one of the residual birefringent axes, the polarization state of the output does not change. This is utilized as a measure of the orientation of the birefringent axes with reference to the direction of lateral stress.

Referring again to FIG. 10, another optical polarization coupler 708 corresponding in configuration to coupler 704, is optically coupled on one side to fiber 706, and on the other side to a single mode fiber 714, having a single polarization mode. Fibers 706 and 710 are optically coupled through coupler 708 so that signals in the vertical and horizontal polarization modes of fiber 706 are transmitted in a single polarization arrangement in fiber 710.

Optical fiber 710 is optically coupled via another polarization coupler 712 to a sensor 714 comprising a single mode birefringent fiber 714. Again, coupler 712 may be formed as coupler 704. Sensor 714 is coupled via another polarization coupler 716 to another optical fiber 718 which preferably has a single polarization mode in which optical signals propagate between the sensors and receivers in the system.

Optical fiber 718 is optically coupled through a conventional directional coupler 720 to another single mode single polarization optical fiber 722 in a receiving arm generally indicated at 740. Optical fiber 722 is coupled through a polarization coupler 724 to a receiver section 726 comprising single mode birefringent optical fiber.

Like the receivers 418 and 420 of FIG. 7, receiver 726 is of a length which substantially corresponds to the length of one of the sensors 706 or 714, so that the optical path length difference between the polarization modes in receiver 726 substantially corresponds to the optical path length difference between the polarization modes in the corresponding sensor 706 or 714. In this configuration, like the embodiment illustrated in FIG. 7, the optical signals in receiver 726 which have propagated through light paths of corresponding length will interfere, producing a phase difference signal which is indicative of the environmental conditions which affected the propagation of optical signals through the sensor 706 or 714 which is of a corresponding length.

Receiver 726 is coupled via another polarization coupler 728 to a single mode fiber 730 having a single polarization mode for transmission of light signals therethrough. Optical fiber 730 is optically coupled to a detector 732 of the type previously described with respect the other embodiments, such as detectors 434 and 436 of FIG. 7. An output electrical signal is transmitted from detector 732, onto an electrical output terminal 734, the output electrical signal providing a representation of the environmental condition influencing the flow of optical signals through the corresponding sensor 706 or 714.

Optical fiber 718 is additionally optically coupled through a conventional directional coupler 736 to another receiving leg generally indicated at 741, which has a configuration corresponding to the receiving leg 740 described above. More specifically, the optical signal in receiving leg 741 is communicated from coupler 736 to a single mode, single polarization, optical fiber 742 from whence it is coupled via polarization coupler 744 to a length of single mode birefringent fiber 746 comprising an optical receiver having a length which corresponds to the length of one of the sensors 706 or 714. Receiver 746 is optically coupled through polarization coupler 748 to another single mode fiber 750 having a single polarization mode therein. Fiber 750 is optically coupled to a detector 752 which communicates optical signals from fiber 750 to an electrical outlet port 754 which carries an electrical signal representative of the phase difference signal of the corresponding sensor 706 or 714.

Of course, like the series configuration illustrated in FIG. 7, it will be appreciated that numerous sensors and their associated couplers could be included in the embodiment of FIG. 10 and, likewise, numerous receiver legs could be included for receiving the detecting environmental conditions affecting the phase difference relationship of optical signals flowing through the sensors. The length of the single mode, single polarization fiber segments such as 710 between the sensors would not affect the accuracy of the system, since all of the optical signals transmitted between the sensors would travel along a common path between the sensors. Thus, no change in the phase relationship of the optical signals occurs in those nonsensing segments of the system.

It will be recalled that the configuration illustrated in FIG. 7 requires the optical path length difference of the arms of sensor 404 must be different than the path length difference of the arms of sensor 406 by at least one coherence length of the optical source. As additional sensors are added in the series configuration, interference between the various optical paths is avoided by requiring the optical path length differences of sensors in the system to be different from each other by an amount which increases exponentially, and is based on multiples of the source coherence length.

The system of FIG. 10 also requires a separation of optical path length differences between sensors which is based upon the source coherence length. However, because the difference in optical path lengths between orthogonal modes in birefringent fiber is based on the difference in phase velocity of the polarizations, the path length difference between those polarization modes which is necessary to avoid interference is based on the length of fiber as it relates to the optical wavelength, and the beat length of the optical signal. Specifically, the relationship between the length (l) of the birefringent fiber and the optical path length difference ($\Delta l$) of the optical paths within that fiber is:

$$\Delta l = l(\lambda/\lambda_b) \tag{4}$$

where $\lambda$ is the wavelength of the optical signal; and $\lambda_b$ is the beat length of the optical signal.

Those skilled in the technology will appreciate that the ratio of wavelength to beat length is typically a given number for a given fiber, and that the number may generally be obtained from the manufacturer of the fiber.

Based on the above, it will be appreciated that the length of a first sensor 706 required to avoid interference is defined as:

$$(\lambda/\lambda_b)l > l_c \tag{5}$$

and thus $$l > (\lambda_b/\lambda)l_c \tag{6}$$

The length indicated above becomes the measure by which the separation of path length differences between sensors in the system are determined so that interference between those various optical paths is avoided.

One of the important advantages of the embodiment of FIG. 10, is that the use of optical paths defined by the polarization modes of birefringent fiber permits a greater difference, than in the embodiment of FIG. 7, between the physical lengths of receiver 726 and its corresponding sensor 706 and 714 without degrading system operation. In the case of the series emobodiments such as that of FIG. 7, the difference between the optical path difference of the sensors and the optical path difference of the receivers must be much less than one coherence length of the optical source. For a superluminescent diode, this source coherence length ($L_c$) is typically on the order of about 50 $\mu$m. Thus, the difference in optical path differences between the sensor and receiver of the series configurations such as those in FIGS. 7 through 9 would need to be of a length whose difference is less than this amount. However, by use of the birefringent fiber, the ratio between wavelength and beat length comes into play. Many optical fibers which could be utilized in the embodiment of FIG. 10 and which are generally available in the commercial market place have a beat length on the order of 1 to 3 mm when operated at a wavelength on the order of 1 μm. The birefringent fiber relationship which represents the permissible difference between the sensor and receiver lengths is:

$$\lambda/\lambda_b |l_1 - L_1| << L_c \tag{7}$$

Where
 $l_1$ is the length of the sensing fiber; and
 $L_1$ is the length of the receiving fiber.

Using a fiber with a wavelength to beat length ratio of 0.001, the above equation indicates that the difference in optical fiber length of the sensor as compared to the receiver should be much less than 5 cm. It will be appreciated that such a difference in line length should be relatively easy to achieve in the manufacture of distributed sensor systems of the type illustrated in FIG. 10.

Optionally, the single mode, single polarization fiber utilized in the embodiment of FIG. 10 can be replaced with birefringent fiber. In order to obtain a single polarization mode within the birefringent fiber, a polarizer may be included on the fiber. Polarizers for controlling the propagation of signals of a selected polarization are commonly known in the technology. One embodiment of a polarizer which could be used with the present invention is disclosed by Bergh in U.S. Pat. No. 4,386,822 issued June 7, 1983 and entitled "Polarizer and Method." This patent is hereby incorporated herein by reference. In addition, where single mode, single polarization fiber is replaced by birefringent fiber, the couplers 704, 708 and 716 will couple between both polarizations in the birefringent fiber on one side of the coupler, and both polarizations in the birefringent fiber on the other side of the coupler. This may be accomplished by butt splicing the fibers with the polarization axes at an appropriate angle, as explained above. Alternatively, this type of coupling can be achieved by utilizing a single continuous single mode birefringent fiber to comprise all of the sensors and optically connected fibers such as 702, 706, 710, 714 and 718, and periodically applying transverse pressure at those locations on the birefringent fiber at which coupling is desired. A device for applying this transverse force is described hereafter with reference to FIG. 26.

When optical fiber 718 comprises birefringent fiber, couplers 720 and 736 should preferably be polarization preserving directional couplers, coupling optical signals from the orthogonal polarization modes in fiber 718 to corresponding orthogonal polarization modes in birefringent fiber 722 and 742. One technique for preserving polarization when coupling between the fibers is to use a conventional directional coupler such as the one described with reference to FIG. 2, and to align the fibers therein so that their directions of polarization are aligned in common planes. Thus, for example, in coupler 720 the plane of vertical polarization of fiber 718 should be in planar alignment with that of fiber 722. Likewise, the planes of horizontal polarization of these fibers should be in planar alignment. In this configuration, the optical paths of like polarizations will couple only with themselves. A method for identifying the axes of polarization was described above, and it may be utilized herein for properly aligning the fibers 718 and 722 in coupler 720.

If the directional couplers such as 720 and 736 are made to preserve polarization, polarizers are not required in the single mode birefringent fibers 722 and 742.

Figure 12:
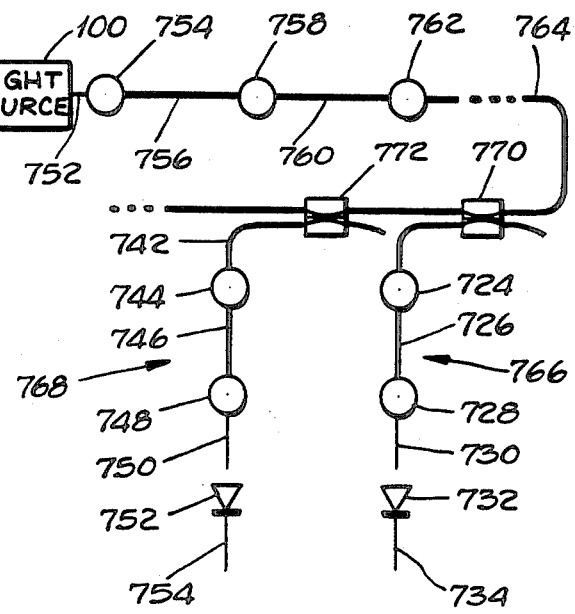
FIG. 12 is a schematic drawing of another preferred embodiment of the coherent distributed sensor system of the present invention, corresponding functionally to the embodiment of FIG. 8, but including sensors and receivers comprising birefringent or two-mode fiber.

FIG. 12 illustrates another preferred embodiment of a series configuration of the distributed sensor system, using birefringent single mode fibers as the sensors and receivers. The embodiment of FIG. 12 corresponds in function to the embodiment illustrated in FIG. 8. Further, FIG. 12 corresponds physically to the embodiment illustrated in FIG. 10, when single mode, birefringent fiber is utilized throughout the system, and when single polarization fibers between the sensors, such as fiber 710, are removed from the system.

Specifically, the embodiment of FIG. 12 includes a light source 100 which preferably provides an optical signal having a short coherence length. Light source 100 is optically coupled via an optical fiber 752 through a coupler 754 to a sensor 756 comprised of birefringent fiber. Coupler 754 may comprise a polarization coupler of the type described with respect to FIG. 10. Sensor 756 is optically coupled at its end through coupler 758 to anotherr sensor 760 comprised of birefringent fiber. Again, coupler 758 may be a polarization coupler like coupler 754. Sensor 760 is coupled through another polarization coupler 762 to a length of birefringent fiber 764 which communicates the signals from the sensors to a receiving section of the device.

Fiber 764 is optically coupled to each of the receiving arms generally indicated at 766 and 768 through polarization preserving directional couplers 770 and 772. Couplers 770 and 772 correspond to polarization preserving couplers 720 and 736 described above in reference to FIG. 10. Couplers 770 and 772 optically couple signals from fiber 764 to receiver arms generally indicated at 766 and 768, respectively. The birefringent fiber arrangement of the receiver arms 766 and 768 corresponds to the arrangement for those arms as described in the embodiment of FIG. 10 when birefringent fiber is used for the various components of those receiving arms. Thus, the components of arms 766 and 768 are numbered to correspond to the related arms in the embodiment of FIG. 10.

Of course, it will be appreciated that any desired number of sensor arms can be added in series, by connecting them in the manner illustrated between sensors 756 and 760. Likewise, additional receiving arms can be added to receive and detect changes in phase difference occurring in those additional sensors.

It will be noted that the embodiment illustrated in FIG. 12 has an advantage over the embodiment of FIG. 10 insofar as the transmittal power is concerned, since there is no power loss between sensors due to coupling onto a connecting fiber, such as fiber 710 in FIG. 10. On the other hand, positioning the sensors adjacent one another as in the embodiment of FIG. 12 limits the ability to sense environmental effects in different physical regions, as can be accomplished in the embodiment of FIG. 10. It will be appreciated that the embodiment of FIG. 12 can be adjusted so that the sensors may be located at a distance apart if desired. Specifically, every second length of birefringent fiber may act simply as a connection between two sensors by providing no receiving arms which are matched to detect the signals in those connecting fibers.

Figure 26:
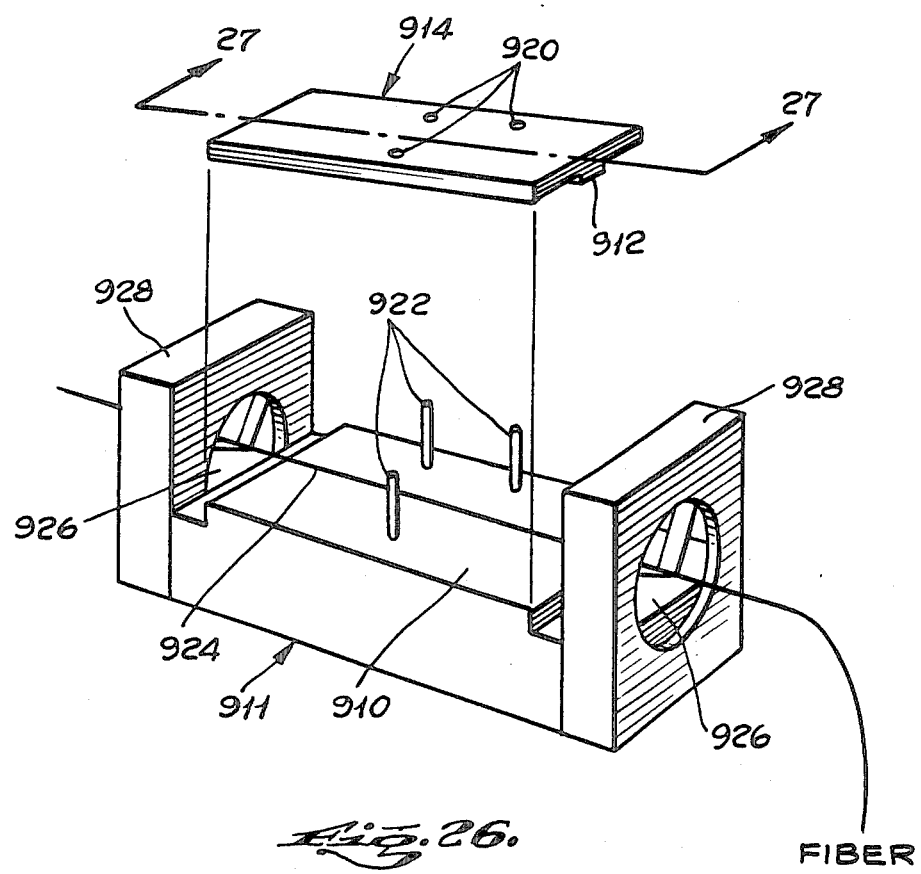
FIG. 26 is an exploded, perspective view of a modal coupler for use with the present invention.

The embodiment of FIG. 12 can be constructed by use of a single length of birefringent fiber to comprise the sensors 756 and 760, and the nonsensing, connection portion 764 of the system. Likewise, each receiving arm 766 and 768 can comprise a separate length of birefringent fiber. In this configuration, each of the couplers between the birefringent fiber segments could be comprised of a coupler which periodically applies transverse pressure for coupling the optical signals between the orthogonal polarization modes of the birefringent fiber. Such a device is illustrated in FIG. 26, and is described in detail hereafter. The use of continuous strands of birefringent fiber simplifies the manufacture of the device since butt coupling and the required fiber alignment process to accomplish the butt coupling is not necessary.

Figure 13:
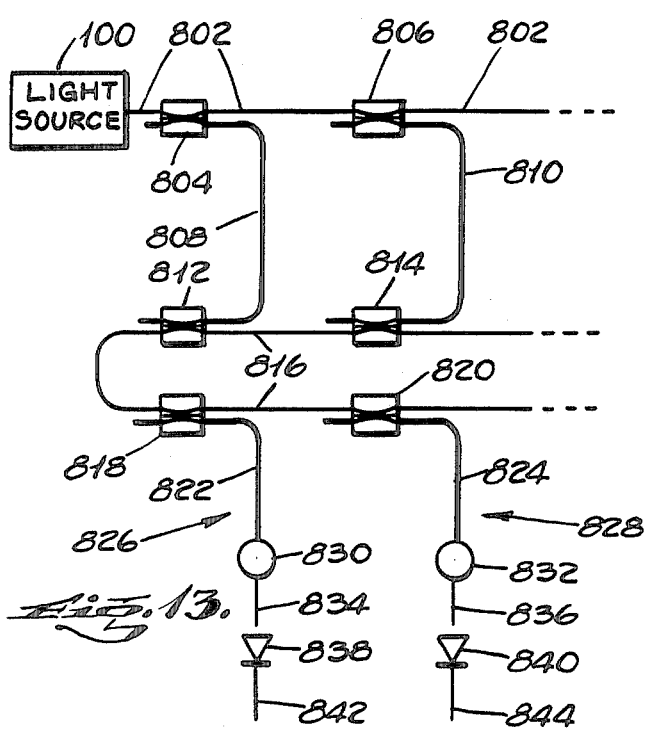
FIG. 13 is a schematic drawing of a further preferred embodiment of the coherent distributed sensor system of the present invention, illustrating a system which is functionally equivalent to the system of FIG. 9, but with the sensors and receivers comprising birefringent or two-mode fiber.

FIG. 13 illustrates another embodiment of the invention which utilizes birefringent fiber sensors, and functionally corresponds to the embodiment illustrated in FIG. 9. The embodiment of FIG. 13 includes a light source 100 which preferably has a short coherence length. Diode 100 is optically coupled to a single mode, single polarization fiber 802. Fiber 802 is optically coupled through directional couplers 804 and 806 to first ends of birefringent fibers comprising sensors 808 and 810, respectively. Sensors 808 and 810 are optically coupled at their second ends through directional couplers 812 and 814 to a single mode, single polarization fiber 816.

When signals are coupled in couplers 804 and 806, the signals are transferred from the single polarization mode in fiber 802 to both polarization modes in fibers 808 and 810. This is accomplished by properly orienting the cores of the birefringent fibers 808 and 810 in a directional coupler such as the one illustrated in FIG. 2. Most generally, the cores are oriented so that the direction of each of the polarization modes in the birefringent fibers 808 and 810 is at an angle of approximately 45° with respect to the angle of the single polarization mode in the fiber 802. Likewise, when the signals are coupled in couplers 812 and 814, the fibers 808 and 810 are generally oriented in the coupler with respect to fiber 816 so that the polarization directions in the birefringent fibers 808 and 810 are at approximately 45° with respect to the single polarization mode of fiber 816. In this manner, components of both polarization modes in the birefringent fiber are combined so as to travel in the single polarization mode of the single polarization fiber, and vice versa.

Fiber 816 is optically coupled in directional couplers 818 and 820 to birefringent fibers 822 and 824 which, respectively, comprise a portion of receiving arms 826 and 828. Couplers 818 and 820 correspond in type to couplers 804 and 806, and the fibers 816, 822 and 824 are positioned in couplers 818 and 820 in the manner described with respect to fibers 802, 808 and 810 above. From sensors 822 and 824, the optical signals are communicated through polarization couplers 830 and 832, respectively, to single mode, single polarization fibers 834 and 836. Couplers 830 and 832 correspond to polarization couplers 728 and 758 of FIG. 10. Fibers 834 and 836 are coupled, respectively, to detectors 838 and 840 which communicate signals representing environmental conditions affecting sensors 808 and 810, respectively, onto output electrical terminals 842 and 844.

Optionally, any fibers 802, 816, 834 and 836 can comprise single mode, birefringent fibers. Under these circumstances, polarizers would be required in fibers 802 and 816 so that only a single optical path is provided between the sensors in fiber 802, and between the sensors and the receivers in fiber 816, thereby preventing environmental influences on the phase relationship of optical signals in those nonsensing regions.

It is noted that the receiver arms 740 and 741 of FIG. 10 are substantially equivalent to and fully interchangeable with the receiver arms 826 and 828 of FIG. 13. Similarly, each of the directional couplers 804, 806, 812 and 814 can be replaced by a combination of a polarization maintaining coupler such as 720 of FIG. 10 and a polarization coupler such as 724 of that Figure. Also, in the system of FIG. 12, the combined operation of directional couplers 770, fiber 722 and polarization coupler 724 (or 772, 742 and 744) can be performed by a single device which couples optical power from both polarizations of fiber 764 to both polarizations of fiber 726 (or 746). One such coupler for coupling between the two polarizations of two birefringent fibers can be constructed using the design sketched in FIG. 2 provided the polarization axes of the two fibers are not aligned parallel to each other. The actual coupling coefficients of such a coupler depend on a number of parameters, such as the angle between the polarization axes, the fiber birefringence, the distance between fibers and the coupling lengths.

One difference between these systems is that in order to avoid interference of optical signals which travel through the various sensors in FIGS. 10 and 12, the optical path length difference of each sensor in the systems of FIGS. 10 and 12 added to the system must be different than that of all prior sensors by a multiple of the source coherence length which increases exponentially with each added sensor. In contrast, the optical path length difference of each new sensor in the embodiment of FIG. 13 must be different than that of all prior sensors by a multiple of the source coherence length which increases linearly with each added sensor.

Differential detection of the output signals can be provided in any of the systems illustrated in FIGS. 10, 12 and 13 by replacing the output fibers 730, 750 (FIGS. 10 and 12) and 834 and 836 (FIG. 13) by birefringent fibers, followed by a polarizing beam splitter (not shown) of a type well-known in the industry, and two optical detectors (not shown). Each detector would be optically coupled to one of the beams from the polarized beam splitter. The electronic signals from the two detectors could then be subtracted in the differential amplifier (not shown) to identify the phase difference between the optical signals transmitted through the corresponding sensor.

The Two-Mode Fiber Embodiment

The systems described with reference to FIGS. 10, 12 and 13 are based on interference between the two orthogonally polarized modes in a highly birefringent fiber. Analogous schemes can be designed based on interference between two spatially orthogonal modes in a two-mode fiber.

Fiber optic mode theory was described previously with respect to FIG. 11. By reference to FIG. 11, it will be recalled that a two-mode fiber actually propagates six modes, as illustrated. Those skilled in the art will appreciate that in a fiber with cylindrical symmetry, the fundamental mode set is doubly degenerate. In other words, optical signals propagating in the two orthogonal polarizations of the fundamental mode will propagate with identical phase velocity. Similarly, the second order mode set consists of two pairs of degenerate, orthogonally polarized modes, with the pairs being almost degenerate amongst themselves. It is well-known that this degeneracy between polarizations can be lifted by stress-induced anisotropy, or alternatively, by using an elliptic core in the two-mode fiber. Introduction of an elliptical core will also lift the near-degeneracy of the second order modes.

When the degeneracy is lifted by proper design of the fiber, light can propagate in any one of the modes in the mode set without being appreciably coupled to the other modes in the same mode set or to any modes in the other mode set.

For purposes of the following discussion, it is assumed that the two-mode fibers are configured as described above, so that they are mode-maintaining with the degeneracies removed. Thus, it is assumed that only one mode in the fundamental mode set and one mode in the second order mode set is provided for propagation of optical signals. Under these conditions, FIGS. 10, 12 and 13 comprise illustrations of distributed interferometric sensors whose operation is based on interference between the fundamental and second order mode in a two-mode fiber.

Referring to FIG. 10, the system functions as previously described for the birefringent fiber embodiment, except that the optical fibers illustrated by thick lines 702, 706, 714, 726 and 746 comprise two-mode fibers, and the fibers illustrated by thin lines comprise single mode fibers. The couplers which are represented by circles, such as 704, 708, 712 and 716 function to couple optical signals between the fundamental mode of the single mode fiber, and both the fundamental and second order modes of the two-mode fiber. This coupling arrangement is accomplished by butt splicing the optical fibers in the manner illustrated in FIG. 14.

Figure 14:
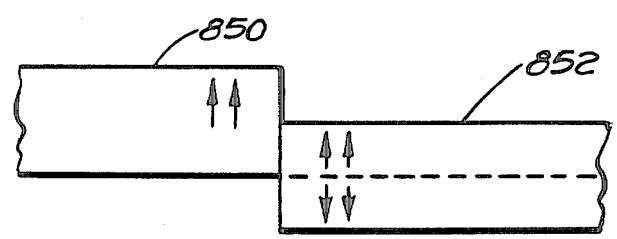
FIG. 14 is a schematic illustration of a single mode fiber which is butt coupled to a two mode fiber with the axes offset to couple light in a common polarization mode, and to avoid coupling optical signals not in the selected polarization mode.

More specifically, FIG. 14 illustrates a single mode optical fiber 850 having a fundamental mode which is vertically polarized. Fiber 850 is butt coupled to a two-mode optical fiber 852 which has a fundamental mode having a vertical polarization, and a second order mode which comprises the vertical-perpendicular orientation, as described with respect to FIG. 11. By butt coupling fiber 850 with fiber 852 so that the central axes of the fibers are offset, it is possible to couple the vertically polarized signals from fiber 850 to both the vertically polarized fundamental mode, and the vertical-perpendicular second order mode of fiber 852. Of course, coupling from the two-mode fiber 852 to the single mode fiber 850 is also possible using this coupling arrangement. In this embodiment, couplers 720 and 736 comprise conventional directional couplers which communicate the optical signals from fiber 718 to fibers 722 and 742.

In operation, the two-mode embodiment of FIG. 10 comprises an optical signal which is communicated from light source 100 through a single mode fiber 702 to a coupler 704 where the signal from fiber 702 is coupled so as to propagate in both the fundamental and second order modes of two-mode fiber-optic sensor 706. These signals are then passed through coupler 708 where the signals are combined so as to propagate in a single polarization mode of single mode fiber 710. In coupler 712, the signal from fiber 710 is again coupled so as to propagate in both the fundamental and second order modes of two-mode optical fiber sensor 714, and in coupler 716 the signals are again combined to travel in a single polarization through single mode fiber 718. In coupler 720, a portion of the signal from fiber 718 is communicated to optical fiber 722 from whence it passes through 724 so as to be coupled into the fundamental and second order modes of two-mode fiber-optic receiver 726. As has been explained previously, the modes in fiber 726 correspond in optical path length difference to that of either sensor 706 or fiber 714. Thus, signals which have passed through the optical paths of the corresponding sensor will interfere in receiver 726 to produce a difference signal representative of environmental conditions affecting the corresponding sensor. The difference signal is communicated through coupler 728 into the single polarization mode of single mode fiber 730. This difference signal is then detected in detector 732 and communicated as an amplitude signal via electrical terminal 734 to other monitoring equipment.

Likewise, the receiving leg 741 of FIG. 10 functions to receive signals which have propagated through the sensor 706 or 714 which has an optical path length difference corresponding to that of receiver 746. Interference is thus experienced between the signals in receiver 746, producing a difference signal which represents the environmental conditions causing changes in the phase of optical signals traveling through the separate modes in that corresponding sensor 706 or 714.

Optionally, the single mode nonsensing fibers represented by thin lines in FIG. 10 can also be replaced by two-mode fibers. In this configuration, a mode filter or stripper is utilized to remove the second order mode. Methods for removing the second order mode are well-known in the industry, and include such things as wrapping the two-mode fiber on a mandrel. This well-known type of mode stripper is discussed in an article by Y. Katsuyama entitled "Single Mode Propagation in a Two Mode Region of Optical Fiber by Using Mode Filter", *Electronics Letters*, 15, 442, (1979). This article is incorporated herein by reference. Another well-known mode stripping technique comprises heating the two-mode fiber and then pulling that fiber to reduce its diameter.

In the configuration utilizing two-mode fiber throughout, the couplers indicated as circles in FIG. 10 function to couple between both the fundamental and second order mode of the two-mode fiber on one side of the coupler, and both modes in the fiber on the other side of the coupler. Thus with a mode stripper connected to the nonsensing two-mode fibers, the second order mode is stripped, permitting optical signals to propagate only in one of the fundamental modes of the optional two-mode fibers.

An optical coupler which functions to couple in the manner described above may be formed by butt splicing the optical fibers with their axes offset, as was discussed previously with reference to FIG. 14. Alternatively, coupling can be provided by bending the optical fiber at the desired coupling locations. By bending the fiber, optical signals are caused to be coupled between the modes in the optical fiber. One embodiment of a device for applying these bends at appropriate locations in the fiber is illustrated and described in H. F. Taylor, "Bending Effects in Optical Fibers", *Journal of Lightwave Technology*, LT-2, 5, 617–628 (October, 1984). This paper is hereby incorporated herein by reference.

Since two-mode fiber is used for fiber 718, as well as for fiber 722 and 742, the directional couplers 720 and 736 must function to preserve the modes which are coupled between the fibers. In other words, these couplers must couple only from the fundamental mode in one fiber to the fundamental mode in the second fiber, and from the second order mode in one fiber to the second order mode in the second fiber. It is well-known that the coupling between two modes in fibers which are positioned in proximity to one another is strong only if the modes have the same phase velocity. Since the two fibers are presumably of identical design, the fundamental modes in the two fibers have the same phase velocity, and therefore couple strongly to each other. Similarly, the second order modes have the same phase velocity, and are also strongly coupled to each other.

The embodiment of the distributed sensor illustrated in FIG. 12 can also be constructed of two-mode fiber. In this configuration, the optical fibers can comprise a single two-mode fiber for the sensor portion, and individual two-mode fibers for each of the receiving arms 766 and 768. The couplers illustrated as circles correspond to mode mixing couplers described previously, which can be provided by bending the fibers in order to produce coupling of the optical signals between the modes in those fibers. The directional couplers 770 and 772 comprise mode preserving couplers of the type described above wherein conventional couplers are utilized in conjunction with fibers whose phase velocities are matched so that signals are transmitted only between corresponding, identical modes.

The embodiment of FIG. 13 may also be constructed with the sensors 808 and 810 and the receivers 822 and 824 comprising two-mode fiber. In that situation, the directional couplers illustrated by the rectangle design, such as couplers 804 and 806, comprise couplers which function to couple between the fundamental mode of a single mode fiber and both the fundamental and second order mode of a two-mode fiber. Since the coupling between modes in fibers which are positioned in proximity to each other depends on both the difference in phase velocity between the modes and the degree of overlap of the mode fields, these parameters can be adjusted to provide the appropriate coupling to both the fundamental and second order modes of the two-mode fiber. The couplers 830 and 832 comprise polarization couplers which couple between the fundamental mode of a single mode fiber and both the fundamental and second order modes of a two-mode fiber, as described in connection with the two-mode fiber embodiment of FIG. 10.

In the configuration of FIG. 13, the use of two-mode fiber in constructing fiber 802 and 816 would unnecessarily complicate the system, since it would provide a means for the signals traveling in the two separate modes to be influenced differently by external forces in areas which are not intended to function as sensors. Consequently, the phase difference signals identified in the receiving arms 826 and 828 could not be assumed to have been produced solely in a specified sensor. As with the single mode birefringent fiber embodiments, the two-mode embodiments of receiver arms 826 and 828 are equivalent and fully interchangeable with the two-mode embodiments of receiving arms 740 and 741 of FIG. 10.

Design Considerations

1. Noise Influences

The performance of coherence multiplexed systems will be limited in general by several types of noise. In addition to the shot noise and electronic amplification noise present in any optical sensing system, the systems disclosed herein may be subject to noise resulting from interference between light components associated with paths which are not intended to interfere. There are two ways this can occur. First, if the difference in optical delays between the two paths is not sufficiently large, then the light from the two paths will not be entirely incoherent, and there will be "cross-talk" terms in the detected power. In other words, the detected power will depend weakly on the relative phase delays of nominally non-interfering paths.

Secondly, even if the light associated with the two paths is mutually incoherent, instantaneous interference effects may be present. Although such interference effects vanish on average, detection systems with a non-zero bandwidth will not completely average out the resulting intensity fluctuations. The exact nature of this "incoherence noise" will depend on the nature of the light source. For example, in a system which uses a single-mode laser diode as a source, the incoherence noise will be associated with the phase noise present at the laser output. For more general sources, mode partition noise or source intensity noise may also be contributed.

Some of the cross-talk and incoherence noise may be eliminated from the systems by using polarization controllers to prevent paths from interfering; however, this tactic will be only partially effective in systems with more than two paths which are not intended to interfere with one another. One particular type of polarization controller which may be utilized in the systems of the present invention for controlling cross-talk is described subsequently herein.

2. Determining Sensor Optical Path Lengths

An important consideration for a coherence multiplexed sensor network is the need to insure that only the paths one wishes to have interfere are closely matched in length. This is relatively simple to accomplish in the parallel scheme, wherein each successive sensor path length should be longer than the previous path length by an amount $L_0$, where $L_0 >> L_c$ is chosen to be large enough to reduce cross-talk to meet system requirements.

The situation is somewhat more complicated in the series configuration. For example, let $m_1L_0$, $m_2L_0$, $m_3L_0, \ldots, m_k$ an integer, be the differential path delays of the sensing Mach-Zehnder interferometers. The delays need not be numbered in any particular order. Then $m_{k+1}$ must satisfy $m_{k+1} \notin C_k$ and $2m_{k+1} \notin A_k$, where $$A_k = \left\{ n : n = \sum_{j=1}^{k} \epsilon_j m_j, \epsilon_j \in \{0, \pm 1\} \right\} \tag{8}$$

$$B_k = \{0, \pm m_1, \ldots, \pm m_k\}$$

$$C_k = \{n : n = n_1 + n_2, n_1 \in A_k, n_2 \in B_k\}$$

One method of constructing sequences of permissible delays is to start with some particular $m_1$, and then select each subsequent series element to be the next smallest number which satisfies the above constraints. For $m_1 = 1$, the resulting sequences, 1, 3, 8, 21, 55, ..., obeys the recursion relation $$m_{k+1} = 1 + m_k + \sum_{j=1}^{k} m_j.$$

By using z transforms, one may show that this equation has the explicit solution $$m_k = \frac{1}{2}\left(1 + \frac{3}{\sqrt{5}}\right)\left(\frac{3+\sqrt{5}}{2}\right)^{k-1} - \quad (9)$$

$$\frac{1}{2}\left(\frac{3}{\sqrt{5}} - 1\right)\left(\frac{3-\sqrt{5}}{2}\right)^{k-1} \cong 1.17(2.618)^{k-1}$$

This sequence continues indefinitely, so that for a system with any number of sensors N, one can always choose a subset of the sequence to specify the delays. In general, one can also use a set of delays whose construction depends on N. In particular, one can choose $m_k$ according to $$m_k = m_1 + 2^{k-1} - 1 \quad (10)$$

Provided N is $\geq 4$ and $$m_1 \geq 3 \cdot 2^{N-1} - 4 \cdot 2^{\frac{N}{2}} + 3, N \text{ even} \quad (11)$$

$$m_1 \geq 3 \cdot 2^{N-1} - 3 \cdot 2^{\frac{(N+1)}{2}} + 3, N \text{ odd}$$

or, alternatively, $$m_k = m_N - 2^{N-k} + 1 \quad (12)$$

where: N is $\geq 1$; and $$m_N \geq 3 \cdot 2^{N-1} - 2 \cdot 2^{\frac{N}{2}} + 1, N \text{ even} \quad (13)$$

$$m_N \geq 3 \cdot 2^{N-1} - 3 \cdot 2^{\frac{(N-1)}{2}} + 1, N \text{ odd}$$

For example, 4N=5 the smallest sets of these forms are given by [27, 28, 30, 34, 42] and [22, 30, 34, 36, 37], respectively. Note that the last of these three clases of delays given above exhibit the slowest growth of the maximum delay with increasing N. It is not known whether or not more compact sets of delays are possible.

Based on the above-indicated relationship, the particular differential path lengths which are selected will be based upon the anticipated applications for the system.

As was explained previously, at least for the long distance applications, the series configuration is of particular interest since it is lead insensitive, and therefore the sensors can be spaced at remote locations without the necessity of environmental shielding of leads or of other portions of the sensing system.

3. Selecting Coupling Coefficients

Another issue relevant to the design of a coherence multiplexed distributed sensor system, is the proper selection of coupling coefficients for the various directional couplers used in the system. As used herein, the term "coupling coefficient" is defined as the power ratio of the coupled power to the total output power. For example, referring to FIG. 2, if light is applied to port A, the coupling coefficient would be equal to the ratio of the power at port D to the sum of the output at ports B and D.

The determination of the coupling coefficients may be based in part on the intuitive requirement that all sensors experiencing equal environmental modulation amplitudes should return signals of comparable strength to the central processing location. For the series configuration, this means that all sensing interferometers should be built from identical couplers, providing that all the interferometers have comparable environmental sensitivities. The order in which sensors appear in the chain has no effect on the nature of the field which reaches the receivers; thus sensors built from identical couplers will yield signals of equal strength. It is noted that the couplers at the two ends of each sensing interferometer should also be identical.

The solution is less trivial in the case of the parallel system. Assume that there are N sensors in a parallel system such as that illustrated in FIG. 1. Number the sensors with an index j running from 1 to N, starting with j=1 for the sensor closest to the light source 100 and to the receivers 120. Let the power coupling coefficient for the couplers 108 and 112 associated with sensor j be $k_j$, so that a fractional portion $k_j$ of the total power is transferred between the two fibers in the coupler, and an amount of power $1-k_j$ passes straight through the coupler, without being coupled. It is noted the couplers at the ends of a given optical fiber sensor should be identical.

It is assumed for simplicity that light must couple across fibers in the couplers 108 in order to get from the input bus 102 to a sensing fiber 110 and back to the return bus 114, although the situation could just as well be reversed. Light returning from sensor j will have suffered loss from couplers 1 through j on both the input bus 102 and the return bus 114. Couplers 1 through j−1 will have a transmission $1-k_q$ for both the input and return couplers 108 and 112, respectively, and the two couplers at sensor j will have a transmission $k_j$. Hence, the power returning from sensor j to the receivers 120 is given by $$P_{j,\text{return}} = P_{in} k_j^2 \prod_{q=1}^{j-1} (1 - k_q)^2 \quad (14)$$

where $P_{in}$ is the power being sent to the sensor array. Setting $P_{j+1,\text{return}} = P_{j,\text{return}}$ it is found that the coupling coefficients are related by $k_{j+1} = k_j/(1-k_j)$, or equivalently, $$k_j = \frac{k_{j+1}}{1 + k_{j+1}} \quad (15)$$

The last sensor does not really require any couplers since no power is needed for the later sensors; hence one can set $k_n = 1$. Together with the recursion relation just derived, this implies that the coupling coefficient for the couplers of sensor j is just $$k_j = 1/N - j + 1 \quad (16)$$

This, in turn, means that the total transmission $P_{j,\text{return}}/P_{in}$ is the same for every sensor, as expected, and is equal to $1/N^2$.

One of the factors of 1/N appears because the input power has to be split up among N sensors. The other factor of 1/N is a result of the unavoidable loss which occurs when signals from two fibers (the sensing optical fiber 110 and the return bus 114) are combined by a passive linear coupler 112 to form one single-mode signal (i.e. the signal on the return bus). Note that coupling constants which are not determined by the requirement of equal sensor sensitivities can be selected so as to maximize the signal-to-noise performance of each sensor.

4. Mathematical Theory of the System

Having specified the structure of a coherence multiplexed system, attention is now directed to the signal which is produced in one such configuration. FIG. 15 illustrates a simplified version of a series system similar to the one illustrated in FIG. 7, with the exception that there is only one sensor 404 and one receiver 418. Although this is not truly a multiplexed system, it serves to illustrate some characteristics of the coherence multiplexed system of the present invention.

Let the optical field present at the input of fiber 402 from light source 100 be given by $\sqrt{2P_0}u(t)e^{i\Omega t}$ where $P_0$ is the optical power and $u(t)e^{i\Omega t}$ is the stochastic analytic signal describing the field, normalized so that its mean square value $<|u(t)|^2>$ is unity. If a lossless system is assumed, in which all couplers 407, 408, 422 and 424 are set to a 50% coupling coefficient, and all optical paths through the system result in the same final polarization of the optical signal, then the optical power $P(t)$ incident on the detector 434 is given by $$P(t) = \frac{P_0}{16} |u(t - T_0) + (e^{-i\phi_s} + e^{-i\phi_r})u(t - T_0 - T) + e^{-i(\phi_s+\phi_r)}u(t - T_0 - 2T)|^2 \quad (17)$$

where:

$T_0$ is the minimum delay through the system;
$T$ is the differential delay in each sensor 404 and receiver 418; and
$\phi_s$ and $\phi_r$ are the differential phase delays in the sensor 404 and receiver 418.

Taking the expected value of this expression and using the normalized self-coherence function $\Gamma_u(\tau) = <u(t+\tau)u(t)\leq$, the expected detected power can be written as $$<P(t)> = \frac{P_0}{8} \{2 + \cos(\phi_s - \phi_r) + Re[2\Gamma_u(T)(e^{i\phi_s} + e^{i\phi_r}) + \Gamma_u(2T)e^{i(\phi_s+\phi_r)}]\} \quad (18)$$

It may be shown that the self-coherence function $\Gamma_u(\tau)$ is the Fourier transform of the single-sided optical power spectral density, appropriately normalized and shifted to the origin. Consequently, if the light produced by the source 100 has a Lorentzian lineshape with a full width at half maximum (FWHM) given by $(\pi\tau_c)^{-1}$, then the self-coherence function will be $\Gamma_u(\tau) = e^{-|\tau|/\tau_c}$. This implies that if the sensor and receiver mismatch $T$ is chosen to be much greater than the coherence length $\Gamma_c$, then $\Gamma_u(T)$ and $\Gamma_u(2T)$ become negligibly small, so that $$<P(t)> = \frac{P_0}{8} [2 + \cos(\phi_s - \phi_r)] \quad (19)$$

Thus, the received power is given by a mean level equal to one quarter of the input power, together with a modulation dependent on the signal phase $\phi_s - \phi_r$. The modulation depth is only 50% because only two of the four paths from the source to the detector interfere. The other two paths just add to the mean received power. Specifically, the optical signal which travels the path defined by arms 410 and 426 interferes with the signal which travels the path which includes arms 409 and 428. Conversely, the signals traveling the path which includes arms 409 and 426, as well as the path which includes arms 410 and 428, do not interfere.

In taking the expected value of $<P(t)>$ to obtain the detected signal, the incoherence noise $P(t)-P(t)>$ which will be present in practice, has been been averaged out. If one assumes that the light at the output of the light source has a random phase which may be modeled as a Wiener-Levy stochastic process, together with a negligible intensity noise, then one may show that the two-sided power spectral density of the incoherence noise is given by $$G_N(f) = \left(\frac{P_0^2}{128}\right) \frac{\tau_c}{1 + (\pi f \tau_c)^2} \{1 + 4[1 + <\cos(\phi_s - \phi_r)>] [1 + \cos(2\pi f T)]\} \quad (20)$$

where the signal phase $\phi_s - \phi_r$ must be averaged since it is now being treated as a stochastic quantity. Thus, the spectrum of the incoherence noise is characterized by a Lorentzian envelope, with a width equal to twice the source linewidth, and a height that depends on the signal phase. Within the envelope there is a cosinusoidal modulation which peaks at zero frequency and has a period 1/T. For comparison, if one were to inject a power $P_0/4$ into a single strongly mismatched Mach-Zehnder interferometer, the incoherence noise power spectral density would be $$G_N(f) = \left(\frac{P_0^2}{128}\right) \frac{\tau_c}{1 + (\pi f \tau_c)^2} \quad (21)$$

This normalization is convenient since it also allows this expression to be interpreted as giving the incoherence noise power spectral density that results when the polarizations in the single sensor serial system are adjusted to allow only two pairs of paths to interfere incoherently. Comparison of the two expressions for $G_N(t)$ reveals that the modulated signal dependent part of the spectrum in the double Mach-Zehnder case results from interference between the signal-bearing paths and the other two paths, while the unmodulated portion of the spectrum results from interference between the two paths which do not contribute to the signal.

5. The Limit to System Sensitivity Due to Incoherence Noise

Since incoherence noise is the dominant type of noise in coherence multiplexing systems with a relatively small number of sensors, knowledge of the incoherence noise spectrum allows one to predict the phase sensitivity of a sensor/receiver pair. However, before this can be done, one must specify the system further since in general both the small signal phase sensitivity and the noise level depend on the phase of the system, which undergoes constant change due to low frequency environmental noise.

This signal fading is a significant problem for all Mach-Zehnder type sensors, and coherence multiplexed sensors are as susceptible to this as are other phase sensors. One solution to this problem is to heterodyne the signal by introducing a frequency shifter into one arm of the receiver, in the manner described previously with respect to the embodiment of FIG. 1. In this case, the phase $\phi_s - \phi_r$ acquires the form $$\phi_e + 2\pi f_h t + \Delta\phi_a \sin 2\pi f_a t \quad (22)$$

where:

$\phi_e$ is a slowly changing environmental phase bias;
$f_h$ is the heterodyne frequency; and
$\Delta\phi_a \sin 2\pi f_a t$ is the acoustic signal detected by the sensor. If $\Delta\phi_a$ is small, then the heterodyned signal will have a power spectrum given by $$G_{<P>}(f) = \frac{P_0^2}{16}\delta(f) + \frac{P_0^2}{2^{10}}\sum_{\epsilon=\pm 1}\{4\delta(\epsilon f - f_h) + \quad (23)$$

$$(\Delta\phi_a)^2[\delta(\epsilon f - f_h - f_a) + \delta(\epsilon f - f_h + f_a)]\}$$

where $\delta(.)$ represents the Dirac delta function. Comparing this to the noise power spectral density $G_N(f)$ and noting that $<\cos(\phi_s - \phi_r)> = 0$ and $f_a$, $f_h << 1/T$, we see that $$(\Delta\phi_a)_{S/N=1} = 6\sqrt{2B\tau_c} \quad (24)$$

where:

$(\Delta\phi_a)_{S/N=1}$ is the magnitude of $\Delta\phi_a$ for which the signal and noise levels are equal; and
B is the bandwidth of the detection electronics.

The Pseudo-Heterodyne Technique For Preventing Signal Fading

While conventional heterodyning provides one method for avoiding signal fading and for distinguishing between signals in the desired frequency range and lower frequency environmental effects, this approach has the disadvantage that it requires the use of frequency shifters, which often comprise bulk optics devices. Such devices can be bulky, increase system loss, degrade efficiency, and can be costly. This is not a large problem for the parallel system, such as is illustrated in FIG. 1, since only a single frequency shifter placed at the beginning of the tapped delay line 106 would be required to heterodyne all of the signals. However, in order to heterodyne all of the signals in the series system of FIG. 7, a frequency shifter would be required in one arm of each receiver. This could become very costly, in addition to problems of increased system size and inefficiency.

An easier and less expensive method to avoid signal fading is a pseudo-heterodyne technique which requires no bulk optic devices in the optical path of the sensor system. The technique is defined in connection with its application in a fiber-optic gyroscope in B. Y. Kim and H. J. Shaw, "Phase-Reading All-Fiber-Optic Gyroscope," *Optical Letters*, Vol. 9, Page 378, (1984). The technique is also disclosed in connection with its application in a fiber-optic gyroscope in co-pending U.S. patent application Ser. No. 603,630 entitled "Phase Reading Fiber-Optic Rotation Sensor," filed Apr. 25, 1984, and assigned to the assignee of this present application. Both the above reference paper and patent application are hereby incorporated herein by reference.

The application of the technique to the distributed sensor of the present invention can be described by reference to FIG. 16. The sensing system of FIG. 16 comprises a simplified series system corresponding to the system of FIG. 15, which is presented for discussion purposes. It will be appreciated that additional sensors and receivers can be incorporated into the system to define configurations such as those illustrated in FIGS. 7, 8, and 9. Because of its similarity to the system of FIG. 15, the corresponding elements of the system in FIG. 16 are numbered in accordance with the numbering of FIG. 15, except where specific elements are different.

In particular, the system of FIG. 16 includes a polarization controller 551 in arm 410 of sensor 404. Controller 551 functions to maintain the appropriate polarization relationship of the optical signals passing through the controller. One preferred embodiment of a polarization controller for use with the present invention is described subsequently herein.

The arm 410 is connected through coupler 407 to an optical fiber 552, which is then interconnected through coupler 422 to an arm 554 of the receiver interferometer. In arm 428 of receiver 418 is positioned another polarization controller 557, for maintaining the polarization of light traveling in that arm 428. In addition, a phase modulator 558 is positioned in optical communication with the arm 428 of receiver 418. Phase modulator 558 is controlled by a connection to a signal generator 550 which produces a sinusoidal signal at a modulation frequency $f_m$. The signal generator 550 is also connected to a gate circuit 556, so as to control that gate in producing a square wave signal on a periodic basis. Gate 556 is connected to an AC amplifier 553 which itself is connected to detector 434, so as to receive and amplify optical signals from the detector 434, for further processing in gate 556, as will be discussed below. The output of gate 556 is electronically connected to a spectrum analyzer 560, for use in identifying sidebands around a harmonic of the modulation frequency in order to monitor the phase shift in the sensor 404 at a particular frequency.

In the system of FIG. 16, the optical signals propagate and interfere in the manner previously described with respect to FIGS. 7 and 15, except as is otherwise indicated below. Specifically, the light in arm 428 is phase modulated by the phase modulator 558, which is driven at a modulation frequency corresponding to the operating frequency of generator 550. As a result, the intensity of the output signal from coupler 424 which is received by detector 434 is modulated, and the resulting electrical output signal from detector 434 contains components at the phase modulation frequency $f_m$ and its harmonics, as indicated by the following equation:

$$I(t) = C[1 + \cos(\Delta\phi_m\sin\omega_m t + \Delta\phi_a\sin\omega_a t + \Delta\phi_e)] = C[1 + \quad (25)$$

$$\{J_0(\Delta\phi_m) + 2\sum_{n=1}^{\infty} J_{2n}(\Delta\phi_m)\cos 2n\omega_m t\}\cos(\Delta\phi_a\sin\omega_a t + \Delta\phi_e) -$$

$$\{2\sum_{n=1}^{\infty} J_{2n-1}(\Delta\phi_m)\sin(2n - 1)\omega_m t\}\sin(\Delta\phi_a\sin\omega_a t + \Delta\phi_e)]$$

where

C is a constant;
$J_n$ denotes the nth order Bessel function;
$\Delta\phi_m$ is the amplitude of the phase modulation between the light waves in arms 428 and 554 due to the phase modulator 558;
$\omega_m = 2\pi f_m$; $\Delta\phi_a$ is the amplitude of the phase difference between the light waves in arms 428 and 554 produced by external acoustic signals;
$\omega_a t = 2\pi f_a$; and $\Delta\phi_e$ is the amplitude of the phase difference between the light waves in the arms 428 and 554 produced by slow changes in the environment.

Equation 25 indicates that the output from detector 434 contains terms including: $\cos(\Delta\phi_a \sin \omega_a t + \Delta\phi_e)$ and $\sin(\Delta\phi_a \sin \omega_a t + \Delta\phi_e)$. However, these cosine and sine elements are at different frequencies. If these signals were at the same frequency, with their phases in quadrature, well-known trigonometric rules could be applied so that the signals could be added directly to obtain a single, low frequency, sinusoidal signal whose phase corresponds to $(\Delta\phi_a \sin \omega_a t + \Delta\phi_e)$. Such a relationship can be achieved in the system of FIG. 16 through use of amplitude modulation. Amplitude modulation simply involves making the amplitude of the electrical output signal from detector 434 vary in accordance with the amplitude of a modulating signal.

When the output signal from detector 434 is amplitude modulated by a modulating signal having a frequency which is an odd multiple of the phase modulation frequency ($f_m$) (which is also the difference frequency between adjacent harmonics), then each component of the output signal from detector 434 which is a harmonic of $f_m$ becomes partially translated into the frequencies of its harmonic neighbors. In other words, through amplitude modulation in this manner, sideband frequencies are created at harmonics of the phase modulation frequency. The sideband frequencies are combined with the component of the output signal at the corresponding frequency, and are readily identified by use of a spectrum analyzer.

These and other characteristics of amplitude modulation are generally known to those skilled in the art and are described in detail in F. G. Stremler, *Introduction to Communication Systems*, Addison-Wesley, (1979), which is incorporated herein by reference. Subject matter of particular relevance at this point is set forth on pages 191–260 of the Stremler text.

Based on the above, it will be appreciated that a sinusoidal amplitude modulation at a frequency $f_m$ will transfer energy out of each harmonic frequency component and into the nearest harmonic frequency neighbors. To prevent interference in the present sensor system, it is desirable that $f_m$ be much greater than $f_a$ (the frequency of acoustic signals which are being detected).

In operation, the optical signal in arm 428 of receiver 418 is amplitude modulated at a frequency which is controlled by frequency generator 550. As indicated above, the frequency of generator 550 is selected so that $f_m$ (the modulation frequency) is much greater than the acoustical frequency ($f_a$). The signal from arm 428 passes through coupler 424 where it is mixed with the signal from arm 554, producing an intensity modulated signal due to the phase difference which is passed to detector 434. From detector 434, the intensity modulated signal due to the phase difference is communicated through an amplifier 553 where the signal is amplified and then transmittedd to a conventional electronic gate 556.

Gate 556 functions in response to a signal received on line 555 from the frequency generator 550, causing gate 556 to produce a square wave amplitude modulation of the signal received from amplifier 553. When modulated at the appropriate phase with respect to the AC detector current, and with the appropriate choice of $\Delta\phi_m$, the amplitude modulated signal of this embodiment may be defined as $\cos[n\omega_m t - (\Delta\phi_a \sin \omega_a t + \Delta\phi_e)]$.

With respect to the appropriate phase and amplitude for modulation, it is noted that due to the trigonometric relationships between the waveforms in coupler 424, amplitude modulation at even harmonics of $f_m$ would not produce coupling between adjacent harmonic frequencies. Rather, amplitude modulation at even harminics of $f_m$ would result in the even harmonics coupling with even harmonics, and odd harmonics coupling with odd harmonics. This situation is generally understood by those skilled in the art, and the basis for this condition may be more fully understood with reference to the Stremler text which has been incorporated herein. These problems are avoided if amplitude modulation at the odd harmonics is utilized.

The output from gate 556 is communicated via line 568 to a spectrum analyzer 560 for processing. It is noted that spectrum analyzers 560 incorporate a band pass filter for selecting and analyzing particular components of signals. If such a band pass filter, centered on $2\omega_m$, were placed on the output of the gate, and if the amplitude of the phase modulation $\Delta\phi_m$ were chosen appropriately, the filter would pass a signal of the form:

$$V(t) = k \times \{J_0(\Delta\phi_a)\cos(2\omega_m t - \Delta\phi_e) + \qquad (26)$$

$$\sum_{n=1}^{\infty} J_{2n}(\Delta\phi_a)[\cos(2(\omega_m - n\omega_a)t - \Delta\phi_e) + \cos(2(\omega_m + n\omega_a)t - $$

$$\Delta\phi_e)] + \sum_{n=1}^{\infty} J_{2n-1}(\Delta\phi_a)[\cos((2\omega_m - (2n-1)\omega_a)t - \Delta\phi_e) - $$

$$\cos((2\omega_m + (2n-1)\omega_a)t - \Delta\phi_e)]\}$$

where k is a constant which does not influence the identification and evaluation of phase shifts occurring in the sensor at particular frequencies.

By putting the demodulated signal from the gate 556 into the spectrum analyzer 560, the height of the Bessel function sidebands around the second harmonic of the modulation frequency can be measured by use of techniques which are well-known in the technology to give the phase shift in the sensor at a particular frequency. Alternatively, for a complicated signal, an FM demodulator could be used. In that case, the measured signal would be the derivative of the phase rather than the actual phase, or alternatively, an integrator could be used to produce a measured signal representative of the actual phase.

Optionally, gating of the system of FIG. 16 could be accomplished optically rather than electrically by utilizing at least one optical gate, such as a shutter, positioned between coupler 424 and detector 434, or on any fiber in the system comprising an optical path where all light signals travel, such as fiber 402, or optical fiber 552. If the gate were positioned distant from the detector 434, the gate should be controlled by a delay signal at a frequency $f_m$ so that the light traveling within the system would be amplitude modulated at the $f_m$ frequency, in appropriate phase with the distant gate. In all other respects, the use of optical gating would provide a result substantially identical to that described in connection with electrical gating.

The embodiment of FIG. 16 was constructed and tested to evaluate its performance. In this embodiment, the light source 100 comprised an essentially single-mode laser diode emitting 790 nm light. All optical fibers in the system comprised ITT-1601 fiber, which is designed for use at 633 nm but guides a single-mode loosely at 790 nm. The difference in arm lengths in each individual interferometer was approximately 21 meters, while the differential lengths of the two interferometers 404 and 418 were matched to within 8 cm by using 120 psec (FWHM) pulses to probe the Delta function response of each interferometer separately.

The coherence length of the light source 100 was determined to be about 4.5 m in fiber. The directional couplers were of the type described previously herein, as were the phase modulators. The polarization controllers corresponded to those described hereafter. One polarization controller 557 allowed the polarizations of the two paths carrying interfering signals (the path defined by arms 410 and 554, and the path defined by arms 409 and 428) to be aligned so that the modulation depth was maximized. The other polarization controller 551 allowed the shortest and longest paths (the path through arms 409 and 554, and the path through arms 410 and 428, respectively) to both be made either parallel or perpendicular to the paths carrying the interfering signals.

Coupling ratios of the optical coupler were determined by use of the impulse response of the system, with optimal response being a 1:2:1 ratio of the pulses, so that the power from all four paths was equal.

Light was detected at the end connected port in coupler 408. By rotating the orientation of polarization controller 551, incoherence noise at this port was reduced by approximately 20-30 dB at a given frequency.

Incoherence noise measured at the output of the system produced a cosinusoidal spectrum with minima occuring approximately every 10 MHz. The periodicity corresponded to the time delay of the interferometers 404 and 418, which was approximately 105 msec. At acoustic frequencies the spectrum of the noise was relatively flat and at its maximum value.

It was noted that if paths which do not contribute to the interfering signals were made orthogonal to the interfering signal paths, then incoherence noise was minimized, while if all paths were parallel, the noise was maximized.

The geometrical mean of the minimum detectable phase modulation amplitude with the incoherence noise minimized was 1.2 mrad/$\sqrt{Hz}$. When incoherence noise in the sensor 404 was maximized, the minimum measurable acoustical caused phase difference ($\Delta\phi_a$) went to an average of 4.1 mrad/$\sqrt{Hz}$. The ratio of the maximized and minimized minimum detectable phase modulations was 3.4.

The Polarization Controllers 551, 557

One type of polarization controller suitable for use in the sensor system of the present invention, such as the embodiment of FIG. 16, is illustrated in FIG. 17. The controller includes a base 570 on which a plurality of upright blocks 572a through 572d are mounted. Between adjacent ones of the blocks 572, spools 574a through 574c are tangentially mounted on shafts 576a through 576c, respectively. The shafts 576 are axially aligned with each other and are rotatably mounted between the blocks 572. The spools 574 are generally cylindrical and are positioned tangentially to the shafts 576.

A segment of optical fiber 410 extends through axial bores in the shafts 576 and is wrapped about each of the spools 574 to form three coils 578a through 578c. The radii of the coils 578 are such that the fiber 410 is stressed to form a birefringent medium in each of the coils 578. The three coils 578a through 578c may be rotated independently of each other about the axis of the shafts 574a through 574c, respectively, to adjust the birefringence of the fiber 410 and, thus to control the polarization of the light passing through the fiber 410.

The diameter and number of turns in the coils 578 are such that the outer coils 578a and 578c provide a spatial delay of one-quarter wavelength, while the central coil 578d provides a spatial delay of one-half wavelength. The quarter wavelength coils 578a and 578c control the elipticity of the polarization, and the half wavelength coil 578d controls the direction of polarization. This provides a full range of adjustment of the polarization of the light propagating through the fiber 410.

It will be understood, however, that the polarization controller may be modified to provide only the two quarter wave coils 578a and 578c, since the direction of polarization (otherwise provided by the central coil 578b) may be controlled indirectly through proper adjustment of the elipticity of polarization by means of the two quarter wave coils 578a and 578c. Accordingly, the polarization controllers 551 and 557 are shown in FIG. 16 as including only the two quarter wave coils 578a and 578c. Since this configuration reduces the overall size of the controllers 551 and 557, it may be advantageous for certain applications of the present invention involving space limitations.

Thus, the polarization controllers 551 and 557 provide means for establishing, maintaining and controlling the polarization of the light within arm 410 of sensor 404 and arm 428 of receiver 418.

Fiber-Optic Variable Delay Line

A fiber-optic embodiment of the variable delay line, such as 254 of FIG. 4 and 318 of FIG. 5, can best be described by reference to FIGS. 18-25. FIG. 18 illustrates a plurality of optical fibers 584 mounted on a chip 586 with individual V-grooves (not shown) extending longitudinally along the surface of the chip to receive each optical fiber 584. Taps are formed by simultaneously polishing the fibers and the chip 586 so that each of the optical fibers 584 is tapped at a lateral line 585.

The optical taps are constructed on the fibers 584 by mounting them in a curved configuration so that the selected portion of the optical fibers 584 may be lapped. Thus, the silicon chip 586 is mounted on a block of quartz 580 which has a curved upper surface 582. After positioning the fibers in the V-grooves, and securing them within the grooves, the upper surfaces of the optical fibers 584 are lapped at lateral line 585. This lapping operation removes a portion of the cladding from the fiber, although not all of the cladding material around the core of optical fiber 584 is removed. The distance between the core of the fiber and the lapped surface depends on the characteristics of the coupler which is to be formed, so as to define appropriate interaction regions for coupling of the light waves.

The upper half of the delay line is formed of a quartz block 591 including a groove 593 of the type which is used in the standard optical coupler which was described with respect to FIG. 2. The groove 593 has a relatively large radius of curvature, peaking at the center of the substrate 591. An optical fiber 595 is placed within the groove 593 and secured using epoxy or any other satisfactory adhesive. This fiber is then lapped at the highest point of the curve along with the surface of the quartz block 591 to yield a planar surface for the cladding, which is a few microns separated from the core of the fiber, and which is co-planar with the surface of the quartz block 591.

An index matching oil is placed on the polished flat surface 82 of the silicon substrate 66. In this case, the index matching oil advantageously has an index of refraction slightly lower than that of the fiber elements 584 and the fiber cores themselves to prevent loss of light outside of the coupling area.

In order to have a continuously variable delay line for at least a small range of delay, the radius of curvature of the first substrate 596 must be substantially larger than the radius of curvature of the second substrate 591. Thus, as an example, the second substrate 591 with the single fiber 595 might have a radius of curvature of approximately 25 cm. When lapped and polished, the fiber 595 would have an interaction region length of approximately 1 mm. The radius of curvature of the first substrate 586 might, for example, be approximately 50 cm. When the first substrate 596 is lapped and polished, the interaction region will be substantially longer than the interaction region for the second substrate. Thus, when the fiber 595 of the second substrate 591 is aligned with any one of the loops of fiber 584 in the interaction region of the first substrate 596, this second substrate fiber 595 may be adjusted along the length of the first substrate interaction region.

This movement along the length effectively acts to change the length through which the light travels and thus provides a continuously variable delay.

Of course, it can be seen that, by laterally adjusting the substrate 591, the fiber 595 can be coupled with any one of the loops of the fiber 584. Thus, by moving substrate 591, different amounts of delay can be obtained, providing a discreetly variable delay line. Although FIG. 18 illustrates the continuously variable delay line as part of a discreetly variable delay line element, the continuously variable delay line could be constructed using only a single, large radius of curvature V-groove and fiber on the first substrate 586.

Figure 19:
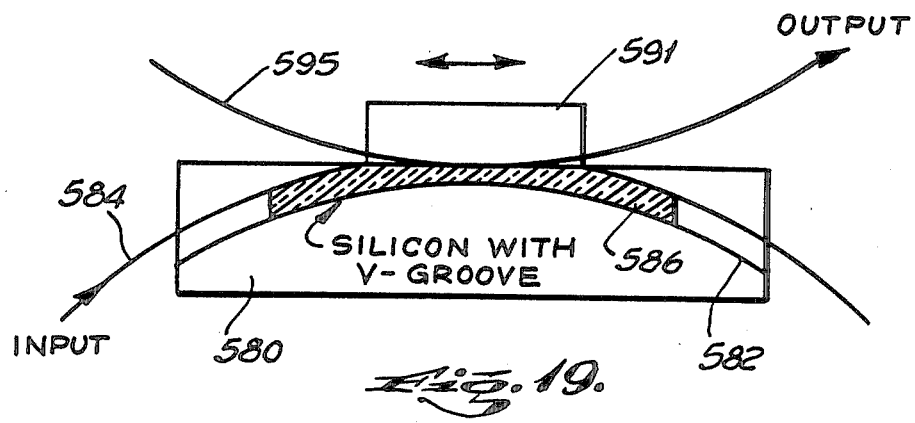
FIG. 19 shows a cross-sectional view of a continuously variable fiber-optic coupler.

FIG. 19 shows a side view of the continuously variable fiber-optic delay line. In this view, the difference in the radii of curvature between the first substrate 586 and the second substrate 591 is apparent. Also from this drawing, it can be seen that as the second substrate 591 is moved longitudinally along the first substrate 586, while maintaining coupling with the fiber 584 in the first substrate 586, the distance between the cores of fibers 595 and 584 will vary somewhat because the core of the fiber 584 is slightly curved. This difference in distance will cause some difference in coupling. For many applications the difference in coupling will be insignificant. However, if it is imperative that the coupling be identical for all delays, the amount of coupling can be varied as needed by moving the second substrate 591 laterally with respect to the first substrate 586. As was mentioned previously, this movement acts to change the coupling between the two fibers 595 and 584.

FIG. 20 shows a fixture for permitting accurate adjustment of the upper substrate 591 with respect to the lower substrate 586 to provide the necessary relative motion between those substrates. Lateral and angular motion is accomplished by fixing the quarter block 580 in a lower trough created by a pair of walls 602 and 604 of a frame 606. The wall 604 is slightly lower in heighth than the edge of the block 580 of the delay line. A pair of ledges 608 above the walls 102 and 104 are wide enough to permit at least half the width of the substrate 591 to slide over them. An upper wall 610 supports two spring members 612 which maintain the upper substrate 591 biased away from the wall 610.

A pair of micrometers 614 and 616 are mounted in the frame 606. The micrometer 614 bears upon the upper substrate 591 of the variable delay line against a spring 612 and is adjusted to change the optical coupling from one to another of the fibers 584. The micrometer 614 is centrally located on the side of the substrate 591 to permit this lateral adjustment without rotation of the substrate 591. The micrometer 616 is offset on the upper substrate 591 so that it can be used to adjust the angular orientation of the upper substrate 591 with respect to the lower substrate 580.

In order to obtain longitudinal movement of the substrate 591 with respect to the substrate 586, the substrate 586 is held in place longitudinally by pins such as the pin 628. The substrate 591 is moved longitudinally over the substrate 586 by rotating a knob 630. The knob 630 is mechanically coupled to blocks 632 and 634 to move them in unison longitudinally across a block 636 as needed. The blocks 632, 634 and 636 include dovetail joints 638 to maintain alignment of these elements during such adjustment. When the blocks 632 and 634 are moved, the pressure of the micrometers 614, 616 and spring 612 on the second substrate 591 acts to hold this substrate 591 such that it will be moved along the blocks 632 and 634.

Figure 21:
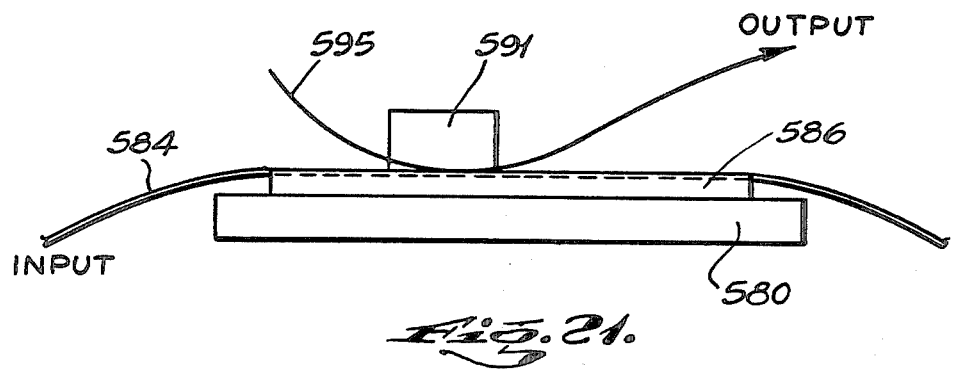
FIG. 21 shows a cross-sectional view of a continuously variable fiber-optic coupler with a flat substrate.
Figure 22:
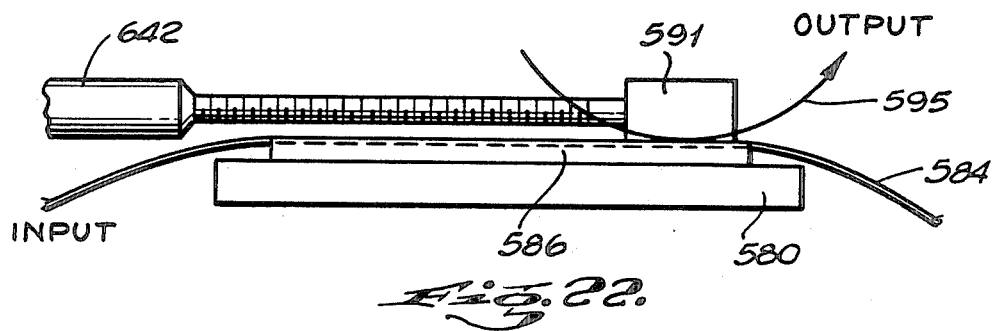
FIGS. 22 and 23 show the coupler of FIG. 22 in maximum and minimum delayed positions, respectively.
Figure 23:
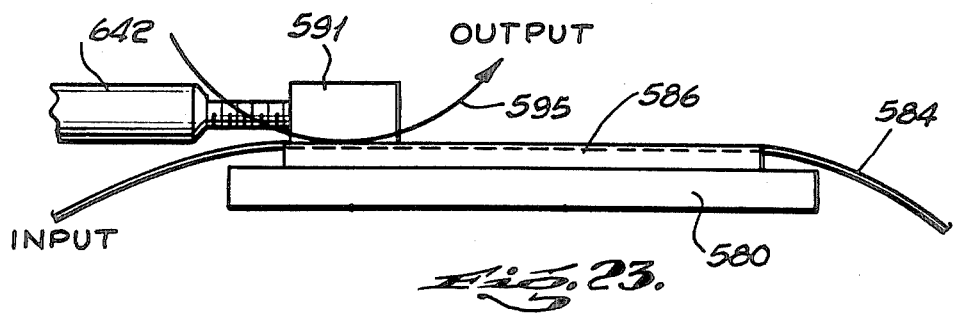

FIGS. 21-23 show a continuously variable delay line wherein the radius of curvature of the first substrate 586 is infinitely large (i.e., a portion of the substrate 586 is flat). Although this is somewhat more difficult to construct, placement of the fiber 584 into a flat silicon V-groove eliminates changes in coupling between the fibers 595 and 584 along the length of the fiber 584. Thus, as the second substrate 595 is moved across the flat substrate 586, the distance between the cores of the fibers 591 and 584 will remain constant.

FIGS. 22 and 23 illustrate maximum and minimum delay, respectively, for this device. The means for moving the second substrate 591 with respect to the first substrate 586 is a micrometer 642. This micrometer 642, as well as the devices for moving the substrates with respect to one another as illustrated in FIG. 21, can be motorized or servoed in any well-known manner.

Figure 24:
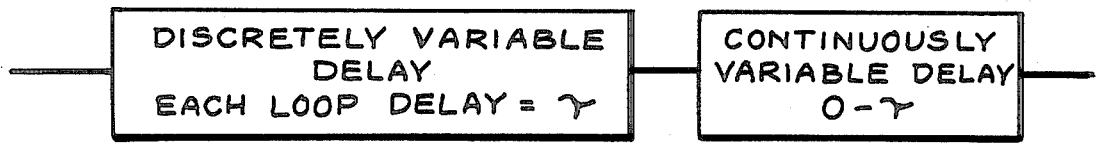
FIGS. 24 and 25 show combinations of discreetly variable delay devices with continuously variable delay devices to produce continuously variable delay over relatively long periods of delay.
Figure 25:
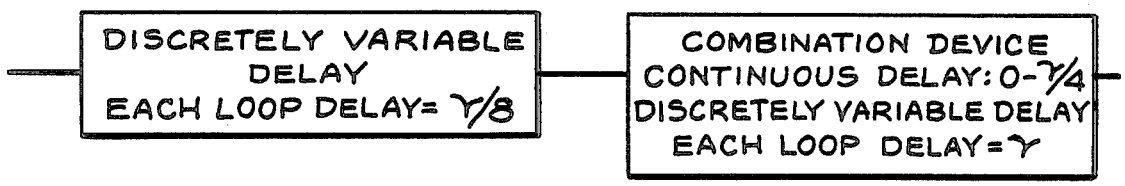

FIGS. 24 and 25 show two arrangements for achieving a wide range of continuously variable delay, using a combination of a discreetly variable delay element and a continuously variable delay element. In FIG. 24 it can be seen that the first element in the delay line is a discreetly variable delay wherein each loop delay is equal to T. In series with this discreetly variable delay is a continuously variable delay line wherein the variable delay is from 0 to T. The continuously variable delay may be provided by combining a plurality of continuously variable delay elements which provide shorter periods of delay in series with each other until they provide a total continuous delay equal to T.

FIG. 25 is an example of how the combination discreet and variable delay of FIG. 18 may be used in series with a discreetly variable delay to provide a continuously variable delay over a wide range of time periods. The combination device would have a discreetly variable delay wherein each loop delay is T. The continuous delay of the combination device would be from 0 to T/4. The discreetly variable delay line which is placed in series with the combination delay line would have a loop delay of T/8. This would act to provide a continuous variable delay line over a period of delay equal to N×T where N is the number of loops in the combination delay device.

Fiber-Optic Modal Coupler

Optical couplers which may be utilized for coupling optical signals between modes in birefringent or two-mode optical fiber are disclosed in R. C. Youngquist, et al., "Two-mode Fiber Modal Coupler", *Optics Letters*, Vol. 9, No. 5, (May, 1984); J. L. Brooks, et al., "Active Polarization Coupler For Birefringent Fiber", *Optics Letters*, Vol. 9, No. 6, (June, 1984); U.S. patent application Ser. No. 556,305 filed Nov. 30, 1983 entitled "Birefringent Fiber Narrow Band Polarization Coupler"; and U.S. patent application Ser. No. 556,306 filed Nov. 30, 1983 entitled "Fiber-Optic Modal Coupler". Each of the above-identified references are hereby incorporated herein by reference.

One preferred embodiment of a coupler for providing power transfer between the fundamental and second order modes in two-mode fibers, or between the X and Y polarization modes in birefringent single mode fiber, comprises a device which produces periodic coupling between the modes that matches the beat length of the modes. This periodic coupling is obtained by periodically deforming the fiber. The coupler for accomplishing this coupling is described below in conjunction with FIGS. 26-30.

1. Structural Features of the Coupler

FIG. 26 shows the modal coupler in perspective view. A polished, flat surface 910 is machined on a metal or plastic block 911. The surface 910 should be smooth and flat to within a few microns. An optical fiber 924 is disposed between the surface 910 and the undersurface of a second block 914 which has a multiple ridge region 912 machined thereon. The ridge region 912 provides a series of ridge-shaped coupling elements which, when pressed against the fiber 924 so as to squeeze the fiber between the blocks 911 and 914, thereby stressing the fiber at periodic intervals to cause light to be coupled between the modes.

Figure 27:
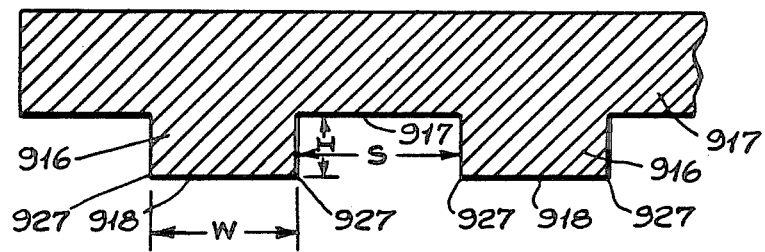
FIG. 27 is a cross-sectional view taken along the lines 27—27 of FIG. 26 showing the shape of the ridges of the modal coupler.

Referring briefly to FIG. 27, there is shown a cross section of the ridge region 912 in which a plurality of ridges 916 are formed. The ridges 916 are formed by machining the block 914 to provide spaced parallel notches or grooves 917 such that there is formed a plurality of polished ridge surfaces 918, each having a width W and providing a separation S between the edges of adjacent ridges. In the embodiment shown, the width W and separation S are each one-half beat length of the fiber for light at the particular frquency which is utilized. In theory, the width W of each ridge 916 can be any odd multiple of one-half beat length, and the separation S between adjacent ridges can be any odd multiple of one-half beat length.

The cross section of the notches 917 in the preferred embodiment is rectangular since that is the easiest shape to machine. However, this shape is not critical. Any shape that yields a flat surface 918 on the ridges 916 will be satisfactory, provided the height H of the notch 917 is sufficient to maintain stress when the material of the ridge 916 is deformed by application of force to the fiber. In a preferred embodiment, the block 914 is made of a hard plastic, such as Deltrin ™. This plastic deforms more readily than glass, and thus avoids damage to the fiber when stressing the fiber. For complete power transfer it is important that the ridges apply stress to the fiber so as to provide alternate regions of deformation and no deformation in the fiber. The overall length of the device is not critical; however, in the embodiment shown, the length is on the order of two to three inches. Further, it has been found that when non-birefringent fiber is used, a force of about 3 kg applied to the block 914 is required to achieve maximum coupling, regardless of the number of ridges 916.

Returning to FIG. 26, the block 914 has a plurality of holes 920 spaced in a pattern to receive a set of pins 922 projecting from the flat surface 910 in a matching pattern. The block 914 may be slid toward and away from the flat surface 910 along the pins 922. The pins 922 are so aligned and the ridge 916 oriented such that the edges of the ridges 916 are transverse to the longitudinal axis of the fiber 924, which is held on the flat surface 910 by a pair of fiber holding plates 926. Thus, the edges of the ridges 916, illustrated by the reference numbers 927 in FIG. 27, are transverse to the longitudinal axis of fiber 914. The pins 922 also serve to prevent rocking of the block 914 to prevent uneven pressure from being applied to fiber 924.

If desired, the ends of the pins 922 may be threaded for receiving respective nuts (not shown) and respective coil springs (not shown) may be placed between the nuts and the upper block 914 in order to control the pressure exerted by the top plate 914 on the fiber 924.

The holding plates 926 are disk-shaped with a V-shaped cutout therein for receiving the fiber and are mounted in respective circular apertures of respective end plates 928 which are mounted at the ends of the block 911 so that they are perpendicular to the flat surface 910. However, any other suitable method of holding the fiber may be used alternatively.

2. Theory of Operation for Birefringent Fiber

Figure 28:
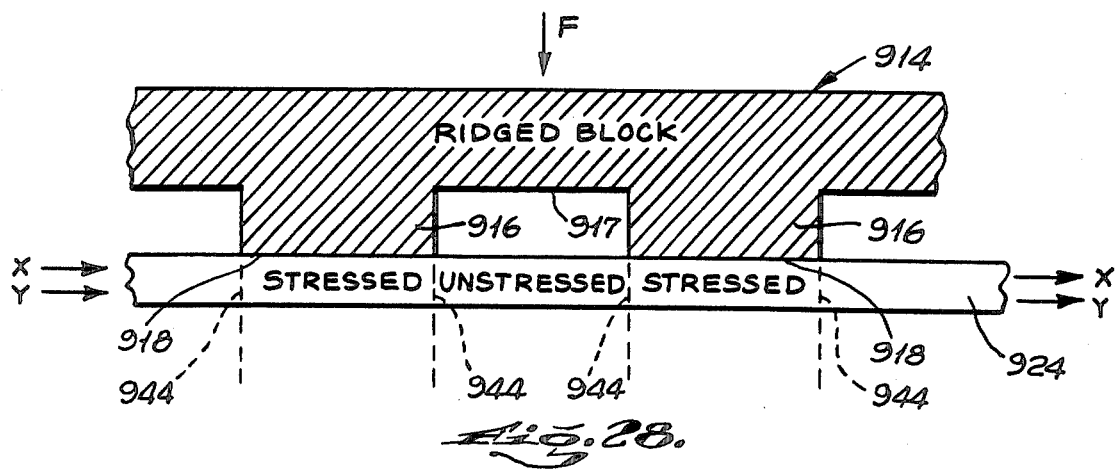
FIG. 28 shows a pair of ridges pressed against a highly birefringent fiber to form stressed and unstressed regions.

As shown in FIG. 28, application of a vertical force F to the plate 914 presses the ridges 916 against the fiber 924 and thus causes the portions of fiber 924 beneath the ridges 916 to be stressed. The ridges cause abrupt changes in fiber geometry at the beginnings and ends of the stressed regions. For purposes of explanation, these abrupt changes in fiber geometry may be viewed as boundaries 944.

It is beneficial to the operation of the device that abrupt changes in the orientation of the polarization mode axes be caused so that such changes in orientation occur over a very short boundary region. In the embodiment shown, these boundaries 944 in FIG. 28 are formed by the edges of the coupling surfaces 918 of the relief areas 916, and thus are periodically spaced at one-half the beat length. In other embodiments, the boundaries 944 could be spaced at odd multiples of one-half the beat length.

Figure 29:
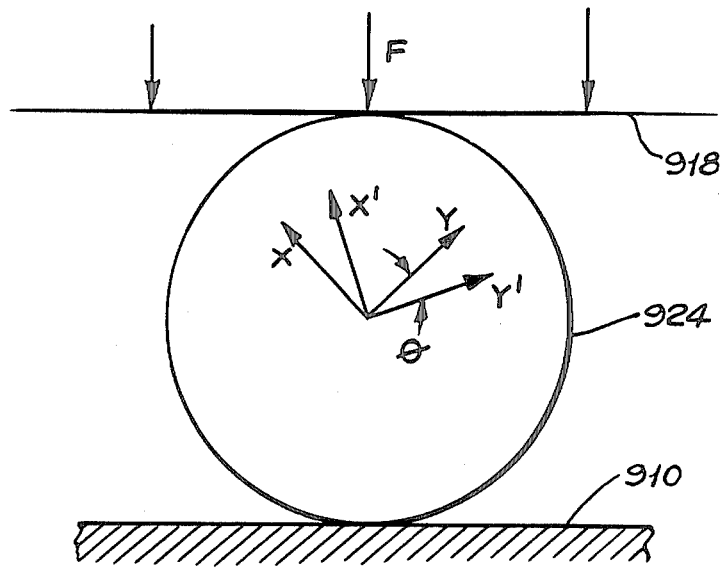
FIG. 29 shows the effect on the axes of polarization of a birefringent fiber when stress is applied to the fiber.

At each boundary 944, light is coupled between the modes of the fiber 924. For a birefringent fiber 924, the orthogonal axes of polarization X and Y (which correspond to the polarization modes X and Y) abruptly shift at each boundary 944 through an angle θ to orthogonal axes of polarization X' and Y' as shown in FIG. 29.

3. Theory of Operation for Nonbirefringent Fiber

Figure 30:
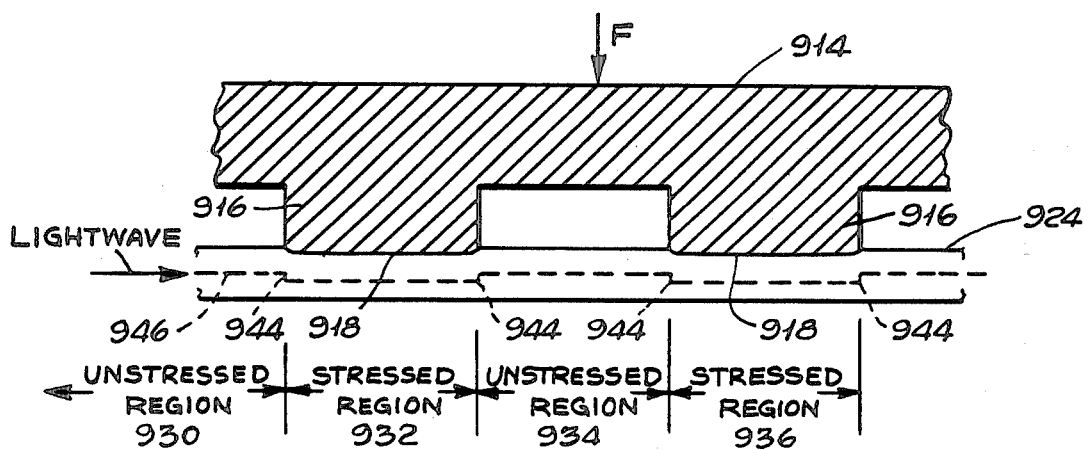
FIG. 30 is a schematic diagram showing a pair of ridges pressed against a nonbirefringent optical fiber so as to deform the fiber and cause abrupt changes in the fiber geometry at the beginning and end of each ridge.

Referring to FIG. 30, one type of modal coupler incorporating a two-mode fiber 924 is shown. A force F is applied to the upper block 914 which causes the coupling surfaces 918 of the ridges 916 to press against the fiber 924 and asymmetrically deform the fiber. The ridges 916 cause changes in fiber geometry at the beginning and end of each stressed region 932, 936, thus creating boundaries 944 between the stressed and unstressed regions.

For the nonbirefringent fiber 924, the center line or longitudinal axis 946 of the fiber is abruptly shifted at each boundary 944 in the direction of the applied force. Such abrupt shifting of the fiber axis 946 causes light to be coupled from the fundamental $LP_{01}$ set of modes to the second order $LP_{11}$ set of modes at each of the boundaries 944. The particular second order mode to which the light is coupled depends upon the direction of force relative to the polarization of the applied light. For example, if the input light in the fundamental mode is vertically polarized, such light will uniquely couple to the vertical-perpendicular second order mode and not to the vertical-parallel second order mode, the horizontal-normal second order mode or the horizontal-parallel second order mode (see FIG. 11). Assuming now that the force is still vertical, but the input light is horizontally polarized in the fundamental mode, such light will couple uniquely to the horizontal-parallel second order mode and not to any of the other second order modes. Of course, other embodiments of couplers for use with two-mode fibers are known in the technology, such as the coupler described in the H. F. Taylor reference which was previously mentioned, and which discusses a device for applying periodic bends to the two-mode fiber in accomplishing the coupling.

SUMMARY

In summary, not only does the invention described herein comprise a significant improvement over the prior art in monitoring environmental conditions at a plurality of locations by use of an optical source having a short coherence length, but it also overcomes other long-existent problems in the industry by (1) providing a system which may be configured for continuous sensing of all of a plurality of sensors; (2) providing configurations which permit accurate sensing at remote locations without environmental shielding of the leads; (3) providing for heterodyning of optical signals in a straighforward, economic, and optionally all fiber-optic manner which produces accurate and easily analyzed information signals for identifying environmental influences affecting the sensors; and (4) providing the option of all fiber-optic sensor array systems, which do not require the use of bulk optics or of electronic equipment at the sensor sites.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for remotely sensing environmental effects on a pair of sensors, comprising:
   a light source;
   a plurality of optical waveguide segments which are optically coupled to receive light transmitted from the light source, for conducting light from the source along first, second, third and fourth light paths at least first and second ones of said waveguide segments configured such that said first and second light paths are different in at least one sensing region and at least one of said first and second light paths are influenced by environmental effects in said sensing region, at least third and fourth ones of said waveguide segments configured such that said third and fourth light paths are different in at least one receiving region, with the difference between the first and second path lengths in the sensing region being substantially equal to the difference between the third and fourth path lengths in the receiving region, with said third and fourth light paths not subject to the same environmental effect in the receiving region as said first and second light paths in the sensing region, with at least a fifth one of said waveguide segments being optically coupled at its first end to an output end of at least one of said first and second wavguide segments, and being optically coupled at its second end to an input end of at least one of said third and fourth waveguide segments to conduct light between said first, second, third and fourth waveguide segments along a single, common propagation path comprising a portion of said first, second, third and fourth light paths; and
   means optically coupled to an output end of said third and fourth waveguide segments for combining light from said first, second, third and fourth light paths at a location on said paths where coherence exists only for light which has traveled paths selected to yield interference between the light in the paths.

2. An apparatus for remotely sensing environmental effects as defined in claim 1, wherein the light source comprises an optical source having a short coherence length.

3. An apparatus for remotely sensing environmental effects as defined in claim 1, wherein the first and second waveguide segments are configured to form light paths which are different in length by an amount at least as great as one coherence length of the light source.

4. An apparatus for remotely sensing environmental effects as defined in claim 1, wherein the third and fourth light paths exist only at different times.

5. An apparatus for remotely sensing environmental effects as defined in claim 1, wherein the first and second waveguide segments are configured to form an optical interferometer in said at least one sensing region, the arms of said interferometer conducting light from the optical source along portions of said first and second light paths which are different in said sensing region.

6. An apparatus for remotely sensing environmental conditions as defined in claim 5, wherein the arms of said interferometer produce a difference in the length of said first and second light paths which is at least as great as one coherence length of the light source.

7. An apparatus for remotely sensing environmental conditions as defined in claim 1, wherein the means for combining light provides an output signal comprising the phase difference of light which interferes in said means for combining, said phase difference representative of environmental effects influencing transmission characteristics of that waveguide segment in the sensing region through which passed light which interferes in said combining means with light from the light source which did not pass through said waveguide segment in the sensing region.

8. An apparatus for remotely sensing environmental effects as defined in claim 1 wherein, in the sensing region, the first and second waveguide segments comprise a first single optical fiber, which guides light from the light source within said first optical fiber along orthogonal modes comprising the first and second light paths.

9. An apparatus for remotely sensing environmental effects as defined in claim 8 wherein, in the receiving region, the third and fourth waveguide segments comprise a second single optical fiber which guides light received from the first single optical fiber within said second optical fiber along orthogonal modes comprising the third and fourth light paths.

10. An apparatus for remotely sensing environmental effects as defined in claim 9, wherein said fifth waveguide segment defines a single mode optical fiber for propagating light between the sensing and receiving regions.

11. An apparatus for remotely sensing environmental effects as defined in claim 1, wherein the optical waveguide segments comprise an optical fiber which conducts the light from the light source in at least a portion of the first, second, third and fourth light paths in the sensing region, and wherein the apparatus further comprises means selectively positioned on said optical fiber for acting on said optical fiber to produce coupling of light within said optical fiber between at least two of said first, second, third and fourth light paths at said selected locations.

12. An apparatus for remotely sensing environmental effects on a pair of sensors, comprising:
 a light source;
 first and second optical interferometers, each having an input end and an output end, said input end being optically coupled to receive light transmitted from the light source and each having first and second interferometer arms, at least one of said arms in each of the first and second interferometers being sensitive to an environmental effect and influencing light propagating in said sensitive arm in response to said environmental effects;
 at least a third optical interferometer having an input end and an output end and having first and second interferometer arms configured such that optical path lengths of the first and second arms of the third interferometer have a difference which is substantially equal to the optical path length difference between the arms of one of the first and second interferometers, said third interferometer not being subject to the same environmental effect as either of said first and second interferometers;
 an optical waveguide optically coupled to receive light from the output end of each of said first and second interferometers and to provide said light to the input end of said third interferometer so that light from said first and second interferometers is propagated from the first and second interferometers to the third interferometer through said optical waveguide only; and
 wherein said at least a third interferometer includes means for combining light from said first and second arms of said third interferometer, so that light signals which interfere in said combining means produce a signal representative of environmental influence on said sensitive arm of one of the first and second interferometers.

13. An apparatus for remotely sensing environmental effects on a pair of sensors as defined in claim 12, wherein said first and second optical interferometers comprise first and second optical fibers which define said first and second arms of said first and second interferometers as orthogonal modes within said optical fibers.

14. An apparatus for remotely sensing environmental effects as defined in claim 13, wherein said third optical interferometer comprises an optical fiber which defines said first and second arms of said third interferometer as orthogonal modes in said fiber.

15. An apparatus for remotely sensing environmental effects as defined in claim 14, wherein said first, second and third optical fibers comprise birefringent fibers, and wherein said orthogonal modes in said fibers comprise orthogonal polarizations.

16. An apparatus for remotely sensing environmental effects as defined in claim 14, wherein said first, second and third optical fibers comprise two-mode fibers, and wherein said orthogonal modes in said fibers comprise one mode of a fundamental mode set and one mode of a second order mode set of said two-mode fibers.

17. An apparatus for remotely sensing environmental conditions as defined in claim 12, further comprising:
 a detector optically coupled to the means for combining, said detector forming an output which corresponds to the phase difference of the light which interferes in said means for combining; and
 a circuit for amplitude modulating the output to produce a first signal having selected harmonics which contain both sine and cosine components of the output, thereby providing for analysis of the output signal to identify environmental effects influencing the sensitive arms of the first and second interferometers.

18. An apparatus for remotely sensing environmental conditions as defined in claim 17 further comprising:
 a signal generator for providing a phase modulation signal at a selected modulation frequency;
 a phase modulator, responsive to the signal generator for phase modulating the light waves in the third interferometer at the selected modulation frequency; and
 wherein the circuit functions to amplitude modulate the output at the selected modulation frequency.

19. An apparatus for remotely sensing environmental effects as defined in claim 12, wherein the light source comprises an optical source having a short coherence length.

20. An apparatus for remotely sensing environmental effects as defined in claim 12, wherein the optical path length difference of the arms in the third interferometer substantially equals the optical path length difference of the arms in the first interferometer only at times which are different from times when said difference of the arms in the third interferometer substantially equals the optical path length difference of the arms in the second interferometer.

21. An apparatus for remotely sensing environmental effects as defined in claim 12, wherein the optical path length difference between each pair of first and second arms in the first and second interferometers is at least as great as one coherence length of the light source, and wherein the optical path length difference of the arms in the first interferometer is different from the optical path length difference of the arms in the second interferometer by at least one coherence length of the light source.

22. An apparatus for remotely sensing environmental effects as defined in claim 21, wherein the difference between the optical path lengths of the first and second arms in said third interferometer is substantially equal to the difference in optical path lengths of the arms in at least one of said first and second interferometers.

23. An apparatus for remotely sensing environmental effects as defined in claim 22, wherein at least a portion of one of the arms of the third interferometer comprises a variable delay line, permitting the optical path length of said arm to be varied so that the optical path length difference between the arms of the third interferometer is varied so as to substantially equal the optical path length difference between the arms of the first interferometer at a first time, and to substantially equal the optical path length difference between the arms of the second interferometer at a second time.

24. An apparatus for remotely sensing environmental effects as defined in claim 21, wherein said at least one third optical interferometer comprises a third and a fourth optical interferometer, each said third and fourth optical interferometer including first and second fiber-optic arms, wherein the optical path differences between said first and second arms in said third and fourth interferometers substantially match, respectively, the optical path differences between said first and second arms in said first and second interferometers, thereby providing for monitoring of environmental effects on the first interferometer by means of light from the third interferometer, and monitoring environmental effects on the second interferometer by means of light from the fourth interferometer.

25. An apparatus for remotely sensing environmental effects as defined in claim 12, wherein the output end of the first interferometer is optically coupled to the input end of the second interferometer, and wherein the output end of the second interferometer is optically coupled through said optical waveguide to the input end of the third interferometer, defining a series configuration.

26. An apparatus for remotely sensing environmental effects on a pair of sensors comprising:
a light source;
first and second optical interferometers, each having an input end and an output end, said input end of said first interferometer being optically coupled to receive light transmitted from the light source, said output end of the first interferometer being optically coupled to the input end of the second interferometer, each said first and second interferometer having first and second interferometer arms, wherein optical path length differences between the first and second arms in each interferometer are greater than one source coherence length of the light source, and wherein said optical path length difference of the first and second arms in the first interferometer is different than said optical path length difference of the first and second arms in the second interferometer by at least one source coherence length of the light source, at least one of the arms in each of said first and second interferometers being sensitive to an environmental effect and influencing light propagating in said sensitive arm in response to said environmental effect;
at least one third optical interferometer having an input end and an output end and having first and second interferometer arms, wherein the difference in optical path lengths between the first and second interferometer arms in said third interferometer is substantially equal to the difference in optical path lengths of the interferometer arms in at least one of said first and second interferometers, said third interferometer not being subject to the same environmental effect as either of said first and second interferometers;
an optical waveguide optically coupled to receive light from the output end of said second interferometer and to provide said light to the input end of said third interferometer so that light from said first and second interferometers is propagated from the first and second interferometers to the third interferometer through said optical waveguide only; and
wherein said at least a third interferometer includes means for coupling light from the third interferometer, thereby providing an optical signal representative of the environmental effect influencing light propagating through the sensitive arm in one of the first and second interferometers whose optical path length difference between its pair of interferometer arms substantially corresponds to the optical path length difference between the pair of interferometer arms in said third interferometer at any time.

27. An apparatus for remotely sensing environmental effects as defined in claim 26, wherein the light source comprises an optical source having a short coherence length.

28. An apparatus for remotely sensing environmental effects as defined in claim 26, wherein at least a portion of one of the interferometer arms in the third interferometer comprises a variable delay line, permitting the optical path length of said arm to be varied so that the optical path length difference between the interferometer arms in the third interferometer is varied so as to substantially equal the optical path length difference between the arms in the first interferometer at a first time, and to substantially equal the optical path length difference between the arms in the second interferometer at a second time.

29. An apparatus for remotely sensing environmental effects as defined in claim 26, wherein said at least one third optical interferometer comprises a third and a fourth optical interferometer, each said third and fourth optical interferometer including first and second fiber optic arms, wherein the optical path differences between said first and second arms in said third and fourth interferometers substantially match, respectively, the optical path differences between the first and second arms in said first and second interferometers, thereby providing for monitoring of environmetal effects on the first interferometer by means of light from the third interferometer, and monitoring environmental effects on the second interferometer by means of light from the fourth interferometer.

30. An apparatus for remotely sensing environmental effects as defined in claim 26, wherein the first and second optical interferometers comprise first and second optical fibers which define said first and second arms of said first and second interferometers as orthogonal modes within said optical fibers.

31. An apparatus for remotely sensing environmental effects as defined in claim 30, wherein said at least one third optical interferometer comprises a third optical fiber which defines said first and second arms of said third interferometer as orthogonal modes in said third optical fiber.

32. An apparatus for remotely sensing environmental effects as defined in claim 31, wherein said first, second and at least third optical fibers comprise birefringent fibers, and wherein said orthogonal modes in said fibers comprise orthogonal polarizations.

33. An apparatus for remotely sensing environmental effects as defined in claim 31, wherein said first, second and at least third optical fibers comprise two-mode fibers, and wherein said orthogonal modes in said fibers comprise one mode of a fundamental mode set and one mode of a second order mode set of said two-mode fibers.

34. A distributed sensor system comprising:
a light source;
a plurality of fiber-optic sensing interferometers, each said sensing interferometer having first and second interferometer arms, and at least a portion of one of said first and second arms in each said interferometer having light transmission characteristics which vary in response to environmental conditions, with each said sensing interferometer having input and output terminals which are optically coupled together to form a ladder network, said input terminals being optically coupled to the light source, and wherein the sensing interferometers are optically spaced from one another and the difference in the optical path lengths of the first and second interferometer arms in each said sensing interferometer are different for each interferometer by an amount such that light transmitted through said interferometers from the light source and distributed from any one output terminal is optically incoherent with respect to all other light distributed from any other output terminal at a corresponding time; and
at least one fiber-optic receiving interferometer having an input terminal optically coupled to the output terminals of the sensing interferometers and having first and second interferometer arms whose optical path length difference substantially matches an optical path length difference of the first and second interferometer arms in a selected sensing interferometer, such that portions of an optical signal transmitted from the light source through the sensor system will interfere at an output of the receiving interferometer providing an optical signal representative of conditions causing change in light transmission characteristics of said selected sensing interferometer.

35. A distributed sensor system as defined in claim 34, wherein the light source comprises an optical source having a short coherence length.

36. A distributed sensor system as defined in claim 34, wherein one of the first and second interferometer arms of the receiving interferometer comprises a variable delay line, permitting the length of said optical path to be varied so that the optical path length difference between said arms in the receiving interferometer is varied so as to subtantially equal the optical path length difference between the first and second interferometer arms in a first selected sensing interferometer at a first time, and to substantially equal the optical path length difference between the first and second interferometer arms in a second selected sensing interferometer at a second time.

37. A distributed sensor system as defined in claim 34, wherein said at least one receiving interferometer comprises a third and a fourth optical interferometer, each said third and fourth optical interferometer including first and second fiber optic arms, wherein the optical path differences between the first and second arms in said third and fourth interferometers substantially match, respectively, the optical path differences between the first and second interferometer arms in a first and second selected sensing interferometer, thereby providing for monitoring of environmental effects on the first interferometer by means of light from the third interferometer, and monitoring environmental effects on the second interferometer by means of light from the fourth interferometer.

38. An apparatus for remotely sensing environmental effects as defined in claim 34, wherein the sensing interferometers comprise optical fibers which define said first and second arms of said sensing interferometers as orthogonal modes within said optical fibers.

39. An apparatus for remotely sensing environmental effects as defined in claim 38, wherein said at least one receiving interferometer comprises an optical fiber which defines said first and second arms of said receiving interferometer as orthogonal modes in said fiber.

40. An apparatus for remotely sensing environmental effects as defined in claim 39, wherein said optical fibers comprise birefringent fibers, and wherein said orthogonal modes in said fibers comprise orthogonal polarizations.

41. An apparatus for remotely sensing environmental effects as defined in claim 39, wherein said optical fibers comprise two-mode fibers, and wherein said orthogonal modes in said fibers comprise one mode of a fundamental mode set and one mode of a second order mode set in said two-mode fibers.

42. A distributed sensor system comprising:
a light source;
an optical fiber optically coupled at an input end to the light source, said optical fiber defining first and second orthogonal modes for propagating light therethrough;
a plurality of means positioned at selected locations on said optical fiber for acting on said fiber to couple light between said orthogonal modes at said selected locations, wherein a first pair of means for acting are positioned on said optical fiber to define a first propagation length difference in the orthogonal modes therebetween which is greater than one coherence length of the light source, with the optical fiber between said first pair of acting means being sensitive to an environmental effect so as to influence light propagating in said orthogonal modes, and wherein a second pair of acting means are positioned on said optical fiber to define a second propagation length difference in the orthogonal modes therebetween which is substantially equal to the first propagation length difference, with the optical fiber between the second pair of acting means not subject to the same environmental effect as the optical fiber between the first pair of acting means; and
means for receiving light from the orthogonal modes in the optical fiber between the second pair of acting means and for coupling said received light, thereby providing an optical signal which is produced by light which interferes in the coupling means, said optical signal being representative of the environmental effect influencing light propagating through the orthogonal modes in said optical fiber between the first pair of acting means.

43. A distributed sensor system as defined in claim 42, wherein said optical fiber comprises a birefringent fiber, and wherein said first and second orthogonal modes comprise orthogonal polarizations.

44. A distributed sensor system as defined in claim 42, wherein said optical fiber comprises a two-mode fiber, and wherein said first and second orthogonal modes comprise, respectively, one mode of a fundamental mode set and one mode of a second order mode set.

45. A distributed sensor system as defined in claim 42, wherein the plurality of means for acting on said fiber comprise fiber-optic modal couplers for transferring optical signals between the propagation modes of an optical fiber by applying stress to the optical fiber at spaced intervals.

* * * * *

UNITED STATES PATENT AND TRADEMARK OFFICE
CERTIFICATE OF CORRECTION

PATENT NO. : 4,699,513
DATED : October 13, 1987
INVENTOR(S) : Brooks, et al.

It is certified that error appears in the above-identified patent and that said Letters Patent is hereby corrected as shown below:

Column 3, line 13, change "way be detected" to --may be detected--.

Column 4, line 49, change "coherently coupled" to --coherently coupling--.

Column 5, line 15, "light paths sub-" and printed text in lines 16-51, should be deleted and inserted in col. 4, line 50, after "from".

Column 7, line 48, change "and/or polarizes" to --and/or polarizers--.

Column 7, line 63, change "difference beomes" to --difference becomes--.

Column 15, line 7, change "strng coming" to --string coming--.

Column 16, line 24, change "input but" to --input bus--.

Column 24, line 36, change "optically connected" to --optically coupled--.

Column 29, line 59, change "receiving the detecting" to --receiving and detecting--.

Column 30, line 55, change "706 and 714" to --706 or 714--.

Column 33, line 58, change "728 and 758" to --728 and 748--.

Column 35, line 67, change "through 724" to --through coupler 724--.

Column 38, line 46, change "$m_{k+1} \phi_k$ and $2m_{k+1} A_k$" to -- $m_{k+1} \phi C_k$ and $2m_{k+1} \phi A_k$ --.

Column 41, line 37, change "$u(t) \leq$" to -- $u(t) >$ --.

Column 46, line 6, change "harminics" to --harmonics--.

Column 41, line 36, change "$T_u(t-$" to -- $T_u(T)$ --.

Note: The symbol $\phi$ or $\varepsilon$ is missing in equation 8 of the patent.

UNITED STATES PATENT AND TRADEMARK OFFICE
CERTIFICATE OF CORRECTION

PATENT NO. : 4,699,513

DATED : October 13, 1987

INVENTOR(S) : Brooks, et al.

It is certified that error appears in the above-identified patent and that said Letters Patent is hereby corrected as shown below:

Column 41, line 36, "$u(t) \leq$" should be --$u(t) >$--.

Signed and Sealed this

Twelfth Day of November, 1991

Attest:

HARRY F. MANBECK, JR.

*Attesting Officer*   *Commissioner of Patents and Trademarks*